(12) United States Patent
Abdo et al.

(10) Patent No.: US 7,310,356 B2
(45) Date of Patent: Dec. 18, 2007

(54) AUTOMATIC DISCOVERY OF NETWORK CORE TYPE

(75) Inventors: Miguel Abdo, Gulfport, FL (US); Greg Munroe, Largo, FL (US); William H. Venz, Seminole, FL (US)

(73) Assignee: Paradyne Corporation, Largo, FL (US)

( * ) Notice: Subject to any disclaimer, the term of this patent is extended or adjusted under 35 U.S.C. 154(b) by 1024 days.

(21) Appl. No.: 10/603,038

(22) Filed: Jun. 24, 2003

(65) Prior Publication Data

US 2004/0052257 A1 Mar. 18, 2004

Related U.S. Application Data

(60) Provisional application No. 60/391,121, filed on Jun. 24, 2002, provisional application No. 60/391,098, filed on Jun. 24, 2002, provisional application No. 60/391,053, filed on Jun. 24, 2002.

(51) Int. Cl.
*H04J 3/12* (2006.01)

(52) U.S. Cl. ............... 370/522; 370/524; 370/373; 370/377; 370/384; 370/385; 379/221.08; 379/221.09; 379/229

(58) Field of Classification Search .......... 370/522, 370/524, 373, 377, 384, 385; 379/221.08, 379/221.09, 229
See application file for complete search history.

(56) References Cited

U.S. PATENT DOCUMENTS

| | | | |
|---|---|---|---|
| 5,930,264 A * | 7/1999 | Nguyen | ............ 370/466 |
| 6,567,298 B2 * | 5/2003 | Kato et al. | ............ 365/149 |
| 6,671,367 B1 * | 12/2003 | Graf et al. | ............ 379/229 |
| 6,785,372 B1 * | 8/2004 | Moss et al. | ............ 379/114.2 |
| 2004/0101125 A1 * | 5/2004 | Graf et al. | ............ 379/229 |
| 2004/0264389 A1 | 12/2004 | Abdo et al. | |

OTHER PUBLICATIONS

Co-pending application entitled "Determination of Network Performance Characteristics", having U.S. Appl. No. 10/515,222, filed Nov. 19, 2004.

(Continued)

*Primary Examiner*—Quynh H. Nguyen
(74) *Attorney, Agent, or Firm*—Thomas, Kayden, Horstemeyer & Risley, LLP

(57) ABSTRACT

Systems and methods for automatically discovering the configuration of network and/or communication facilities are provided. The determination generally involves receiving and/or sending at least one test message or packet with special characteristics that normally would be filtered by filtering/forwarding entities in connectionless routed cores, but normally would be forwarded by connectionless communication facilities. If the communication facilities do not contain the filtering/forwarding entity, the at least one test packet will be forwarded or passed through the communication facilities. If the at least one test packet is filtered or not passed, then at least two scenarios are possible. First, the at least one test packet may be filtered and may be silently discarded in which case a determination that the network did not pass the at least one test packet may be made based upon a timeout of a counter. Second, the at least one test packet may be filtered and may cause the generation of error or control messages indicating that the at least one test packet is not a proper packet for the network and/or communication facilities.

35 Claims, 12 Drawing Sheets

OTHER PUBLICATIONS

RFC 760: DOD Standard Internet Protocol (Available at ftp://ftp.isi.edu/in-notes/rfc760.txt) V; Jan. 1980; pp. i-iii, 1-42.

RFC 777: Internet Control Message Protocol (Available at ftp://ftp.isi.edu/in-notes/rfc777.txt); Jon Postel; Apr. 1981; pp. 1-14.

RFC 787: Connectionless Data Transmission Survey/Tutorial (Available at ftp://ftp.isi.edu/in-notes/rfc787.txt); A. Lyman Chapin; May 22, 1981; pp. 1-41.

RFC 791: Internet Protocol: DARPA Internet Program Protocol Specification (Available at ftp://ftp.isi.edu/in-notes/rfc791.txt); The Information Sciences Institute of the University of Southern California; Editor: Jon Postel; Sep. 1981; pp. i-iii, 1-45.

RFC 792: Internet Control Message Protocol: DARPA Internet Program Protocol Specification (Available at ftp://ftp.isi.edu/in-notes/rfc792.txt); Jon Postel; Sep. 1981; pp. 1-21.

RFC 874: A Critique of X.25 (Available at ftp://ftp.isi.edu/in-notes/rfc874.txt); M. A. Padlipsky; Sep. 1982; pp. i, 1-13.

RFC 877: A Standard for the Transmission of IP Datagrams Over Public Data Networks (Available at ftp://ftp.isi.edu/in-notes/rfc877.txt); J. T. Korb; Sep. 1983; pp. 1-2.

RFC 894: A Standard for the Transmission of IP Datagrams over Ethernet Networks (Available at ftp://ftp.isi.edu/in-notes/rfc894.txt); Charles Hornig; Apr. 1984; pp. 1-3.

RFC 895: A Standard for the Transmission of IP Datagrams over Experimental Ethernet Networks (Available at ftp://ftp.isi.edu/in-notes/rfc895.txt); Jon Postel; Apr. 1984; pp. 1-3.

RFC 948: Two Methods for the Transmission of IP Datagrams over IEEE 802.3 Networks (Available at ftp://ftp.isi.edu/in-notes/rfc948.txt); Ira Winston; Jun. 1985; pp. 0-5.

RFC 950: Internet Standard Subnetting Procedure (Available at ftp://ftp.isi.edu/in-notes/rfc950.txt); J. Mogul and Jon Postel; Aug. 1985; pp. 1-18.

RFC 1009: Requirements for Internet Gateways (Available at ftp://ftp.isi.edu/in-notes/rfc1009.txt); Robert Braden and Jon Postel; Jun. 1987; pp. 1-55.

RFC 1042: A Standard for the Transmission of IP Datagrams over IEEE 802 Networks (Available at ftp://ftp.isi.edu/in-notes/rfc1042.txt); Jon Postel and J. Reynolds; Feb. 1988; pp. 1-15.

RFC 1051: A Standard for the Transmission of IP Datagrams and ARP Packets over ARCNET Networks (Available at ftp://ftp.isi.edu/in-notes/rfc1051.txt); P. Prindeville; Mar. 1988; pp. 1-4.

RFC 1053: Telnet X.3 PAD Option (Available at ftp://ftp.isi.edu/in-notes/rfc1053.txt); S. Levy and T. Jacobson; Apr. 1988; pp. 1-21.

RFC 1055: A Nonstandard for Transmission of IP Datagrams Over Serial Lines: SLIP (Available at ftp://ftp.isi.edu/in-notes/rfc1055.txt); J. Romkey; Jun. 1988; pp. 1-6.

RFC 1086: ISO-TPO bridge between TCP and X.25 (Available at ftp://ftp.isi.edu/in-notes/rfc1086.txt); Julian P. Onions and Marshall Rose; Dec. 1988; pp. 1-9.

RFC 1088: A Standard for the Transmission of IP Datagrams over NetBIOS Networks (Available at ftp://ftp.isi.edu/in-notes/rfc1088.txt); Leo J. McLaughlin III; Feb. 1989; pp. 1-3.

RFC 1090: SMTP on X.25 (Available at ftp://ftp.isi.edu/in-notes/rfc1090.txt); Robert Ullmann; Feb. 1989; pp. 1-4.

RFC 1103: A Proposed Standard for the Transmission of IP Datagrams over FDDI Networks (Available at ftp://ftp.isi.edu/in-notes/rfc1103.txt); Dave Katz; Jun. 1989; pp. 1-9.

RFC 1122: Requirements for Internet Hosts—Communication Layers (Available at ftp://ftp.isi.edu/in-notes/rfc1122.txt); The Internet Engineering Task Force; Editor: Robert Braden; Oct. 1989; pp. 1-116.

RFC 1134: The Point-to-Point Protocol: A Proposal for Multi-Protocol Transmission of Datagrams Over Point-to-Point Links (Available at ftp://ftp.isi.edu/in-notes/rfc1134.txt); Drew D. Perkins; Nov. 1989; pp. 1-38.

RFC 1171: The Point-to-Point Protocol for the Transmission of Multi-Protocol Datagrams Over Point-to-Point Links (Available at ftp://ftp.isi.edu/in-notes/rfc1171.txt); Drew D. Perkins; Jul. 1990; pp. 1-48.

RFC 1172: The Point-to-Point Protocol (PPP) Initial Configuration Options (Available at ftp://ftp.isi.edu/in-notes/rfc1172.txt); Drew D. Perkins and Russ Hobby; Jul. 1990; pp. 1-38.

RFC 1188: A Proposed Standard for the Transmission of IP Datagrams over FDDI Networks (Available at ftp://ftp.isi.edu/in-notes/ftp1188.txt); Dave Katz; Oct. 1990; pp. 1-11.

RFC 1201: Transmitting IP Traffic over ARCNET Networks (Available at ftp://ftp.isi.edu/in-notes/rfc1201.txt); Don Provan; Feb. 1991; pp. 1-7.

RFC 1209: The Transmission of IP Datagrams over the SMDS Service (Available at ftp://ftp.isi.edu/in-notes/rfc1209.txt); Dave Piscitello and Joseph Lawrence; Mar. 1991; pp. 1-11.

RFC 1220: Point-to-Point Protocol Extensions for Bridging (Available at ftp://frp.isi.edu/in-notes/rfc1220.txt); Fred Baker; Apr. 1991; pp. 1-18.

RFC 1226: Internet Protocol Encapsulation of AX.25 Frames (Available at ftp://ftp.isi.edu/in-notes/rfc1226.txt); Brian Kantor; May 1991; pp. 1-2.

RFC 1234: Tunneling IPX Traffic through IP Networks (Available at ftp://ftp.isi.edu/in-notes/rfc1234.txt); Don Provan; Jun. 1991; pp. 1-6.

RFC 1241: A Scheme for an Internet Encapsulation Protocol: Version 1 (Available at ftp://ftp.isi.edu/in-notes/rfc1241.txt); Robert A. Woodburn and David L. Mills; Jul. 1991; pp. 1-17.

RFC 1242: Benchmarking Terminology for Network Interconnection Devices (Available at ftp://ftp.isi.edu/in-notes/rfc1242.txt); Scott Bradner, Editor; Jul. 1991 pp. 1-12.

RFC 1256: ICMP Router Discovery Messages (Available at ftp://ftp.isi.edu/in-notes/rfc1256.txt); Stephen E. Deering, Editor; Sep. 1991; pp. 1-19.

RFC 1293: Inverse Address Resolution Protocol (Available at ftp://ftp.isi.edu/in-notes/rfc1293.txt); Terry Bradley and Caralyn Brown; Jan. 1992; pp. 1-6.

RFC 1294: Multiprotocol Interconnect over Frame Relay (Available at ftp://ftp.isi.edu/in-notes/rfc1294.txt); Terry Bradley, Caralyn Brown, and Andrew G. Malis; Jan. 1992; pp. 1-28.

RFC 1326: Mutual Encapsulation Considered Dangerous (Available at ftp://ftp.isi.edu/in-notes/rfc1326.txt);Paul Tsuchiya; May 1992; pp. 1-5.

RFC 1329: Thoughts on Address Resolution for Dual MAC FDDI Networks (Available at ftp://ftp.isi.edu/in-notes/rfc1329.txt); Peter Kuehn; May 1992; pp. 1-28.

RFC 1331: The Point-to-Point Protocol (PPP) for the Transmission of Multi-protocol Datagrams over Point-to-Point Links (Available at ftp://ftp.isi.edu/in-notes/rfc1331.txt);William Allen Simpson; May 1992; pp. 1-66.

RFC 1332: The PPP Internet Protocol Control Protocol (IPCP) (Available at ftp://ftp.isi.edu/in-notes/rfc1332.txt); Glenn McGregor; May 1992; pp. 1-12.

RFC 1333: PPP Link Quality Monitoring (Available at ftp://ftp.isi.edu/in-notes/rfc1333.txt); William Allen Simpson; May 1992; pp. 1-15.

RFC 1335: A Two-Tier Address Structure for the Internet: A Solution to the Problem of Address Space Exhaustion (Available at ftp://ftp.isi.edu/in-notes/rfc1335.txt); Zheng Wang and Jon Crowcroft; May 1992; pp. 1-7.

RFC 1356: Multiprotocol Interconnect on X.25 and ISDN in the Packet Mode (Available at ftp://ftp.isi.edu/in-notes/rfc1356.txt); Andrew G. Malis, David Robinson, and Robert L. Ullmann; Aug. 1992; pp. 1-14.

RFC 1376: The PPP DECnet Phase IV Control Protocol (DNCP) (Available at ftp://ftp.isi.edu/in-notes/rfc1376.txt); Steven J. Senum; Nov. 1992; pp. 1-6.

RFC 1377: The PPP OSI Network Layer Control Protocol (OSINLCP) (Available at ftp://ftp.isi.edu/in-notes/rfc1377.txt); Dave Katz; Nov. 1992; pp. 1-10.

RFC 1378: The PPP AppleTalk Control Protocol (ATCP) (Available at ftp://ftp.isi.edu/in-notes/rfc1378.txt); Brad Parker; Nov. 1992; pp. 1-16.

RFC 1381: SNMP MIB Extension for X.25 LAPB (Available at ftp://ftp.isi.edu/in-notes/rfc1381.txt); Dean D. Throop and Fred Baker; Nov. 1992; pp. 1-33.

RFC 1382: SNMP MIB Extension for the X.25 Packet Layer (Available at ftp://ftp.isi.edu/in-notes/rfc1382.txt); Dean D. Throop, Editor; Nov. 1992; pp. 1-69.

RFC 1390: Transmission of IP and ARP over FDDI Networks (Available at ftp://ftp.isi.edu/in-notes/rfc1390.txt); Dave Katz; Jan. 1993; pp. 1-11.
RFC 1393: Traceroute Using an IP Option (Available at ftp://ftp.isi.edu/in-notes/rfc1393.txt); Gary Scott Malkin; Jan. 1993; pp. 1-7.
RFC 1479: Inter-Domain Policy Routing Protocol Specification: Version 1 (Available at ftp://ftp.isi.edu/in-notes/rfc1479.txt); Martha Steenstrup; Jul. 1993; pp. 1-108.
RFC 1483: Multiprotocol Encapsulation over ATM Adaptation Layer 5 (Available at ftp://ftp.isi.edu/in-notes/rfc1483.txt); Juha Heinanen; Jul. 1993; pp. 1-16.
RFC 1490: Multiprotocol Interconnect over Frame Relay (Available at ftp://ftp.isi.edu/in-notes/rfc1490.txt); Terry Bradley, Caralyn Brown, and Andrew G. Malis; Jul. 1993; pp. 1-35.
RFC 1547: Requirements for an Internet Standard Point-to-Point Protocol (Available at ftp://ftp.isi.edu/in-notes/rfc1547.txt); Drew Perkins; Dec. 1993; pp. 1-21.
RFC 1548: The Point-to-Point Protocol (PPP) (Available at ftp://ftp.isi.edu/in-notes/rfc1548.txt); William Allen Simpson; Dec. 1993; pp. 1-53.
RFC 1549: PPP in HDLC Framing (Available at ftp://ftp.isi.edu/in-notes/rfc1549.txt);William Allen Simpson, Editor; Dec. 1993; pp. 1-18.
RFC 1552: The PPP Internetwork Packet Exchange Control Protocol (IPXCP) (Available at ftp://ftp.isi.edu/in-notes/rfc1552.txt); William Allen Simpson; Dec. 1993; pp. 1-16.
RFC 1577: Classical IP and ARP over ATM (Available at ftp://ftp.isi.edu/in-notes/rfc1577.txt); Mark Laubach; Jan. 1994; pp. 1-17.
RFC 1579: Firewall-Friendly FTP (Available at ftp://ftp.isi.edu/in-notes/rfc1579.txt); Steven M. Bellovin; Feb. 1994; pp. 1-4.
RFC 1597: Address Allocation for Private Internets (Available at ftp://ftp.isi.edu/in-notes/rfc1597/txt)1 Yakov Rekhter, Robert G Moskowitz, Daniel Karrenberg, and Geert Jan de Groot; Mar. 1994; pp. 1-8.
RFC 1598: PPP in X.25 (Available at ftp://ftp.isi.edu/in-notes/rfc1598.txt); William Allen Simpson; Mar. 1994; pp. 1-7.
RFC 1613: cisco Systems X.25 over TCP (XOT) (Available at ftp://ftp.isi.edu/in-notes/rfc1613.txt); James R. Forster, Greg Satz, Gilbert Glick, and Bob Day; May 1994; pp. 1-13.
RFC 1618: PPP over ISDN (Available at ftp://ftp.isi.edu/in-notes/rfc1618.txt); William Allen Simpson; May 1994; pp. 1-6.
RFC 1619: PPP over SONET/SDH (Available at ftp://ftp.isi.edu/in-notes/rfc1619.txt); William Allen Simpson; May 1994; pp. 1-4.
RFC 1627: Network 10 Considered Harmful (Some Practices Shouldn't be Codified) (Available at ftp://ftp.isi.edu/in-notes/rfc1627.txt); Eliot Lear, Erik Fair, Dave Crocker, and Thomas Kessler; Jul. 1994; pp. 1-8.
RFC 1631: The IP Network Address Translator (NAT) (Available at ftp://ftp.isi.edu/in-notes/rfc1631.txt); Kjeld Borch Egevang and Paul Francis; May 1994; pp. 1-10.
RFC 1638: PPP Bridging Control Protocol (BCP) (Available at ftp://ftp.isi.edu/in-notes/rfc1638.txt); Fred Baker and Rich Bowen, Editors; Jun. 1994; pp. 1-28.
RFC 1661: The Point-to-Point Protocol (PPP) (Available at ftp://ftp.isi.edu/in-notes/rfc1661.txt); William Allen Simpson; Jul. 1994; pp. 1-52.
RFC 1662: PPP in HDLC-like Framing (Available at ftp://ftp.isi.edu/in-notes/rfc1662.txt); William Allen Simpson; Jul. 1994; pp. 1-25.
RFC 1663: PPP Reliable Transmission (Available at ftp://ftp.isi.edu/in-notes/rfc1663.txt); Dave Rand; Jul. 1994; pp. 1-8.
RFC 1700: Assigned Numbers (Available at ftp://ftp.isi.edu/in-notes/rfc1700.txt); Joyce K. Reynolds and Jon Postel; Oct. 1994; pp. 1-230.
RFC 1701: Generic Routing Encapsulation (GRE) (Available at ftp://ftp.isi.edu/in-notes/rfc1701.txt); Stan Hanks, Tony Li, Dino Farinacci, and Paul Traina; Oct. 1994; pp. 1-8.
RFC 1702: Generic Routing Encapsulation over IPv4 networks (Available at ftp://ftp.isi.edu/in-notes/rfc1702.txt); Stan Hanks, Tony Li, Dino Farinacci, and Paul Traina; Oct. 1994; pp. 1-4.
RFC 1717: The PPP Miltilink Protocol (MP) (Available at ftp://ftp.isi.edu/in-notes/rfc1717.txt); Keith Sklower, Brian Lloyd, Glenn McGregor, and Dave Carr; Nov. 1994; pp. 1-21.
RFC 1739: A Primer On Internet and TCP/IP Tools (Available at ftp://ftp.isi.edu/in-notes/rfc1739.txt); Gary C. Kessler and Steven D. Shepard; Dec. 1994; pp. 1-46.
RFC 1752: The Recommendation for the IP Next Generation Protocol (Available at ftp://ftp.isi.edu/in-notes/rfc1752.txt); Scott Bradner and Allision Mankin; Jan. 1995; pp. 1-52.
RFC 1755: ATM Signaling Support for IP over ATM (Available at ftp://ftp.isi.edu/in-notes/rfc1755.txt);Maryann Perez Maher, Fong-Ching Liaw, and Allison Mankin; Feb. 1995; pp. 1-32.
RFC 1762: The PPP DECnet Phase IV Control Protocol (DNCP) (Available at ftp://ftp.isi.edu/in-notes/rfc1762.txt); Steven J. Senum; Mar. 1995; pp. 1-7.
RFC 1763: The PPP Banyan Vines Control Protocol (BVCP) (Available at ftp://ftp.isi.edu/in-notes/rfc1763.txt); Steven J. Senum; Mar. 1995; pp. 1-10.
RFC 1764: The PPP XNS IDP Control Protocol (XNSCP) (Available at ftp://ftp.isi.edu/in-notes/rfc1764.txt); Steven J. Senum; Mar. 1995; pp. 1-5.
RFC 1788: ICMP Domain Name Messages (Available at ftp://ftp.isi.edu/in-notes/rfc1788.txt); William Allen Simpson; Apr. 1995; pp. 1-7\.
RFC 1814: Unique Addresses are Good (Available at ftp://ftp.isi.edu/in-notes/rfc1814.txt); Elise Gerich; Jun. 1995; pp. 1-3.
RFC 1825: Security Architecture for the Internet Protocol (Available at ftp://ftp.isi.edu/in-notes/rfc1825.txt); Randall Atkinson; Aug. 1995; pp. 1-22.
RFC 1826: IP Authentication Header (Available at ftp://ftp.isi.edu/in-notes/rfc1826.txt); Randall Atkinson; Aug. 1995; pp. 1-13.
RFC 1827: EP Encapsulating Security Payload (ESP) (Available at ftp://ftp.isi.edu/in-notes/rfc1827.txt); Randall Atkinson; Aug. 1995; pp. 1-12.
RFC 1841: PPP Network Control Protocol for LAN Extension (Available at ftp://ftp.isi.edu/in-notes/rfc1841.txt); Joelle Bafile Chapman, Dave Coli, Andy Harvey, Dent Jensen, and Kevin Rowett; Sep. 1995; pp. 1-66.
RFC 1853: IP in IP Tunneling (Available at ftp://ftp.isi.edu/in-notes/rfc1853.txt); William Allen Simpson; Oct. 1995; pp. 1-8.
RFC 1877: PPP Internet Protocol Control Protocol Extensions for Name Server Addresses (Available at ftp://ftp.isi.edu/in-notes/rfc1877.txt); Steve Cobb; Dec. 1995; pp. 1-6.
RFC 1883: Internet Protocol, Version 6 (IPv6) Specification (Available at ftp://ftp.isi.edu/in-notes/rfc1883.txt); Stephen E. Deering and Robert M. Hinden; Dec. 1995; pp. 1-37.
RFC 1884: IP Version 6 Addressing Architecture (Available at ftp://ftp.isi.edu/in-notes/rfc1884.txt); Robert M. Hinden and Stephen E. Deering, Editors; Dec. 1995; pp. 1-18.
RFC 1885: Internet Control Message Protocol (ICMPv6) for the Internet Protocol Version 6 (IPv6) Specification (Available at ftp://ftp.isi.edu/in-notes/rfc1885.txt); Alex Conta and Stephen Deering; Dec. 1995; pp. 1-20.
RFC 1887: An Architecture for IPv6 Unicast Address Allocation (Available at ftp://ftp.isi.edu/in-notes/rfc1887.txt); Yakov Rekhter and Tony Li, Editors; Dec. 1995; pp. 1-26.
RFC 1897: IPv6 Testing Address Allocation (Available at ftp://ftp.isi.edu/in-notes/rfc1897.txt); Robert M. Hinden and Jon Postel; Jan. 1996; pp. 1-4.
RFC 1918: Address Allocation for Private Internets (Available at ftp://ftp.isi.edu/in-notes/rfc1918.txt); Yakov Rekhter, Robert G. Moskowitz, Daviel Karrenberg, Geert Jan de Groot, and Eliot Lear; Feb. 1996; pp. 1-9.
RFC 1919: Classical versus Transparent IP Proxies (Available at ftp://ftp.isi.edu/in-notes/rfc1919.txt); Marc Chatel; Mar. 1996; pp. 1-35.
RFC 1928: SOCKS Protocol Version 5 (Available at ftp://ftp.isi.edu/in-notes/rfc1928.txt); Marcus Leech, M. Ganis, Y. Lee, R. Kuris, D. Koblas, and L. Jones; Mar. 1996; pp. 1-9.
RFC 1929: Username/Password Authentication for SOCKS V5 (Available at ftp://ftp.isi.edu/in-notes/rfc1929.txt); Marcus Leech; Mar. 1996; pp. 1-2.
RFC 1932: IP over ATM: A Framework Document (Available at ftp://ftp.isi.edu/in-notes/rfc1932.txt); Robert G. Cole, David H. Shur, and Curtis Villamizar; Apr. 1996; pp. 1-31.

RFC 1933: Transition Mechanisms for IPv6 Hosts and Routers (Available at ftp://ftp.isi.edu/in-notes/rfc1933.txt); Robert E. Gilligan and Erik Nordmark; Apr. 1996; pp. 1-22.

RFC 1944: Benchmarking Methodology for Network Interconnect Devices (Available at ftp://ftp.isi.edu/in-notes/rfc1944.txt); Scott Bradner and Jim McQuaid, Editors; May 1996; pp. 1-30.

RFC 1963: PPP Serial Data Transport Protocol (SDTP) (Available at ftp://ftp.isi.edu/in-notes/rfc1963.txt); Kevin Schneider and Stuart Venters; Aug. 1996; pp. 1-20.

RFC 1970: Neighbor Discovery for IP Version 6 (IPv6) (Available at ftp://ftp.isi.edu/in-notes/rfc1970.txt); Erik Nordmark, Thomas Narten, and William Allen Simpson; Aug. 1996; pp. 1-82.

RFC 1972: A Method for the Transmission of IPv6 Packets over Ethernet Networks (Available at ftp://ftp.isi.edu/in-notes/rfc1972.txt); Matt Crawford; Aug. 1996; pp. 1-4.

RFC 1973: PPP in Frame Relay (Available at ftp://ftp.isi.edu/in-notes/rfc1973.txt); William Allen Simpson; Jun. 1996; pp. 1-8.

RFC 1989: PPP Link Quality Monitoring (Available at ftp://ftp.isi.edu/in-notes/rfc1989.txt); William Allen Simpson; Aug. 1996; pp. 1-16.

RFC 1990: The PPP Multilink Protocol (MP) (Available at ftp://ftp.isi.edu/in-notes/rfc1990.txt); Keith Sklower, Brian Lloyd, Glenn McGregor, Dave Carr, and Tom Coradetti; Aug. 1996; pp. 1-24.

RFC 2003: IP Encapsulation within IP (Available at ftp://ftp.isi.edu/in-notes/rfc2003.txt); Charles Perkins; Oct. 1996; pp. 1-14.

RFC 2004: Minimal Encapsulation within IP (Available at ftp://ftp.isi.edu/in-notes/rfc2004.txt); Charles Perkins; Oct. 1996; pp. 1-6.

RFC 2019: A Method for the Transmission of IPv6 Packets over FDDI Networks (Available at ftp://ftp.isi.edu/in-notes/rfc2019.txt); Matt Crawford; Oct. 1996; pp. 1-6.

RFC 2023: IP Version 6 over PPP (Available at ftp://ftp.isi.edu/in-notes/rfc2023.txt); Dimitry Haskin and Ed Allen; Oct. 1996; pp. 1-10.

RFC 2043: The PPP SNA Control Protocol (SNACP) (Available at ftp://ftp.isi.edu/in-notes/rfc2043.txt); Andrew M. Fuqua; Oct. 1996; pp. 1-7.

RFC 2073: An IPv6 Provider-Based Unicast Address Format (Available at ftp://ftp.isi.edu/in-notes/rfc2073.txt); Yakov Rekhter, Peter Lothberg, Robert M. Hinden, Stephen R. Deering, and Jon Postel, Editors; Jan. 1997; pp. 1-7.

RFC 2097: The PPP NetBIOS Frames Control Protocol (NBFCP) (Available at ftp://ftp.isi.edu/in-notes/rfc2097.txt); Gurdeep Singh Pall; Jan. 1997; pp. 1-13.

RFC 2101: IPv4 Address Behaviour Today (Available at ftp://ftp.isi.edu/in-notes/rfc2101.txt); Brian E. Carpenter, Jon Crowcroft, and Yakov Rekhter; Feb. 1997; pp. 1-13.

RFC 2105: Cisco Systems' Tag Switching Architecture Overview (Available at ftp://ftp.isi.edu/in-notes/rfc2105.txt); Yakov Rekhter, Bruce Davie, Dave Katz, Eric Rosen, and George Swallow; Feb. 1997; pp. 1-13.

RFC 2107: Ascend Tunnel Management Protocol—ATMP (Available at ftp://ftp.isi.edu/in-notes/rfc2107/txt); Kory Hamzeh; Feb. 1997; pp. 1-21.

RFC 2151: A Primer On Internet and TCP/IP Tools and Utilities (Available at ftp://ftp.isi.edu/in-notes/rfc2151.txt); Gary C. Kessler and Steven D. Shepard; Jun. 1997; pp. 1-52.

RFC 2185: Routing Aspects of IPv6 Transition (Available at ftp://ftp.isi.edu/in-notes/rfc2185.txt); Ross Callon and Dimitry Haskin; Sep. 1997; pp. 1-13.

RFC 2225: Classical IP and ARP over ATM (Available at ftp://ftp.isi.edu/in-notes/rfc2225.txt); Mark Laubach and Joel Halpern; Apr. 1998; pp. 1-28.

RFC 2285: Benchmarking Terminology for LAN Switching Devices (Available at ftp://ftp.isi.edu/in-notes/rfc2285.txt); Robert Mandeville; Feb. 1998; pp. 1-25.

RFC 2290: Mobile-IPv4 Configuration Option for PPP IPCP (Available at ftp://ftp.isi.edu/in-notes/rfc2290.txt); Jim Solomon and Steven Glass; Feb. 1998; pp. 1-17.

RFC 2341: Cisco Layer Two Forwarding (Protocol) "L2F" (Available at ftp://ftp.isi.edu/in-notes/rfc2341.txt); Tim Kolar, Morgan Littlewood, and Andy Valencia; May 1998; pp. 1-29.

RFC 2356: Sun's SKIP Firewall Traversal for Mobile IP (Available at ftp://ftp.isi.edu/in-notes/rfc2356.txt); Gabriel E. Montenegro and Vipul Gupta; Jun. 1998; pp. 1-24.

RFC 2363: PPP Over FUNI (Available at ftp://ftp.isi.edu/in-notes/rfc2363.txt); George Gross, Manu Kaycee, Arthur Lin, Andrew Malis, and John Stephens; Jul. 1998; pp. 1-12.

RFC 2364: PPP Over AAL5 (Available at ftp://ftp.isi.edu/in-notes/rfc2364.txt); George Gross, Manu Kaycee, Arthur Lin, Andrew Malis, and John Stephens; Jul. 1998; pp. 1-12.

RFC 2373: IP Version 6 Addressing Architecture (Available at ftp://ftp.isi.edu/in-notes/rfc2373.txt); Robert M. Hinden and Stephen E. Deering; Jul. 1998; pp. 1-26.

RFC 2374: an IPv6 Aggregatable Global Unicast Address Format (Available at ftp://ftp.isi.edu/in-notes/rfc2374.txt); Robert M. Hinden, Mike O'Dell, and Stephen E. Deering; Jul. 1998; pp. 1-12.

RFC 2390: Inverse Address Resolution Protocol (Available at ftp://ftp.isi.edu/in-notes/rfc2390.txt); Terry Bradley, Caralyn Brown, and Andrew Malis; Sep. 1998; pp. 1-10.

RFC 2391: Load Sharing using IP Network Address Translation (LSNAT) (Available at ftp://ftp.isi.edu/in-notes/rfc2391.txt); Pyda Srisuresh and Der-hwa Gan; Aug. 1998; pp. 1-18.

RFC 2401: Security Architecture for the Internet Protocol (Available at ftp://ftp.isi.edu/in-notes/rfc2401.txt); Stephen Kent and Randall Atkinson; Nov. 1998; pp. 1-66.

RFC 2402: IP Authenticatino Header (Available at ftp://ftp.isi.edu/in-notes/rfc2402.txt); Stephen Kent and Randall Atkinson; Nov. 1998; pp. 1-22.

RFC 2406: IP Encapsulating Security Payload (ESP) (Available at ftp://ftp.isi.edu/in-notes/rfc2406.txt); Stephen Kent and Randall Atkinson; Nov. 1998; pp. 1-22.

RFC 2411: IP Security Document Roadmap (Available at ftp://ftp.isi.edu/in-notes/rfc2411.txt); Rodney Thayer, Naganand Doraswamy, and Rob Glenn; Nov. 1998; pp. 1-11.

RFC 2427: Multiprotocol Interconnect over Frame Relay (Available at ftp://ftp.isi.edu/in-notes/rfc2427.txt); Caralyn Brown and Andrew Malis; Sep. 1998; pp. 1-34.

RFC 2428: FTP Extensions for IPv6 and NATs (Available at ftp://ftp.isi.edu/in-notes/rfc2428.txt); Mark Allman, Shawn Ostermann, and Craig Metz; Sep. 1998; pp. 1-8.

RFC 2460: Internet Protocol, Version 6 (IPv6) Specification (Available at ftp://ftp.isi.edu/in-notes/rfc2460.txt); Stephen E. Deering and Robert M. Hinden; Dec. 1998; pp. 1-39.

RFC 2461: Neighbor Discovery for IP Version 6 (IPv6) (Available at ftp://ftp.isi.edu/in-notes/rfc2461.txt); Thomas Narten, Erik Nordmark, and William Allen Simpson; Dec. 1998; pp. 1-93.

RFC 2463: Internet Control Message Protocol (ICMPv6) for the Internet Protocol Version 6 (IPv6) Specification (Available at ftp://ftp.isi.edu/in-notes/rfc2463.txt); Alex Conta and Stephen Deering; Dec. 1998; pp. 1-18.

RFC 2464: Transmission of IPv6 Packets over Ethernet Networks (Available at ftp://ftp.isi.edu/in-notes/rfc2464.txt); Matt Crawford; Dec. 1998; pp. 1-7.

RFC 2467: Transmission of IPv6 Packets over FDDI Networks (Available at ftp://ftp.isi.edu/in-notes/rfc2467.txt); Matt Crawford; Dec. 1998; pp. 1-9.

RFC 2470: Transmission of IPv6 Packets over Token Ring Networks (Available at ftp://ftp.isi.edu/in-notes/rfc2470.txt); Matt Crawford, Thomas Narten, and Stephen Thomas; Dec. 1998; pp. 1-11.

RFC 2471: IPv6 Testing Address Allocation (Available at ftp://ftp.isi.edu/in-notes/rfc2471.txt); Robert M. Hinden, Robert Fink, and Jon Postel; Dec. 1998; pp. 1-5.

RFC 2472: IP Version 6 over PPP (Available at ftp://ftp.isi.edu/in-notes/rfc2472.txt); Dimitry Haskin and Ed Allen; Dec. 1998; pp. 1-14.

RFC 2473: Generic Packet Tunneling in IPv6 Specification (Available at ftp://ftp.isi.edu/in-notes/rfc2473.txt); Alex Conta and Stephen Deering; Dec. 1998; pp. 1-36.

RFC 2492: IPv6 over ATM Networks (Available at ftp://ftp.isi.edu/in-notes/rfc2492.txt); Grenville Armitage and Peter Schulter; Jan. 1999; pp. 1-12.

RFC 2497: Transmission of IPv6 Packets over ARCnet Networks (Available at ftp://ftp.isi.edu/in-notes/rfc2497.txt); Ignatios Souvatzis; Jan. 1999; pp. 1-6.
RFC 2507: IP Header Compression (Available at ftp://ftp.isi.edu/in-notes/rfc2507.txt); Mikael Degermark, Bjorn Nordgren, and Stephen Pink; Feb. 1999; pp. 1-47.
RFC 2509: IP Header Compression over PPP (Available at ftp://ftp.isi.edu/in-notes/rfc2509.txt); Mathias Engan, Stephen L. Casner, and Carsten Bormann; Feb. 1999; pp. 1-10.
RFC 2516: A Method for Transmitting PPP Over Ethernet (PPPoE) (Available at ftp://ftp.isi.edu/in-notes/rfc2516.txt); Louis Mamakos, Kurt Lidl, Jeff Evarts, David Carrel, Dan Simone, and Ross Wheeler; Feb. 1999; pp. 1-17.
RFC 2521: ICMP Security Messages (Available at ftp://ftp.isi.edu/in-notes/rfc2521.txt); Phil Karn and William Allen Simpson; Mar. 1999; pp. 1-7.
RFC 2526: Reserved IPv6 Subnet Anycaset Addresses (Available at ftp://ftp.isi.edu/in-notes/rfc2526.txt); David B. Johnson and Stephen E. Deering; Mar. 1999; pp. 1-7.
RFC 2544: Benchmarking Methodology for Network Interconnect Devices (Available at ftp://ftp.isi.edu/in-notes/rfc2544.txt); Scott Bradner and Jim McQuaid, Editors; Mar. 1999; pp. 1-31.
RFC 2547: BGP/MPLS VPNs (Available at ftp://ftp.isi.edu/in-notes/rfc2547.txt); Eric C. Rosen and Yakov Rekhter; Mar. 1999; pp. 1-25.
RFC 2590: Transmission of IPv6 Packets over Frame Relay Networks Specification (Available at ftp://ftp.isi.edu/in-notes/rfc2590.txt); Alex Conta, Andrew Malis, and Martin Mueller; May 1999; pp. 1-19.
RFC 2615: PPP over SONET/SDH (Available at ftp://ftp.isi.edu/in-notes/rfc2615.txt); Andrew G. Malis and William Allen Simpson; Jun. 1999; pp. 1-10.
RFC 2637: Point-to-Point Tunneling Protocol (PPTP) (Available at ftp://ftp.isi.edu/in-notes/rfc2637.txt); Kory Hamzeh, Gurdeep Singh Pall, William Verthein, Jeff Thaarud, W. Andrew Little, and Glen Zorn; Jul. 1999; pp. 1-57.
RFC 2647: Benchmarking Terminology for Firewall Performance (Available at ftp://ftp.isi.edu/in-notes/rfc2647.txt); David Newman; Aug. 1999; pp. 1-26.
RFC 2661: Layer Two Tunneling Protocol "L2TP" (Available at ftp://ftp.isi.edu/in-notes/rfc2661.txt); Gurdeep Singh Pall, Bill Palter, Allan Rubens, W. Mark Townsley, Andrew J. Valencis, and Glen Zorn; Aug. 1999; pp. 1-80.
RFC 2663: IP Network Address Translator (NAT) Terminology and Considerations (Available at ftp://ftp.isi.edu/in-notes/rfc2663.txt); Pyda Srisuresh and Matt Holdrege; Aug. 1999; pp. 1-30.
RFC 2684: Multiprotocol Encapsulation over ATM Adaptation Layer 5 (Available at ftp://ftp.isi.edu/in-notes/rfc2684.txt); Dan Grossman and Juha Heinanen; Sep. 1999; pp. 1-23.
RFC 2685: Virtual Private Networks Identifier (Available at ftp://ftp.isi.edu/in-notes/rfc2685.txt); Barbara A. Fox and Bryan Gleeson; Sep.1999; pp. 1-6.
RFC 2694: DNS extensions to Network Address Translators (DNS_ALG) (Available at ftp://ftp.isi.edu/in-notes/rfc2694.txt); Pyda Srisuresh, George Tsirtsis, Praveen Akkiraju, and Andy Heffernan; Sep. 1999; pp. 1-29.
RFC 2702: Requirements for Traffic Engineering Over MPLS (Available at ftp://ftp.isi.edu/in-notes/rfc2702.txt); Daniel O. Awduche, Joe Malcolm, Johnson Agogbua, Mike O'Dell, and Jim McManus; Sep. 1999; pp. 1-29.
RFC 2709: Security Model with Tunnel-mode IPsec for NAT Domains (Available at ftp://ftp.isi.edu/in-notes/rfc2709.txt); Pyda Srisuresh; Oct. 1999; pp. 1-11.
RFC 2761: Terminology for ATM Benchmarking (Available at ftp://ftp.isi.edu/in-notes/rfc2761.txt); Jeffrey Dunn and Cynthia Martin; Feb. 2000; pp. 1-32.
RFC 2764: A Framework for IP Based Virtual Private Networks (Available at ftp://ftp.isi.edu/in-notes/rfc2764.txt); Bryan Gleeson, Juha Heinanen, Arthur Lin, Grenville Armitage, and Andrew G. Malis; Feb.; 2000; pp. 1-62.
RFC 2765: Stateless IP/ICMP Translation Algorithm (SIIT) (Available at ftp://ftp.isi.edu/in-notes/rfc2765.txt); Erik Nordmark; Feb. 2000; pp. 1-26.
RFC 2766: Network Address Translation—Protocol Translation (NAT-PT) (Available at ftp://ftp.isi.edu/in-notes/rfc2766.txt); George Tsirtsis and Pyda Srisuresh; Feb. 2000; pp. 1-21.
RFC 2775: Internet Transparency (Available at ftp://ftp.isi.edu/in-notes/rfc2775.txt); Brian E. Carpenter; Feb. 2000; pp. 1-18.
RFC 2784: Generic Routing Encapsulation (GRE) (Available at ftp://ftp.isi.edu/in-notes/rfc2784.txt);;Dino Farinacci, Toni Li, Stan Hanks, David Meyer and Paul Traina; Mar. 2000; pp. 1-9.
RFC 2815: Integrated Service Mappings on IEEE 802 Networks (Available at ftp://ftp.isi.edu/in-notes/rfc2815.txt); Mick Seaman, Andrew Smith, Eric Crawley, and John Wroclawski; May 2000; pp. 1-17.
RFC 2816: A Framework for Integrated Services Over Shared and Switched IEEE 802 LAN Technologies (Available at ftp://ftp.isi.edu/in-notes/rfc2816.txt); Anoop Ghanwani, Wayne Pace, Vijay Srinivasan, Andrew Smith, and Mick Seaman; May 2000; pp. 1-47.
RFC 2823: PPP over Simple Data Link (SDL) using SONET/SDH with ATM-like framing (Available at ftp://ftp.isi.edu/in-notes/rfc2823.txt); James Carlson, Paul Langner, Enrique J. Hernandez-Valencia, and James Manchester; May 2000; pp. 1-28.
RFC 2878: PPP Bridging Control Protocol (BCP) (Available at ftp://ftp.isi.edu/in-notes/rfc2878.txt); Mitsuru Higashiyama and Fred Baker; Jul. 2000; pp. 1-38.
RFC 2889: Benchmarking Methodology for LAN Switching Devices (Available at ftp://ftp.isi.edu/in-notes/rfc2889.txt); Robert Mandeville and Jerry Perser; Aug. 2000; pp. 1-35.
RFC 2893: Transition Mechanisms for IPv6 Hosts and Routers (Available at ftp://ftp.isi.edu/in-notes/rfc2893.txt); Robert E. Gilligan and Erik Nordmark; Aug. 2000; pp. 1-29.
RFC 2917: A Core MPLS IP VPN Architecture (Available at ftp://ftp.isi.edu/in-notes/rfc2917.txt); Karthik Muthukrishnan and Andrew Malis; Sep. 2000; pp. 1-16.
RFC 2960: Stream Control Transmission Protocol (Available at ftp://ftp.isi.edu/in-notes/rfc2960.txt); Randall R. Stewart, Qiaobing Xie, Ken Morneault, Chip Sharp, Hanns Juergen Schwarzbauer, Tom Taylor, Ian Rytina, Malleswar Kalla, Lixia Zhang, and Vern Paxson; Oct. 2000; pp. 1-134.
RFC 2962: An SNMP Application Level Gateway for Payload Address Translation (Available at ftp://ftp.isi.edu/in-notes/rfc2962.txt); Danny Raz Juergen Schoenwaelder, and Binay Sugla; Oct. 2000; pp. 1-20.
RFC 2979: Behavior of and Requirements for Internet Firewalls(Available at ftp://ftp.isi.edu/in-notes/rfc2979.txt); Ned Freed; Oct. 2000; pp. 1-7.
RFC 2993: Architectural Implications of NAT (Available at ftp://ftp.isi.edu/in-notes/rfc2993.txt); Tony Hain; Nov. 2000; pp. 1-29.
RFC 3022: Traditional IP Network Address Translator (Traditional NAT) (Available at ftp://ftp.isi.edu/in-notes/rfc3022.txt); Pyda Srisuresh and Kjeld Borch Egevang; Jan. 2001; pp. 1-16.
RFC 3027: Protocol Complications with the IP Network Address Translator (Available at ftp://ftp.isi.edu/in-notes/rfc3027.txt); Matt Holdrege and Pyda Srisuresh;Jan. 2001; pp. 1-20.
RFC 3031: Multiprotocol Label Switching Architecture (Available at ftp://ftp.isi.edu/in-notes/rfc3031.txt); Eric C. Rosen, Arun Viswanathan, and Ross Callon; Jan. 2001; pp. 1-61.
RFC 3032: MPLS Label Stack Encoding (Available at ftp://ftp.isi.edu/in-notes/rfc3032.txt); Eric C. Rosen, Dan Tappan, Yakov Rekhter, Guy Fedorkow, Dino Farinacci, Tony Li, and Alex Conta; Jan. 2001; pp. 1-23.
RFC 3034: Use of Label Switching on Frame Relay Networks Specification (Available at ftp://ftp.isi.edu/in-notes/rfc3034.txt); Alex Conta, Paul Doolan, and Andrew G. Malis; Jan. 2001; pp. 1-24.
RFC 3035: MPLS using LDP and ATM VC Switching (Available at ftp://ftp.isi.edu/in-notes/rfc3035.txt); Bruce Davie, Paul Doolan, Jeremy Lawrence, Keith McCloghrie, Yakov Rekhter, Eric Rosen, and George Swallow; Jan. 2001; pp. 1-20.
RFC 3053: IPv6 Tunnel Broker (Available at ftp://ftp.isi.edu/in-notes/rfc3053.txt); Alain Durand, Paolo Fasano, Ivano Guardini, and Domenick Lento; Jan. 2001; pp. 1-13.
RFC 3056: Connection of IPv6 Domains via IPv4 Clouds (Available at ftp://ftp.isi.edu/in-notes/rfc3056.txt); Brian E. Carpenter and Keith Moore; Feb. 2001; pp. 1-23.

RFC 3057: ISDN Q.921-User Adaptation Layer (Available at ftp://ftp.isi.edu/in-notes/rfc3057.txt); Ken Morneault, Malleswar Kalla, Selvam Rengasami, and Greg Sidebottom; Feb. 2001; pp. 1-66.

RFC 3070: Layer Two Tunneling Protocol (L2TP) over Frame Relay (Available at ftp://ftp.isi.edu/in-notes/rfc3070.txt); Vipin Rawat, Rene Tio, Rohit Verma, and Suhail Nanji; Feb. 2001; pp. 1-7.

RFC 3077: A Link-Layer Tunneling Mechanism for Unidirectional Links (Available at ftp://ftp.isi.edu/in-notes/rfc3077.txt); Emmanuel Duros, Walid Dabbous, Hidetaka Izumiyama, Noboru Fujii, and Yongguang Zhang; Mar. 2001; pp. 1-25.

RFC 3089: A SOCKS-based IPv6/IPv4 Gateway Mechanism (Available at ftp://ftp.isi.edu/in-notes/rfc3089.txt); Hiroshi Kitamura; Apr. 2001; pp. 1-12.

RFC 3102: Realm Specific IP: Framework (Available at ftp://ftp.isi.edu/in-notes/rfc3102.txt); Michael Borella, Jeffrey Lo, David Grabelsky, and Gabriel E. Montenegro; Oct. 2001; pp. 1-30.

RFC 3103: Realm Specific IP: Protocol Specification (Available at ftp://ftp.isi.edu/in-notes/rfc3103.txt); Michael Borella, David Grabelsky, Jeffrey Lo, and Kunihiro Taniguchi; Oct. 2001; pp. 1-54.

RFC 3104: RSIP Support for End-to-end IPsec (Available at ftp://ftp.isi.edu/in-notes/rfc3104.txt); Gabriel E. Montenegro and Michael Borella; Oct. 2001; pp. 1-19.

RFC 3105: Finding an RSIP Server with SLP (Available at ftp://ftp.isi.edu/in-notes/rfc3105.txt); James Kempf and Gabriel E. Montenegro; Oct. 2001; pp. 1-11.

RFC 3116: Methodology for ATM Benchmarking (Available at ftp://ftp.isi.edu/in-notes/rfc3116.txt); Jeffrey Dunn and Cynthia Martin; Jun. 2001; pp. 1-127.

RFC 3122: Extensions to IPv6 Neighbor Discovery for Inverse Discovery Specification (Available at ftp://ftp.isi.edu/in-notes/rfc3122.txt); Alex Conta; Jun. 2001; pp. 1-20.

RFC 3133: Terminology for Frame Relay Benchmarking (Available at ftp://ftp.isi.edu/in-notes/rfc3133.txt); Jeffrey Dunn and Cynthia Martin; Jun. 2001; pp. 1-24.

RFC 3134: Terminology for ATM ABR Benchmarking (Available at ftp://ftp.isi.edu/in-notes/rfc3134.txt); Jeffrey Dunn and Cynthia Martin; Jun. 2001; pp. 1-16.

RFC 3142: An IPV6-to-IPv4 Transport Relay Translator (Available at ftp://ftp.isi.edu/in-notes/rfc3142.txt); Jun-ichiro itojun Hagino and Kazu Yamamoto; Jun. 2001; pp. 1-11.

RFC 3177: IAB/IESG Recommendations on IPv6 Address Allocations to Sites (Available at ftp://ftp.isi.edu/in-notes/rfc3177.txt); Internet Architecture Board (IAB) and Internet Engineering Steering Group (IESG); Sep. 2001; pp. 1-10.

RFC 3193: Securing L2TP using IPsec (Available at ftp://ftp.isi.edu/in-notes/rfc3193.txt); Baiju V. Patel, Bernard Aboba, William Dixon, Glen Zorn, and Skip Booth; Nov. 2001; pp. 1-28.

RFC 3232: Assigned Numbers: RFC 1700 is Replaced by an On-line Database (Available at ftp://ftp.isi.edu/in-notes/rfc3232.txt); Joyce K. Reynolds, Editor; Jan. 2002; pp. 1-3.

RFC 3235: Network Address Translator (NAT)-Friendly Application Design Guidelines (Available at ftp://ftp.isi.edu/in-notes/rfc3235.txt); Daniel Senie; Jan. 2002; pp. 1-13.

RFC 3257: Stream Control Transmission Protocol Applicability Statement (Available at ftp://ftp.isi.edu/in-notes/rfc3257.txt); Lode Coene; Apr. 2002; pp. 1-13.

RFC 3286: An Introduction to the Stream Control Transmission Protocol (SCTP) (Available at ftp://ftp.isi.edu/in-notes/rfc3286.txt); Lyndon Ong and John Yoakum; May 2002; pp. 1-10.

RFC 3301: Layer Two Tunnelling Protocol (L2TP): ATM access network extensions (Available at ftp://ftp.isi.edu/in-notes/rfc3301.txt); Yves T'joens, Paolo Crivellari, and Bernard Sales; Jun. 2002; pp. 1-19.

RFC 3303: Middlebox communication architecture and framework (Available at ftp://ftp.isi.edu/in-notes/rfc3303.txt); Pyda Srisuresh, Jiri Kuthan, Jonathan Rosenberg, Andrew Molitor, and Abdallah Rayhan; Aug. 2002; pp. 1-34.

RFC 3304: Middlebox Communications (midcom) Protocol Requirements (Available at ftp://ftp.isi.edu/in-notes/rfc3304.txt); Richard Swale, Paul Sijben, Philip Mart, Scott Brim, and Melinda Shore; Aug.; 2002; pp. 1-9.

RFC 3308: Layer Two Tunneling Protocol (L2TP) Differentiated Services Extension (Available at ftp://ftp.isi.edu/in-notes/rfc3308.txt); Pat R. Calhoun, Wei Luo, Danny McPherson, and Ken Pierce; Nov. 2002; pp. 1-10.

RFC 3309: Stream Control Transmission Protocol (SCTP) Checksum Change (Available at ftp://ftp.isi.edu/in-notes/rfc3309.txt); Jonathan Stone, Randall R. Stewart, and Douglas Otis; Sep. 2002; pp. 1-17.

RFC 3336: PPP Over Asynchronous Transfer Mode Adaptation Layer 2 (AAL2) (Available at ftp://ftp.isi.edu/in-notes/rfc3336.txt); Bruce Thompson, Tmima Koren, and Bruce Buffam; Dec. 2002; pp. 1-16.

RFC 3337: Class Extensions for PPP over Asynchronous Transfer Mode Adaptation Layer 2 (AAL2) (Available at ftp://ftp.isi.edu/in-notes/rfc3337.txt); Bruce Thompson, Bruce Buffam, and Tmima Koren; Dec. 2002; pp. 1-7.

RFC 3346: Applicability Statement for Traffic Engineering with MPLS (Available at ftp://ftp.isi.edu/in-notes/rfc3346.txt); Jim Boyle, Vijay Gill, Alan Hannan, Dave Cooper, Daniel O. Awduche, Blain Christian, and Wai Sum Lai; Aug. 2002; pp. 1-14.

RFC 3348: Layer Two Tunneling Protocol (L2TP) Internet Assigned Numbers Authority IANA Considerations Update (Available at ftp://ftp.isi.edu/in-notes/rfc3348.txt); Mike Gahms and Raymond Cheng; Jun. 2002; pp. 1-6.

RFC 3378: EtherIP: Tunneling Ethernet Frames in IP Datagrams (Available at ftp://ftp.isi.edu/in-notes/rfc3378.txt); Russell Housley and Scott Hollenbeck; Sep. 2002; pp. 1-9.

RFC 3424: IAB Considerations for UNilateral Self-Address Fixing (UNSAF) Across Network Address Translation (Available at ftp://ftp.isi.edu/in-notes/rfc3424.txt); Leslie Diagle, Editor; Nov. 2002; pp. 1-9.

RFC 3437: Layer-Two Tunneling Protocol Extensions for PPP Link Protocol Negotiation (Available at ftp://ftp.isi.edu/in-notes/rfc3437.txt); W. Mark Townsley and Bill Palter; Dec. 2002; pp. 1-10.

RFC 3457: Requirements for IPsec Remote Access Scenarios (Available at ftp://ftp.isi.edu/in-notes/rfc3457.txt); Scott Kelly and Sankar Ramamoorthi, Editors; Jan. 2003; pp. 1-31.

RFC 3468: The Multiprotocol Label Switching (MPLS) Working Group decision on MPLS signaling protocols (Available at ftp://ftp.isi.edu/in-notes/rfc3468.txt); Loa Andersson and George Swallow; Feb. 2003; pp. 1-11.

RFC 3484: Default Address Selection for Internet version 6 (IPv6) (Available at ftp://ftp.isi.edu/in-notes/rfc3484.txt); Richard Draves; Feb. 2003; pp. 1-24.

RFC 3489: STUN—Simple Traversal of User Datagram Protocol (UDP) Through Network Address Translators (NATs) (Available at ftp://ftp.isi.edu/in-notes/rfc3489.txt); Jonathan Rosenberg, Joel Weinberger, Christian Huitema, and Rohan Mahy; Mar. 2003; pp. 1-47.

RFC 3496: Protocol Extension for Support of Asynchronous Transfer Mode (ATM) Service Class-aware Multiprotocol Label Switching (MPLS) Traffic Engineering (Available at ftp://ftp.isi.edu/in-notes/rfc3496.txt); Andrew G. Malis and Tony Hsiao Mar. 2003; pp. 1-6.

RFC 3511: Benchmarking Methodology for Firewall Performance (Available at ftp://ftp.isi.edu/in-notes/rfc3511.txt); Brooks Hickman, David Newman, Saldju Tadjudin, and Terry Martin; Apr. 2003; pp. 1-34.

RFC 3513: Internet Protocol Version 6 (IPv6) Addressing Architecture (Available at ftp://ftp.isi.edu/in-notes/rfc3513.txt); Robert M. Hinden and Stephen E. Deering; Apr. 2003; pp. 1-26.

RFC 3518: Point-to-Point Protocol (PPP) Bridging Control Protocol (BCP) (Available at ftp://ftp.isi.edu/in-notes/rfc3518.txt); Mitsuru Higashiyama, Fred Baker, and Tawei Liao; Apr. 2003; pp. 1-40.

RFC 3519: Mobile IP Traversal of Network Address Translation (NAT) Devices (Available at ftp://ftp.isi.edu/in-notes/rfc3519.txt); Henrik Levkowetz and Sami Vaarala; Apr. 2003; pp. 1-34.

RFC 3531: A Flexible Method for Managing the Assignment of Bits of an IPv6 Address Block (Available at ftp://ftp.isi.edu/in-notes/rfc3531.txt); Marc Blanchet; Apr. 2003; pp. 1-7.

* cited by examiner

AUTOMATIC DISCOVERY OF NETWORK CORE TYPE

CROSS-REFERENCE TO RELATED PATENT APPLICATIONS

This present application claims priority to several copending U.S. provisional applications that were all filed on Jun. 24, 2002 and also are each incorporated by reference in their entireties herein. The copending U.S. provisional applications, which are incorporated by reference in their entireties herein, and to which priority is claimed, are listed by the following U.S. serial numbers and titles:

60/391,098—"Auto Topology Discover Method for Layer 3 Networks"
60/391,121—"Method for Automatic Discovery of Network Core Type"
60/391,053—"Method for Determination of Virtual Circuit Characteristics in Layer 3 Networks"

TECHNICAL FIELD

The present disclosure generally is related to network architectures and, more particularly, is related to systems and methods for discovering network architectures through detection of the network's capability for forwarding various packets.

BACKGROUND

Generally, networking devices and/or processes are divided into abstract layers to simplify understanding of the complexities of communication and to facilitate easier development and interfacing of the devices and/or processes with other devices and/or processes. The seven layer OSI (Open Systems Interconnect) model is a commonly used abstraction that includes: the level one physical layer, the level two data link layer, the level three network layer, the level four transport layer, the level five session layer, the level six presentation layer, and the level seven application layer. Generally, lower level protocol layers provide services for transporting higher level protocol layers.

For instance, in the past many service providers deployed various connection-oriented packet networks (such as X.25, frame relay, and/or ATM) that provided customers with the ability to forward traffic across permanent and/or switched virtual circuits (PVCs and/or SVCs). These connection-oriented, virtual-circuit packet networks of X.25, frame relay, and/or ATM (Asynchronous Transfer Mode) may have layer three functionality in the signaling messages used for establishing and releasing the virtual circuits. In addition, X.25 packets generally include level three packet layer procedures (PLP) for carrying user data. Frame relay and ATM at least partially evolved from X.25 but with a design goal of having less overhead and more efficiency than X.25. Thus, frame relay and ATM generally provide what is considered to be layer two service for carrying user data. However, these connection-oriented, virtual-circuit packet networks generally are known to provide a forwarding capability that generally passes information from other protocols (potentially at higher layers of the OSI model) inside packets, frames and/or cells of X.25, frame relay and/or ATM, respectively.

One skilled in the art should be aware of the similarities and differences among the connection-oriented packet-switching technologies of X.25, frame relay, and ATM as well as the common utilization of these virtual-circuit packet-switching technologies to provide connectivity for carrying layer three network protocols, such as but not limited to the Internet Protocol (IP). While frame relay and ATM generally are known as layer two networks, X.25 generally has a level three network layer. However, as a connection-oriented packet-switching technology, X.25 has similar characteristics to the layer two networks of frame relay and ATM with regard to carrying and/or encapsulating network layer packets of protocols such as IP over virtual circuits. In addition, CCITT/ITU (Comite Consultatif Internationale de Telegraphie et Telephonie/International Telecommunications Union) recommendation X.25 defines a DTE-DCE (Data Terminal Equipment—Data Communications Equipment) interface (or a user-network interface) to a packet switching network with the DTE-DCE interface based upon a virtual-circuit paradigm, and the term "X.25 network" is often used to mean a network that provides an external X.25 DTE-DCE interface.

With the increased deployment of certain layer three network protocols, especially including the Internet Protocol or IP (including both IP version 4 or IPv4 as well as IP version 6 or IPv6), customers have often used the forwarding capabilities of connection-oriented, virtual-circuit packet networks to provide interconnection of IP devices and networks located in distant locations. Usually, layer three IP networking technology may have developed on local area networks (LANs) within different buildings that later were interconnected using wide-area networks (WANs) often comprising connection-oriented, virtual-circuit packet-switching technologies.

In contrast to the connection-oriented, virtual-circuit packet-switching of X.25, frame relay, and/or ATM, IP networks primarily provide connectionless, datagram service. In IP networks, the packet switches usually are called routers. Connection-oriented, virtual-circuit packet-switching networks generally have a one-to-one or point-to-point relationship between the termination points of a virtual circuit. Unlike the connection-oriented networks, connectionless and/or datagram packet-switching networks generally do not have connections or circuits that establish a relationship between one termination point (or endpoint) and another termination point (or endpoint).

With the advent of newer technology such as but not limited to Multi-Protocol Label Switching (MPLS), many service providers have been adding a layer three routed core to WAN technologies that previously had primarily just provided connection-oriented service using the virtual-circuit packet-switching technologies. Normally, service providers are deploying the new technology of routed cores in newer technology packet switching networks such as the layer two networks of frame relay and ATM; however, nothing prevents a service provider from adding a connectionless routed core to other connection-oriented networks such as, but not limited to, a network using the older connection-oriented, packet-switching technology of X.25. Prior to the more or less ubiquitous adoption of IP as the common layer three protocol for most networks, the plethora of layer three protocols made it relatively impractical for network service providers to implement layer three routing services within the service provider WANs. In addition to changes in the regulatory environment, the general industry standardization on IP as the common layer three protocol makes it more feasible for service providers to add IP routing functionality to networks that previously had primarily just provided connection-oriented, virtual-circuit packet-switching services such as but not limited to the services provided by the layer two networks of frame relay and ATM.

Unfortunately, adding higher layer services such as an IP routing core to a service provider's network creates some additional problems for customers. As described previously and as is well-known in the art, IP is a connectionless datagram protocol (or more accurately IP provides connectionless datagram service). As a result, IP generally does not establish a one-to-one relationship between two points in an IP network. Despite this general lack of a one-to-one relationship between IP devices, the relatively higher costs of connecting networks over the relatively longer distances of a wide area usually result in network configurations where all or almost all the traffic between two locations goes through one IP device at one location and through another IP device at the other location (at least when the complexities of redundant communication paths and/or devices are ignored). In the case of a virtual-circuit packet-switching network that just provides connection-oriented services, customers can use various mechanisms to easily detect the "health" of the network from the end points of the virtual circuit. Using these mechanisms, network administrators could quickly determine whether a remote site had lost connectivity or was suffering performance degradations.

Usually isolation of network failures involves evaluating the status of network devices and communication lines at the interface of ownership between the networks. Thus, customers like to be able to isolate a network problem to determine whether the problem exists in the customer's equipment and/or network or exists in the service provider's equipment and/or network. Usually the termination points of a WAN are common locations for the legal demarcation between customer equipment and service provider equipment. Thus, detecting the end points of the WAN as well as monitoring the health status and performance of these end points usually is important for quickly isolating network problems and assigning ownership of the problem such that the proper entity (service provider or customer) assigns the necessary human and technical resources to bypass and/or resolve the network problem.

The addition of an IP routing core, which introduced connectionless datagram service into the packet networks of service providers, prevents the previously easy detection of the end devices on a WAN and reduces the visibility of the customer's network administrator to network health and performance information. Because the addition of a routed core to service provider wide-area packet networks has undesirable drawbacks, a heretofore unaddressed need exists in the industry to automatically detect whether such a network has a routed core architecture and/or to compensate for the inadequacies of the architecture in providing network health and/or performance information.

SUMMARY

Systems and methods for automatically detecting the configuration of communication facilities are provided. One embodiment of such a involves logic configured to detect whether one or more test packets with special or particular characteristics has been or is no longer expected to be received. Then a determination can be made as to whether the communication facilities are capable of passing (or forwarding) the test packet(s) as opposed to not passing (or filtering) the test packet(s). In some cases, the test packet(s) may be silently discarded by the communication facilities such that the test packet(s) will no longer be expected to be received after expiration of a timeout counter.

One embodiment of such a method for detecting the configuration of communication facilities generally involves detecting whether one or more test packets with special or particular characteristics has been or is no longer expected to be received. Then a determination can be made as to whether the communication facilities are capable of passing (or forwarding) the test packet(s) as opposed to not passing (or filtering) the test packet(s). In some cases, the test packet(s) may be silently discarded by the communication facilities such that the test packet(s) will no longer be expected to be received after expiration of a timeout counter. In other cases, devices and/or processes (such as a filtering/forwarding entity) in the communication facilities may generate an error or control message or otherwise react in some way that indicates the test packet(s) will not be allowed to pass through the communication facilities. Based on these test packet(s), the configuration of communication facilities can be determined to be connection-oriented or connectionless. The characterization of the network or communication facilities as connection-oriented or connectionless depends on among other things the protocol level or layer at which the test packet(s) are formed with connection-oriented and connectionless generally describing the services provided to one protocol layer by another protocol layer.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The invention can be better understood with reference to the following drawings. The components in the drawings are not necessarily to scale. Moreover, in the drawings, like reference numerals designate corresponding parts throughout the several views. Also, the flow charts only show one preferred embodiment of steps that may be used in the present invention. One skilled in the art will be aware that flow chart steps may often be performed in different orders and may even be performed in parallel in some cases. All these variations on acceptable orderings of the steps are intended to be with the scope of the present invention.

DETAILED DESCRIPTION

Often customers or subscribers are not completely aware of the architecture of the networks used by service providers. Systems and methods, such as the embodiments described herein, can be used to identify differences in various network architectures and configurations. By allowing customers to identify at least some of the network architecture characteristics of service providers, customers and customer premises equipment (CPE) can select a proper strategy for managing and/or monitoring the network and its performance.

In general, automatic identification and/or discovery of a network configuration is determined by sending and/or receiving test packets with special characteristics. Certain configurations of networks and/or communication facilities will allow these test packets to pass through the communication facilities, while other configurations will filter, block, and/or otherwise react to these test packets in a way that indicates that the communications facilities will not allow these test packets to pass. Based on receiving the test packets and/or based on receipt or non-receipt of responses to the test packets, certain reasonable implications about the configuration of the network and/or communication facilities can be inferred. One skilled in the art will be aware that such test packets can be generated by a network device at various times (including but not limited to initial device configuration and during periodic verifications of the network configuration) to attempt to automatically discover characteristics of the network and/or communication facilities including, but not limited to, the network core type.

Figure 1:
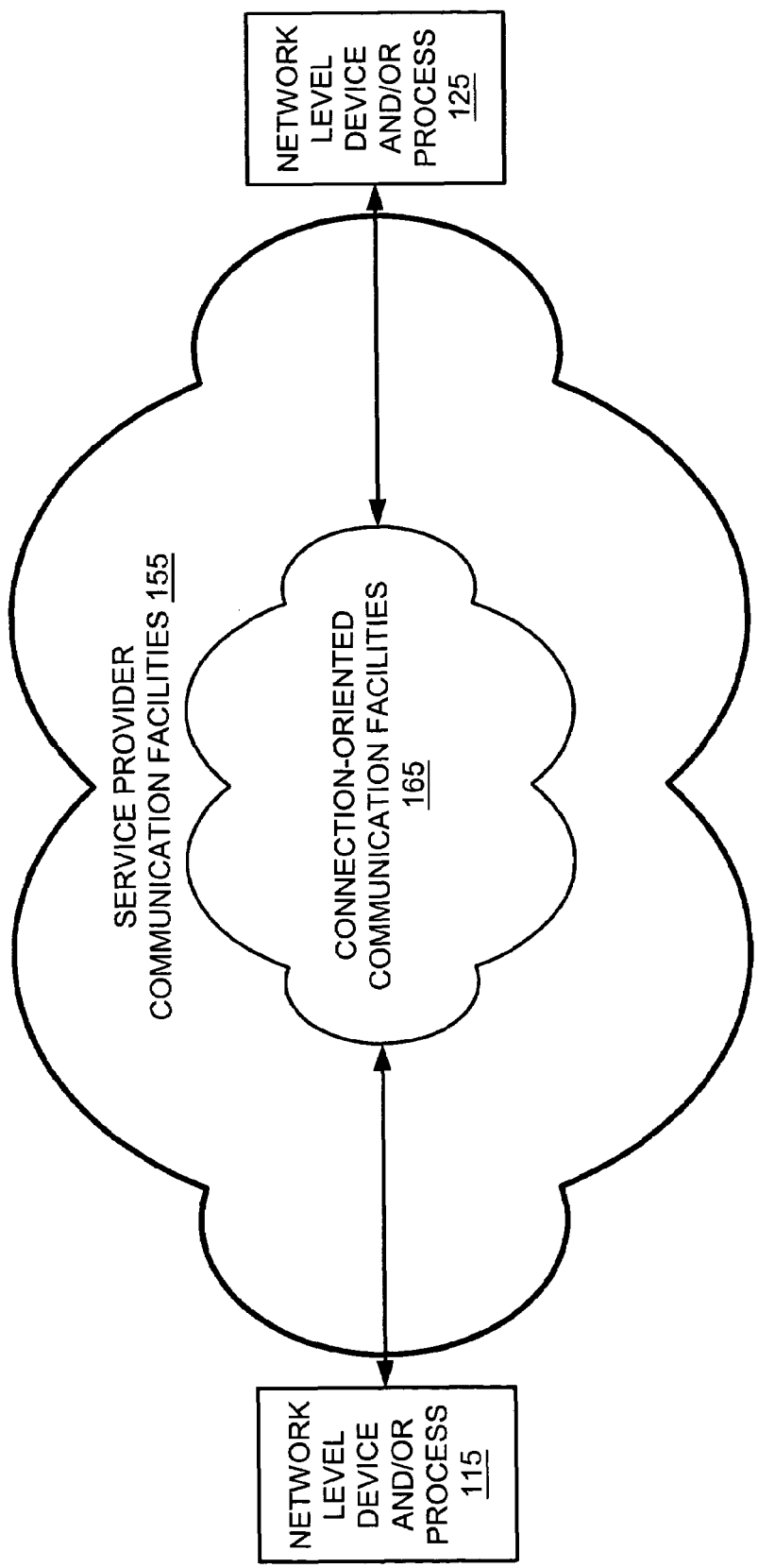
FIG. 1 is a simplified block diagram of two pieces of customer premises equipment (CPE) that are connected by service provider communication facilities, which further comprise connection-oriented communication facilities providing connection-oriented service in transporting network level packets between the two CPE devices.

Before describing the network testing needed to identify various network types, some possible configurations for networks and/or communication facilities are described with respect to FIGS. 1-5, which provide some non-limiting examples and high-level overviews of various types of networks and/or communication facilities that may be identified using the systems and methods described herein. One non-limiting example of a network configuration is shown in FIG. 1, which portrays network level devices and/or processes 115 and 125 that are connected to service provider communication facilities 155. In the preferred embodiments, the network level devices and/or processes 115 and 125 use at least one version of the Internet Protocol (IP) such as, but not limited to, IP version 4 (IPv4) or IP version 6 (IPv6). The service provider communication facilities 155 generally comprise the service provider wires, equipment, hardware, software, and/or processes that facilitate communication between customer demarcation points where customer premises equipment (CPE) is connected to the service provider communication facilities 155. In FIG. 1, the service provider communication facilities 155 comprise connection-oriented communication facilities 165, which provide connection-oriented service to customer premises equipment such as, but not limited to, network level devices and/or processes 115 and 125.

"Connection-oriented" and "connectionless" are two terms known by one of ordinary skill in the art that describe the service capability provided to higher-layer peer entities between two lower-layer peer entities in the OSI model. Internet Request For Comments (RFC) 787, entitled "Connectionless Data Transmission Survey/Tutorial", is incorporated by reference in its entirety herein and provides an overview of the OSI layers, peer entities, and connection-oriented versus connectionless communications as well as other topics. Furthermore, the following books may describe connection-oriented and connectionless communications as well as other topics and are each incorporated by reference in their entireties herein: "Computer Networks: Protocols, Standards, and Interfaces, Second Edition" by Uyless Black with ISBN 0131756052 and a listed publication date in 1993, "Data & Computer Communications, Sixth Edition" by William Stallings with ISBN 0130843709 and a listed publication date in 1999, and "Computer Networks, Fourth Edition" by Andrew S. Tanenbaum with ISBN 0130661023 and a listed publication date in 2002.

As a non-limiting example, peer entities in X.25, frame relay, and ATM networks of service providers provide connection-oriented service to higher level entities such as layer three or network level devices and/or processes 115 and 125. Therefore, a non-limiting example of the connection-oriented communication facilities 165 is an X.25, frame relay, or ATM network (including combinations of X.25, frame relay, and ATM) of service providers. However, one skilled in the art will realize that there are many other types of connection-oriented communication facilities 165. Perhaps the simplest form of connection-oriented communication facility 165 is a single wire. In a slightly more complex scenario, one or more wires may be connected through various types of active network elements, such as but not limited to, repeaters and/or multiplexers, to provide a circuit or leased line that is a connection-oriented communication facility 165 between two customer premises devices (such as but not limited to network level devices and/or processes 115 and 125). To improve on the efficiency of network usage, circuit-switching may be added to connection-oriented communication facilities 165, such that a first CPE device dials-up or establishes a call or connection to a second CPE device.

Further network efficiency is gained by introducing packet switching that statistically multiplexes data onto the network generally based upon demand. Virtual-circuit packet-switching technologies, such as but not limited to X.25, frame relay, and ATM, also can provide connection-oriented communication facilities 165 that virtually emulate the behavior of circuit-switched connections while still allowing some of the efficiency advantages of statistical multiplexing in packet switching. In contrast, datagram packet switching technologies, such as but not limited to IP (including various versions of IP such as IPv4 and IPv6), provide a connection-less communication facility to higher layer protocols. In addition, hybrid technologies such as Multi-Protocol Label Switching (MPLS) try to combine at least partial connection-oriented communication capabilities with the connectionless datagram service of IP by carrying a label in each packet in addition to the IP addresses used in connectionless IP datagram service. Thus, although the preferred embodiments will be described primarily with respect to connection-oriented virtual-circuit technologies (such as but not limited to X.25, frame relay, and ATM), one skilled in the art should be aware that the concepts described herein apply to detecting whether the service provider communication facilities 155 between customer premises equipment (such as but not limited to network level devices and/or processes 115 and 125) provide connection-oriented communication facilities 165.

Figure 2:
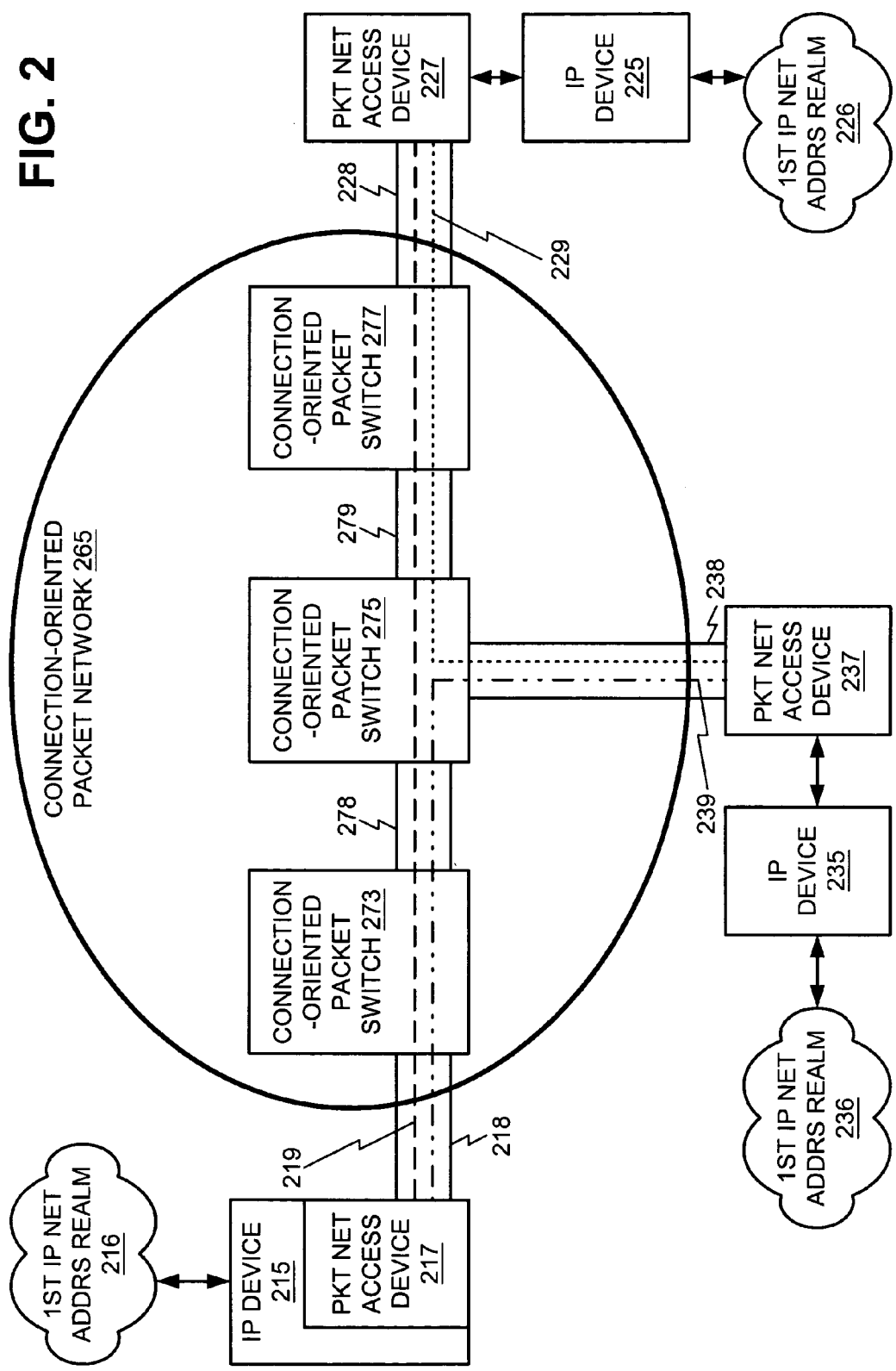
FIG. 2 is a block diagram of one non-limiting example of the configuration from FIG. 1, and shows a connection-oriented packet network with virtual circuits providing connectivity to CPE.

FIG. 2 shows a connection-oriented packet network 265 that may be thought of as one specific non-limiting example of connection-oriented communication facilities 165. The Internet Protocol (IP) generally is considered to be a network level or layer three protocol. Thus, IP devices 215, 225, and 235 are non-limiting examples of network level devices and/or processes 115 and 125. Each IP device 215, 225, and 235 may be connected to an IP network including first IP network address realms 216, 226, and 236, respectively. According to RFC 2663, which is entitled "NAT Terminology and Considerations" and is incorporated in its entirety by reference herein, "An address realm is a network domain in which the network addresses are uniquely assigned to entities such that datagrams can be routed to them. [In general, r]outing protocols used within the network domain are responsible for finding routes to entities given their network addresses." Thus, in FIG. 2, IP networks 216, 226, and 236 generally may be part of the same first IP address realm, where IP packets generally may be routed between and among devices 215, 225, and 235 as well as IP networks 216, 226, and 227 that are part of the first IP address realm. Although this use of IP address realms adds complexity to FIG. 2, the importance of IP address realms becomes relevant when considerations of virtual private networks (VPNs) and tunneling are taken into account. Historically, customers used connection-oriented packet networks 265 of service providers to connect IP devices that generally were part of the same IP address realm (i.e., the first IP network address realm). Such configurations generally would be used to provide IP routed connectivity between remote locations of customer Local Area Networks (LANs) using a generally wide-area network (WAN) technology such as X.25, frame relay, or ATM. Thus, in these historical networks IP devices 215, 225, and 235 generally would be IP routers although other types of devices also could be used.

To connect IP devices 215, 225, and 235 to the connection-oriented packet network 265, various types of packet network access devices 217, 227, and 237 respectively are used to connect to service provider access lines 218, 228, and 238 respectively. In X.25, these packet network access devices generally are called PADs (Packet Assembler Disassemblers), while in frame relay these packet network access devices generally are called FRADs (Frame Relay Access Devices). As shown in FIG. 2, one skilled in the art will be aware that the packet network access device 217 functionality can be integrated into an IP device 215 or can be a separate stand-alone unit such as packet network access devices 227 and 237.

As shown in FIG. 2, each service provider access line is shown with multiple virtual circuits such that data is statistically multiplexed into the access line. First, access line 218 includes virtual circuit 219 between packet network access device 217 and packet network access device 227 as well as virtual circuit 239 between packet network access device 217 and packet network access device 237. Next, access line 228 includes virtual circuit 219 between packet network access device 217 and packet network access device 227 as well as virtual circuit 229 between packet network access device 227 and packet network access device 237. Finally, access line 238 includes virtual circuit 229 between packet network access device 227 and packet network access device 237 as well as virtual circuit 239 between packet network access device 217 and packet network access device 237. Such a complete connection of virtual circuits between every two packet network access devices establishes a complete mesh network. One skilled in the art will recognize that the preferred embodiments of the present invention do not require complete mesh networks.

Within the connection-oriented packet network 265, connection-oriented packet switches 273, 275, and 277 switch packets according to headers or labels on the packet. In some embodiments, connection-oriented packet switches 273, 275, and 277 would be X.25, frame relay, and/or ATM switches, but these are just non-limiting examples of connection-oriented packet switches. A virtual circuit may consist of one or more links or segments through zero or more packet switches. Thus, a link or segment generally connects an endpoint of a virtual circuit to a packet switch, a packet switch to another packet switch, or an endpoint to another endpoint if there are no packet switches in the virtual circuit between the two end points. One skilled in the art should be aware that CCITT/ITU recommendation X.25 actually defines a DTE-DCE interface that may be employed without actually using a packet switch. In addition, frame relay and ATM also define user-network interfaces that can be used in a similar fashion without a packet switch.

Generally in virtual-circuit packet switching, packets belonging to a virtual-circuit follow the same path through the packet-switching network such that packets generally arrive at the destination in the same order that the packets were transmitted. This in-order delivery of packets for connection-oriented packet networks is similar to the in-order delivery of information on circuit-switched connections, such that connection-oriented packet networks 265 generally provide a virtual-circuit packet-switching capability. In contrast, connectionless packet delivery (as found in IP datagram service) generally does not guarantee a nearly in-order delivery of packets as each packet may individually take a different route through the network. Therefore, the various dashed lines in FIG. 2 for virtual circuits 219, 229, and 239 indicate that there generally is a defined path for each packet belonging to a virtual circuit. However, this path may be found on an access line 218, 228, and 238 or on a trunk line 278 and 279 that is statistically shared by multiple virtual circuits.

Traffic belonging to one virtual circuit generally is identified on a link or segment by an identifier or label that may only have local significance for the link, segment, or hop. As one skilled in the art should be aware, virtual-circuit packet switches (such as X.25, frame relay, and ATM packet switches) often swap or exchange these identifiers, labels, or tags on the packets as the packets traverse from an input to an output of a switch. Thus, these types of virtual-circuit packet switches are sometimes known as label switches. In X.25 these labels or identifiers generally are known as logical channel numbers (LCNs), while the labels or identifiers in frame relay generally are known as data link connection identifiers (DLCIs). In ATM, the labels generally are known as virtual path identifiers (VPIs) and/or virtual circuit identifiers (VCIs). In MPLS, identifiers for segments of a label switched path (LSP) generally are known as labels and/or tags with label switched paths (LSPs) being somewhat similar to virtual circuits (VCs). Because a virtual circuit generally involves one or more links or segments through zero or more packet switches, a virtual circuit generally can be identified by the series of identifiers or labels used on each link or segment together with identification of the ports of any packet switches which connect the links or segments over which a virtual circuit passes.

One skilled in the art should be aware that the values for labels or tags used on each link or segment of a virtual circuit in connection-oriented packet switching may have global significance, but often only have local significance on a link or segment. Thus, the LCNs, DLCIs, VPIs/VCIs, labels, tags, identifiers, and/or addresses of connection-oriented virtual-circuit packet-switching often only have local significance on a link or segment of a virtual circuit. In contrast, the destination network addresses in IP datagrams are more likely to have global significance within the network (or at least within an address realm of a network) that may span multiple hops through one or more layer-three packet switches or routers.

In the case of virtual-circuit packet switching with packets that have addresses, labels, or tags, which only have local significance on a link or segment of a virtual circuit, normally rerouting during failures involves rerouting one or more segments or links of a virtual circuit from a failed link or segment to one or more operational links or segments. Generally, each packet in virtual-circuit packet switching follows the same paths over the virtual circuit, and rerouting of a virtual circuit or portions of a virtual circuit generally involves changing the path followed by each new packet communicated over the virtual circuit. However for IP, the inclusion of a network address (which is more likely to have global significance) generally within each IP packet, allows the connectionless datagram routing of IP to provide for individual routing of each IP packet along a potentially different path such that each IP packet may be individually rerouted in the event of a network failure condition.

Furthermore, one skilled in the art should be aware that X.25, frame relay, and/or ATM may actually provide some layer three services especially with respect to the packet layer procedures (PLP) of X.25. Thus, the LCNs of X.25 arguably could be called layer three labels. However, all three of these technologies generally relate to connection-oriented packet switching (usually using a label-switching paradigm) that commonly may be used to carry packets of a network level protocol such as IP. Each IP packet or datagram generally includes at least a destination IP address. In addition, X.25, frame relay, and ATM switched virtual circuits (SVCs) may be established using addresses such as but not limited to X.121 and/or E.164 addresses that generally may have global significance for a network. Whether virtual circuits are established dynamically as SVCs or statically as PVCs, the LCN, DLCI, and/or VPI/VCI labels or tags of X.25, frame relay, and/or ATM usually are only utilized for local identification of data traffic on a segment or link that belongs to a virtual circuit. Unlike IP addresses, the LCN, DLCI and/or VPI/VCI labels or tags generally do not contain enough information for independent routing of each X.25, frame relay and/or ATM packet, respectively.

Several Internet RFCs describe various aspects of carrying IP and IP-related traffic over various packet and label switching technologies as well as other topics. The following RFCs generally relate to X.25 as well as other technologies and are each incorporated by reference in their entireties herein: RFC 877, entitled "A Standard for the Transmission of IP Datagrams Over Public Data Networks"; RFC 1356, entitled "Multiprotocol Interconnect on X.25 and ISDN in the Packet Mode"; RFC 874, entitled "A Critique of X.25"; RFC 1086, entitled "ISO-TPO bridge between TCP and X.25"; RFC 1613, entitled "cisco Systems X.25 over TCP (XOT)"; RFC 1053, entitled "Telnet X.3 PAD Option"; RFC 1090, entitled "SMTP on X.25"; RFC 1381, entitled "SNMP MIB Extension for X.25 LAPB"; and RFC 1382, entitled "SNMP MIB Extension for the X.25 Packet Layer". In general, telecommunications carriers initially developed separate networks for carrying circuit-switched voice from analog POTS (Plain Old Telephone Service), access lines, while digital data services generally may have been accessed through leased lines connected into X.25 packet-switched networks. The Basic Rate Interface (BRI) and the Primary Rate Interface (PRI) of Narrowband Integrated Services Digital Network (ISDN or N-ISDN) was developed to provide a single digital access line that integrated access to circuit-switching and packet-switching services of local exchange carriers (LECs) and interexchange carriers (IXCs). Thus, the narrowband ISDN services not only supported circuit-switched bearer capabilities including speech, 3.1 KHz audio, 56 kbps, and 64 kbps, but generally also allowed for the carriage of X.25 over both D-channels and B-channels.

The common standard for layer two on the D-channel is known as the Link Access Procedure for the D-channel or LAPD as generally described in CCITT/ITU standard Q.921. In North America, X.25 over a D-channel of ISDN normally used a physical layer of alternate mark inversion (AMI) for early proprietary BRI loops and PRI lines delivered over standard T1. Later, the 2B1Q (2 Binary, 1 Quaternary) physical layer line signaling was chosen as the standardized North American U-Interface for BRI access lines, while AMI T1 for PRI was replaced with High bit-rate Digital Subscriber Line (HDSL) T1 that also uses 2B1Q. At layer two, the narrowband ISDN D-channel of BRI and/or PRI can use Q.921 LAPD as a layer two protocol to carry information conforming to the layer three X.25 packet layer protocol (PLP). Furthermore, a narrowband ISDN B-channel of BRI and/or PRI can use the common layer two protocol of Link Access Procedure-Balanced (LAPB) to carry layer three X.25 PLP packets to an X.25 switch. LAPD generally was derived from some of the ideas in LAPB with both LAPD and LAPB generally being variations of the common layer two protocol of High-level Data Link Control (HDLC). Generally, LAPB is used as the layer two protocol for X.25 over leased lines and circuit-switched connections. LAPD was used on an ISDN D-channel instead of LAPB to help facilitate statistically time-division multiplexing or statistical multiplexing of the X.25 protocol with other D-channel protocols such as, but not limited to, ITU/CCITT Q.931, which is the common layer three signaling protocol for establishing and releasing connections in narrowband ISDN.

The book entitled "Data Link Protocols" by Uyless Black with ISBN 013204918X and a listed publication date in 1993 is incorporated by reference in its entirety herein and describes various data link level protocols generally associated with layer two of the OSI model including, but not limited to, High-level Data Link Control (HDLC), Link Access Procedure-Balanced (LAPB), ITU-T/CCITT Q.921 Link Access Procedure for the ISDN D-channel (LAPD), IEEE 802.3 CSMA/CD, IEEE 802.4 Token Bus, IEEE 802.5 Token Ring, IEEE 802.6 Metropolitan Area Network (MAN), IEEE 802.2 Logical Link Control (LLC), ITU-T/CCITT Q.922 Link Access Procedure for Frame Mode Bearer Services (LAPF), and the Point-to-Point Protocol (PPP). In addition, ISDN, X.25, and other technologies are described in the following books, which are each incorporated by reference in their entireties herein: "ISDN and Broadband ISDN with Frame Relay and ATM, Fourth Edition" by William Stallings with ISBN 0139737448 and a listed publication date in 1998, "X.25 and Related Protocols" by Uyless Black with ISBN 0818689765 and a listed publication date in 1991, and "The X Series Recommendations: Standards for Data Communications, Second Edition" by Uyless Black with ISBN 0070055939 and a listed publication date in 1995. Furthermore, another packet service known as Switched Multi-megabit Data Service (SMDS) is also capable of carrying IP datagrams as described in RFC 1209, entitled "The Transmission of IP Datagrams over the SMDS Service", which is incorporated by reference in its entirety herein.

In addition, the development work on narrowband ISDN had an impact on the two newer connection-oriented packet-switching technologies of frame relay and ATM. Specially, the Q.922 Link Access Procedure for Frame-mode bearer services (LAPF) layer two protocol that defines the basis for frame relay is an adaptation of the Q.921 LAPD protocol of narrowband ISDN. Specifically, the LAPF frame generally is similar to the LAPD frame with the frame relay data link connection identifier (DLCI) label or tag of Q.922 LAPF being the combination of the Service Access Point Identifier (SAPI) and Terminal Endpoint Identifier (TEI) of Q.921 LAPD. Also, to better handle real-time traffic, the shorter 53 octet cells of ATM were developed with only a header cyclic redundancy code (CRC) instead of a CRC at the end of a long packet as is used in frame relay. This shorter packet/cell size of ATM allows lower-delay cut-through forwarding of short ATM cells in which outbound forwarding of a cell can begin as soon as the VPI/VCI is verified to select the proper outbound ATM switch port without having to receive a long packet in its entirety before forwarding the first outbound octet as generally occurs in a store-and-forward frame relay switch. In addition, the desire to use the improved real-time delay characteristics of ATM to more efficiently carry traditional circuit-switching applications, such as but not limited to voice, over the statistical multiplexing of ATM led to the common layer three Q.931 call signaling protocol of narrowband ISDN being extended to support the necessary Quality of Service (QoS) mechanisms in the layer three Q.2931 call signaling protocol for switched virtual circuits (SVCs) in ATM.

The following RFCs describe some of the standards for carry IP over frame relay as well as other issues with each of the following RFCs being incorporated by reference in its entirety herein: RFC 1294, entitled "Multiprotocol Interconnect over Frame Relay"; RFC 1490, entitled "Multiprotocol Interconnect over Frame Relay"; RFC 2427, entitled "Multiprotocol Interconnect over Frame Relay"; RFC 2590, entitled "Transmission of IPv6 Packets over Frame Relay Networks Specification"; RFC 1293, entitled "Inverse Address Resolution Protocol"; and RFC 2390, entitled "Inverse Address Resolution Protocol". The Inverse ARP protocol generally is used by a near-end or local frame relay device supporting the IP protocol at one end of a frame relay virtual circuit to find out the IP address of a far-end or remote frame relay device supporting the IP protocol at the other end of the frame relay virtual circuit. Furthermore, as described in RFCs 1293 and 2390, Inverse ARP or "ARP may be used in any network that provides destination hardware addresses without indicating corresponding protocol addresses."

Moreover, the following RFCs describe some of the standards for carrying IP over ATM as well as other issues with each of the following RFCs being incorporated by reference in its entirety herein: RFC 1483, entitled "Multiprotocol Encapsulation over ATM Adaptation Layer 5"; RFC 2684, entitled "Multiprotocol Encapsulation over ATM Adaptation Layer 5"; RFC 1755, entitled "ATM Signaling Support for IP over ATM"; RFC 1932, entitled "IP over ATM: A Framework Document"; RFC 1577, entitled "Classical IP and ARP over ATM"; RFC 2225, entitled "Classical IP and ARP over ATM"; and RFC 2492, entitled "IPv6 over ATM Networks". In addition, the following RFCs describe some of the basic concepts of frame relay and ATM switches and are each incorporated by reference in their entireties herein: RFC 3133, entitled "Terminology for Frame Relay Benchmarking"; RFC 2761, entitled "Terminology for ATM Benchmarking"; RFC 3116, entitled "Methodology for ATM Benchmarking"; and RFC 3134, entitled "Terminology for ATM ABR Benchmarking". In addition, RFCs 1577 and 2225 particularly describe the utilization of Inverse ARP or InARP to ATM networks as Inverse ATM ARP or InATMARP.

Furthermore, the following books describe frame relay, ATM, and other networking technologies and are each incorporated by reference in their entireties herein: "ISDN and Broadband ISDN with Frame Relay and ATM, Fourth Edition" by William Stallings with ISBN 0139737448 and a listed publication date in 1998, "Frame Relay: Principles and Applications" by Philip Smith with ISBN 0201624001 and a listed publication date in 1993, "Frame Relay Networks: Specifications and Implementations, Second Edition" by Uyless Black with ISBN 0070055904 and a listed publication date in 1995, "Frame Relay: Technology and Practice" by Jeff T. Buckwalter with ISBN 0201485249 and a listed publication date in 1999, "ATM, Volume I: Foundation for Broadband Networks, Second Edition" by Uyless Black with ISBN 0130832189 and a listed publication date in 1999, "ATM, Volume II: Signaling in Broadband Networks" by Uyless Black with ISBN 0135718376 and a listed publication date in 1997, "ATM, Volume III: Signaling in Broadband Networks" by Uyless Black with ISBN 0780334892 and a listed publication date in 1999, and "Asynchronous Transfer Mode: Solution for Broadband ISDN, Third Edition" by Martin De Prycker with ISBN 0133421716 and a listed publication date in 1995.

MPLS as well as other label and tag switching technologies are at least partially described in the following RFCs that are each incorporated by reference in their entireties: RFC 2105, entitled "Cisco Systems' Tag Switching Architecture Overview"; RFC 2702, entitled "Requirements for Traffic Engineering Over MPLS"; RFC 3031, entitled "Multiprotocol Label Switching Architecture"; RFC 3032, entitled "MPLS Label Stack Encoding"; RFC 3034, entitled "Use of Label Switching on Frame Relay Networks Specification"; RFC 3035, entitled "MPLS using LDP and ATM VC Switching"; RFC 3346, entitled "Applicability Statement for Traffic Engineering with MPLS"; RFC 3468, entitled "The Multiprotocol Label Switching (MPLS) Working Group decision on MPLS signaling protocols"; and RFC 3496, entitled "Protocol Extension for Support of Asynchronous Transfer Mode (ATM) Service Class-aware Multiprotocol Label Switching (MPLS) Traffic Engineering". Moreover, the following books describe tag switching, label switching, MPLS, and other networking technologies and are each incorporated by reference in their entireties herein: "MPLS and Label Switching Networks, Second Edition" by Uyless Black with ISBN 0130358193 and a listed publication date in 2002, and "ATM & MPLS Theory & Application: Foundations of Multi-Service Networking" by David E. McDysan and Dave Paw with ISBN 0072222565 and a listed publication date in 2002.

Figure 3:
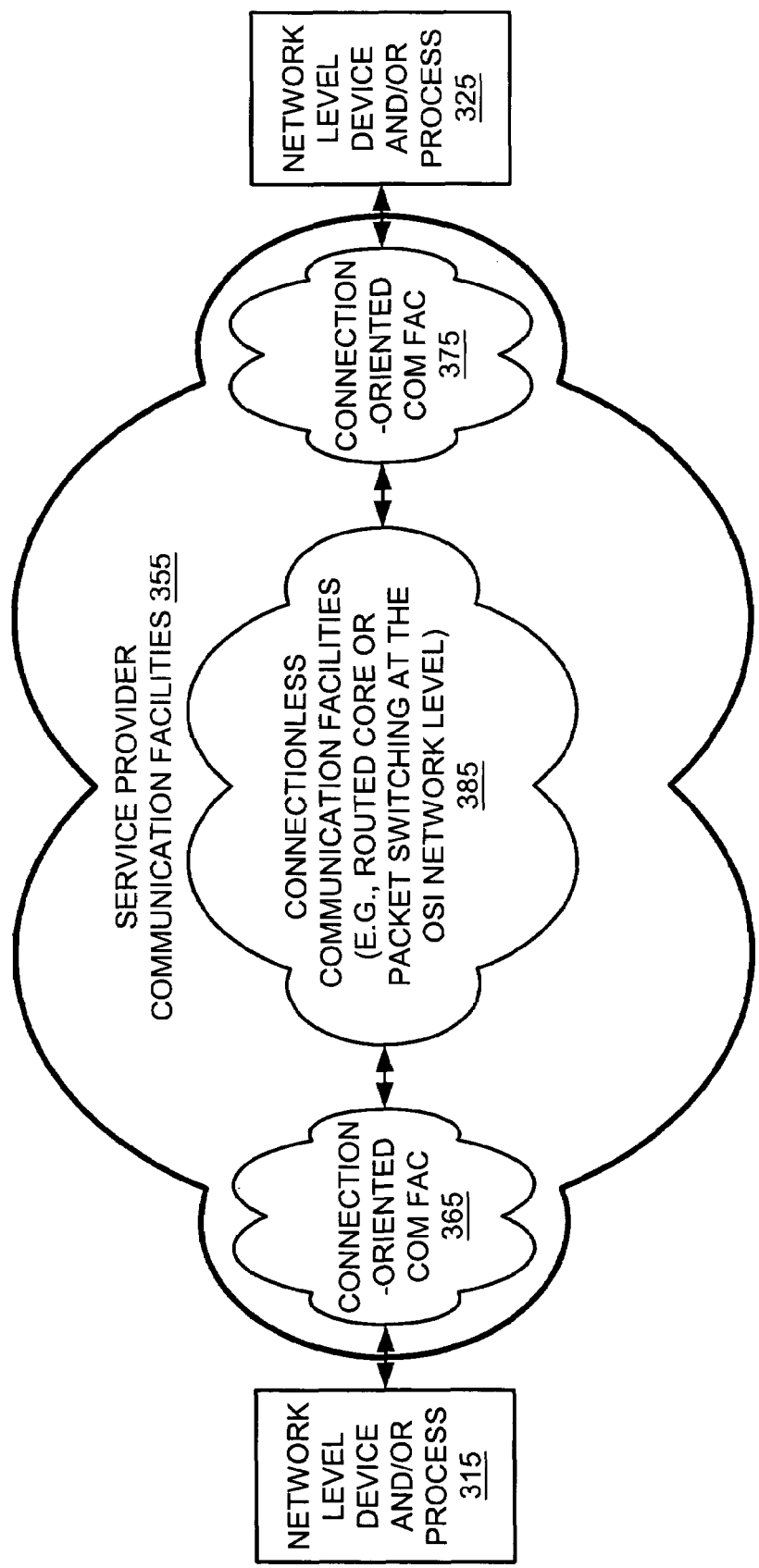
FIG. 3 is a simplified block diagram of two pieces of customer premises equipment (CPE) that are connected by service provider communication facilities, which further comprise connection-oriented communication facilities and connectionless communication facilities providing connectionless service in transporting network level packets between the two CPE devices.

In contrast to FIG. 1, with the service provider communication facilities 155 primarily comprising connection-oriented communication facilities 165, for reasons related to various business, technological, and regulatory environment issues, service providers have begun to offer network configurations somewhat similar to FIG. 3. In FIG. 3, customer premises equipment (CPE) such as network level devices and/or processes 315 and 325 are connected to service provider communication facilities 355. The service provider communication facilities 355 further comprise connection-oriented communication facilities 365 and 375 that connect to network level devices and/or processes 315 and 325 respectively. The connection-oriented communication facilities 365 and 375 provide access into connectionless communication facilities 385 such as but not limited to a routed core that provides packet switching at the OSI network level.

Generally, routing is a particular type of packet switching that is performed at layer three of the OSI model. Packet switching generally involves some active network element or entity, which may be a device or a process on a device, making decisions on which packets to forward and which packets to filter from one or more input lines to one or more output lines. The decision on filtering and/or forwarding generally involves among other things evaluating one or more tags or addresses in the packet to determine the proper destination. Thus, packet switches generally are filtering/forwarding entities, and routers are a specific type of packet switch or filtering/forwarding entity that behave according to the routing rules of a particular protocol.

In general, OSI layer one devices generally are known as repeaters (or physical layer switches), while OSI layer two devices generally are known as bridges or layer two (packet) switches. In addition, OSI layer three devices generally are known as routers or layer three switches, while OSI layer four and higher devices generally are known as gateways. Some older Internet terminology used the term gateway to refer to the layer three routing function, but this use of the term is not as common today. Many of these types of devices perform various filtering and/or forwarding decisions on packets. In general, there are some common conventions for the way these various types of devices behave. Also, a particular networking device may operate according to several different conventions at different OSI layers by running various processes that perform the different conventional functions for that layer. Thus, a networking device may provide layer two bridging for some packets, while providing layer three routing for other packets. In addition, actual network devices may have additional filtering configurations that allow more customized packet filtering and/or forwarding decisions than are characterized by the common conventions for bridges, layer two switches, routers, layer three switches, and/or gateways. Therefore, a filtering/forwarding entity may be a process or a device that performs packet filtering and/or forwarding, and a network layer router is only one non-limiting example of a packet filtering/forwarding entity.

The following RFCs describe some general concepts of interconnection devices, such as but not limited to bridges and routers, and are each incorporated by reference in their entireties herein: RFC 1242, entitled "Benchmarking Terminology for Network Interconnection Devices"; RFC 1944, entitled "Benchmarking Methodology for Network Interconnect Devices"; RFC 2544, entitled "Benchmarking Methodology for Network Interconnect Devices"; RFC 2285, entitled "Benchmarking Terminology for LAN Switching Devices"; and RFC 2889, entitled "Benchmarking Methodology for LAN Switching Devices". Furthermore, the following books also describe various types of bridging, switching, and routing, and the books are each incorporated by reference in their entireties herein: "Interconnections: Bridges, Routers, Switches, and Internetworking Protocols, Second Edition" by Radia Perlman with ISBN 0201634481 and a listed publication date in 1999; and "Routing and Switching: Time of Convergence?" by Rita Puzmanova with ISBN 0201398613 and a listed publication date in 2001.

One skilled in the art should be aware of the routing rules or conventions for common protocols such as the Internet Protocol (including its various versions). More details on routing decisions and protocols for IP packets may be found in the multi-volume books on TCP/IP by Douglas E. Corner and the multi-volume books on TCP/IP by W. Richard Stevens that both generally organize and summarize some of the information found in various Internet Request for Comments (RFCs), which generally are the standards documents of the Internet. Specifically, Douglas E. Comer's TCP/IP book volumes generally have been issued in several editions, and "Internetworking with TCP/IP, Volume 1, Fourth Edition" by Douglas E. Corner with ISBN 0130183806 and a listed publication date in 2000 is incorporated by reference in its entirety herein. Furthermore, W. Richard Stevens' three volumes on TCP/IP include "TCP/IP Illustrated, Volume 1: The Protocols" with ISBN 0201633469 and a listed publication date in 1994, which is incorporated in its entirety by reference herein.

Moreover, the preferred embodiments of the present invention should not be limited to just IPv4 but also may work with IPv6 as well as future versions and/or variations of the Internet Protocol. The newer IPv6 is at least partially described in the following books, which are each incorporated by reference in their entireties herein: "IPv6 Essentials" by Silvia Hagen with ISBN 0596001258 and a listed publication date in 2002, "Understanding IPv6" by Joseph Davies with ISBN 0735612455 and a listed publication date in 2002, "IPv6: The New Internet Protocol" by Christian Huitema with ISBN 013241936X and a listed publication date in 1996, and "IPng and the TCP/IP Protocols: Implementing the Next Generation Internet" by Stephen A. Thomas with ISBN 0471130885 and a listed publication date in 1996.

One skilled in the art also should be aware that some network devices are layer three packet switches, which operate based on some of the information in the layer three or network header, but these layer three switches generally do not strictly conform to the accepted behavior for routers. Some of the packet switching technologies (such as but not limited to MPLS) have a hybrid functionality that generally makes it easier for service providers to offer connectionless communication facilities or routed cores in the service provider networks. Also, hybrid filtering/forwarding entities often are designed and implemented with special filtering/forwarding rules at various levels of the OSI model in an attempt to achieve specific improved network efficiencies although these hybrid filtering/forwarding entities may well violate the generally standardized paradigms and/or constructs for devices such as, but not limited to, switches, bridges, and/or routers.

Figure 4:
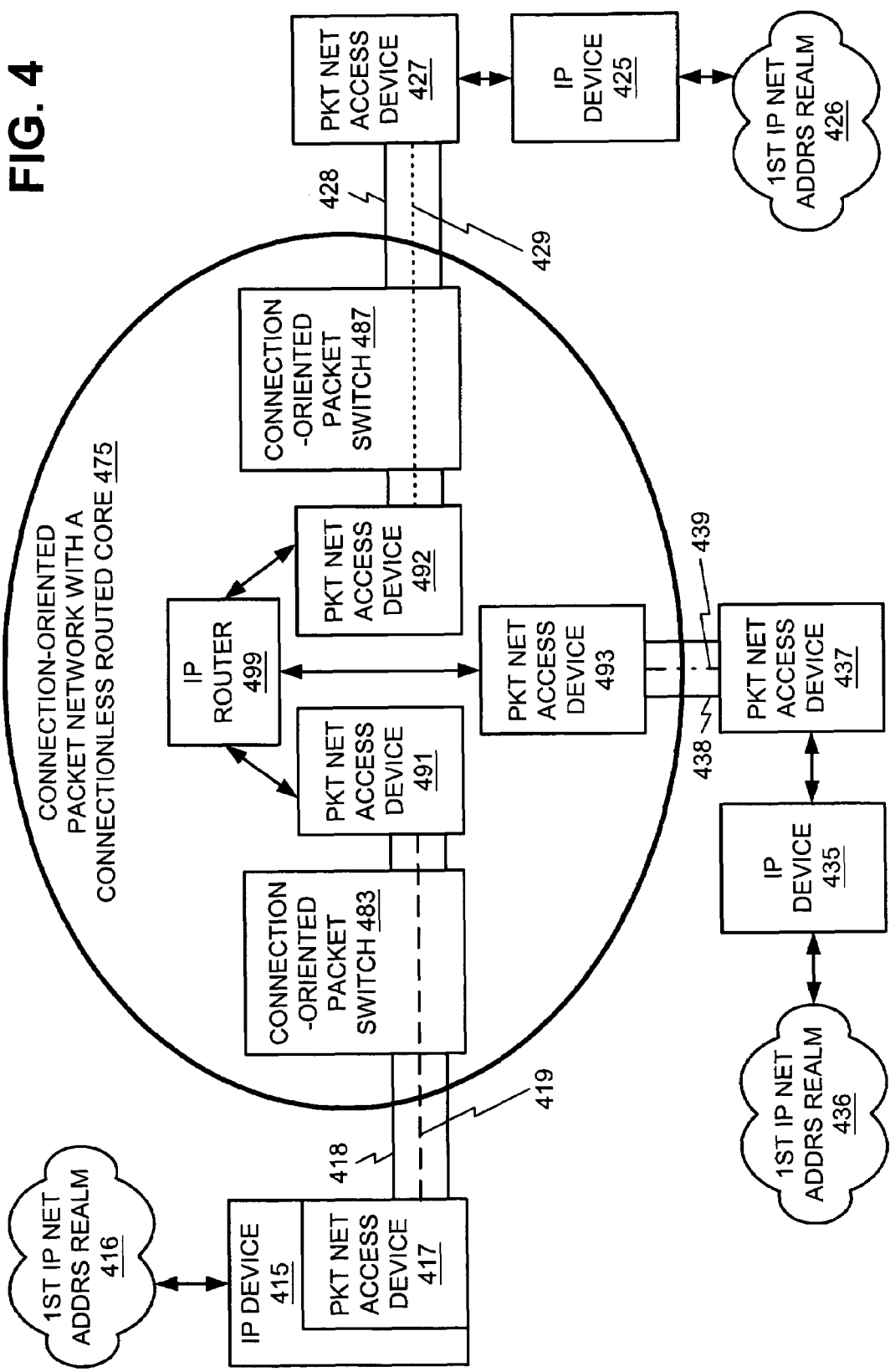
FIG. 4 is a block diagram of one non-limiting example of the configuration from FIG. 3, and shows a connection-oriented packet network with a connectionless routed core providing connectivity to CPE.

FIG. 4 shows a more detailed non-limiting example of the network configuration from FIG. 3. Similarly to FIG. 2, in FIG. 4 the IP devices 415, 425, and 435 provide connectivity between IP networks 416, 426, and 436 respectively that are part of the same first IP address realm. The IP devices 415, 425, and 435 are connected through packet network access devices 417, 427, and 437 to a connection-oriented packet network with a connectionless routed core 475 that generally would be provided by a service provider. In FIG. 4, each packet network access device 417, 427, and 437 is connected to the connection-oriented packet network with a connectionless routed core 475 through an access line 418, 428, and 438 respectively with at least one virtual circuit 419, 429, and 439 respectively. In FIG. 4, virtual circuit 419 goes through connection-oriented packet switch 483, and virtual circuit 429 goes through connection-oriented packet switch 487. The virtual circuits 419 and 429 are terminated at packet network access devices 491 and 492 in the service provider's network. Furthermore, virtual circuit 439 is shown going directly into a packet network access device 493 in the service provider's network without going through a connection-oriented packet switch. The packet network access devices 491, 492, and 493 may be X.25 PADs or frame relay FRADs as non-limiting examples. These packet network access devices 491, 492, and/or 493 in the service provider's network may or may not implement the DCE-side or network-side of the packet-switching protocol, whereas customer premises packet-network access devices 417, 427, and 437 generally implement the DTE-side or user-side of the packet-switching protocol. Also, the service provider equipment may or may not integrate packet network access devices 491, 492, and/or 493 into other service provider equipment. As shown in FIG. 4, the packet network access devices 491, 492, and 493 provide connectivity to a connectionless packet switch such as an IP router 499 that generally makes datagram filtering/forwarding decisions based on network level or layer three information in the packets.

While the Inverse ARP or InARP protocol may be used on virtual circuit techonologies to determine the IP addresses of end devices on a virtual circuit, by comparing FIGS. 2 and 4 one can see the potential problem created in identifying IP addresses using Inverse ARP in networks with connectionless routed cores. As a non-limiting example, IP device 215 in FIG. 2 may send an Inverse ARP packet on virtual circuit 219 to cause packet network access device 227 and associated IP device 225 to respond with its IP address. Thus, customer equipment can use Inverse ARP to dynamically determine the IP address of customer equipment at the other end of the virtual circuit. By contrast in the connectionless routed core network of FIG. 4, an Inverse ARP packet sent by IP device 415 on virtual circuit 419 is likely to be responded to with the IP address of packet network access device 491 and IP router 499, which may be part of the service provider's network as opposed to the packet access device 427 and IP device 425 that may be part of the customer's network. As a result the addition of a routed core in service provider makes it more difficult to use Inverse ARP to allow customer equipment to dynamically discover the IP address of other customer equipment at the remote end of an essentially one-to-one local-remote relationship between the customer site with IP device 415 and the customer site with packet network access device 427 and IP device 425. Many network management mechanisms for virtual circuit technologies such as, but not limited to, frame relay and ATM, have utilized the Inverse ARP protocol to automatically learn the IP address of far end customer devices that are then used in network management. However, the addition of a routed core to the networks of many service providers has affected the automatic network management features of customer premises equipment designed to work over virtual circuits.

X.25, frame relay, and ATM are non-limiting example technologies that provide connection-oriented data forwarding service. Although X.25 arguably has a layer three protocol of PLP, the highest layer for carrying user data in frame relay and ATM generally is considered to be a layer two protocol. Thus, frame relay and ATM are often known as layer two network technologies. In addition, X.25, frame relay, and ATM may use other higher layer protocols for signaling to establish connections and to release switched virtual circuits. Furthermore, one skilled in the art should be aware that not all layer two networks are connection-oriented networks with IEEE (the Institute of Electrical and Electronics Engineers) 802.3/ethernet being just one of many prominent examples of networking technologies that generally provide connectionless service at layer two (especially when connection-oriented information from an IEEE 802.2 logical link control (LLC) header is not included in the IEEE 802.3/ethernet frame). IEEE 802.2 LLC actually does specify the possibility of a connection-oriented layer two service, but common network layer protocols such as Internet IP and Novell's Internetwork Packet eXchange (IPX) protocol do not use these connection-oriented services of IEEE 802.2 in IEEE 802.3/ethernet packets. Thus, for the vast majority of network traffic, networks using ethernet/802.3 commonly just provide connectionless service at layer two.

Networks with routed cores are a non-limiting example of a network that provides connectionless service because the layer three routers generally found at the core of such networks usually operate using at least one version of the IP protocol, which is connectionless. These networks with routed cores are commonly called layer three networks because the routers in the core of the network generally operate at layer three of the OSI model. However, one skilled in the art should be aware that connection-oriented layer three protocols (or more accurately layer three protocols that provide connection-oriented services to higher level protocols) and networks running such protocols may exist.

Embodiments of the present invention may be useful in detecting whether the communication facilities generally conform to FIG. 1 (with FIG. 2 being a non-limiting common example of communication facilities generally conforming to FIG. 1) or the communications facilities generally conform to FIG. 3 (with FIG. 4 being a non-limiting common example of communication facilities generally conforming to FIG. 3). However, embodiments of the present invention also can be used in the network of FIG. 5 that introduces the added complexity of virtual private networking (VPN) and/or tunneling in which one level of a network protocol (such as but not limited to IP) can be encapsulated into packets with another level of a network protocol.

Figure 5:
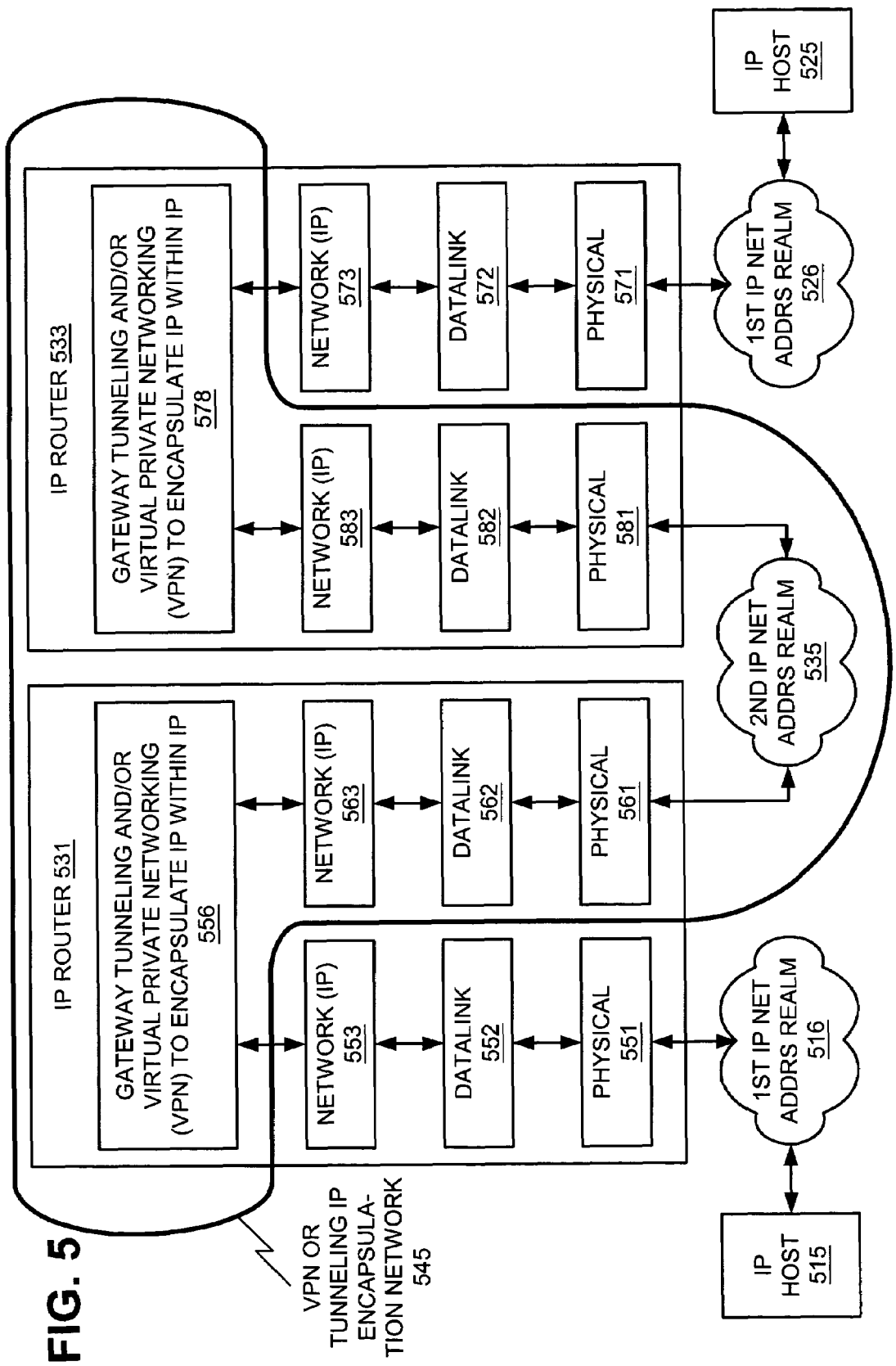
FIG. 5 is a block diagram of a non-limiting virtual private network (VPN) or tunneling configuration of one non-limiting example of the configuration from FIG. 1.

As shown in FIG. 5, IP host 515 that is connected to IP network 516 is capable of communicating with IP host 525 that is connected to IP network 526. IP host 516 is connected to IP host 526 through IP router 531, IP router 533, and IP network 535 which provide a virtual private network (VPN) or a tunneling IP encapsulation network 545. As one skilled in the art should be aware, generally two customer networks or portions of a customer network such as IP network 516 and IP network 526 that are part of the same first IP address realm may be tunneled through another IP network 535 that is part of a different second IP address realm. Many technologies are known in the art for providing VPN and/or tunneling capabilities for IP including, but not limited to, Generic Routing Encapsulation (GRE), Transmission Control Protocol (TCP), Stream Control Transmission Protocol (SCTP), Point-to-Point Tunneling Protocol (PPTP), Layer 2 Forwarding (L2F), Layer 2 Tunneling Protocol (L2TP), IP Secure (Sec), MPLS, as well as many others that are too numerous to list in entirety.

Some of the Internet RFCs related to tunneling and other issues include the following documents that are each incorporated by reference in their entireties herein: RFC 1088, entitled "A Standard for the Transmission of IP Datagrams over NetBIOS Networks"; RFC 1226, entitled "Internet Protocol Encapsulation of AX.25 Frames"; RFC 1234, entitled "Tunneling IPX Traffic through IP Networks"; RFC 1241, entitled "A Scheme for an Internet Encapsulation Protocol: Version 1"; RFC 1326, entitled "Mutual Encapsulation Considered Dangerous"; RFC 1479, entitled "Inter-Domain Policy Routing Protocol Specification: Version 1"; RFC 1853, entitled "IP in IP Tunneling"; RFC 2003, entitled "IP Encapsulation within IP"; RFC 2004, entitled "Minimal Encapsulation within IP"; RFC 2473, entitled "Generic Packet Tunneling in IPv6 Specification"; RFC 1701, entitled "Generic Routing Encapsulation (GRE)"; RFC 1702, entitled "Generic Routing Encapsulation over IPv4 networks"; RFC 2784, entitled "Generic Routing Encapsulation (GRE)"; RFC 3077, entitled "A Link-Layer Tunneling Mechanism for Unidirectional Links"; and RFC 3378, entitled "EtherIP: Tunneling Ethernet Frames in IP Datagrams". Also, various tunneling technologies may be used to communicate IPv4 over IPv6 networks or IPv6 over IPv4 networks, when at least some routers in a network cannot handle both IPv4 and IPv6 datagrams. The following Internet RFCs describe some of the issues in IPv4 and/or IPv4 tunneling and are each incorporated by reference in their entireties herein: RFC 1933, entitled "Transition Mechanisms for IPv6 Hosts and Routers"; RFC 2185, entitled "Routing Aspects Of IPv6 Transition"; RFC 2893, entitled "Transition Mechanisms for IPv6 Hosts and Routers"; RFC 3053, entitled "IPv6 Tunnel Broker"; and RFC 3056, entitled "Connection of IPv6 Domains via IPv4 Clouds".

Internet RFC 2764, entitled "A Framework for IP Based Virtual Private Networks", describes a framework for IP-based VPNs, and is incorporated by reference in its entirety herein. Also, the following RFCs describe IPSec as well as other additional tunneling and/or VPN technologies and are each incorporated by reference in their entirety herein: RFC 1825, entitled "Security Architecture for the Internet Protocol"; RFC 2401, entitled "Security Architecture for the Internet Protocol"; RFC 1826, entitled "IP Authentication Header"; RFC 2402, entitled "IP Authentication Header"; RFC 1827, entitled "IP Encapsulating Security Payload (ESP)"; RFC 2406, entitled "IP Encapsulating Security Payload (ESP)"; RFC 2411, entitled "IP Security Document Roadmap"; RFC 2709, entitled "Security Model with Tunnel-mode IPsec for NAT Domains"; and RFC 3457, entitled "Requirements for IPsec Remote Access Scenarios". In addition, the following RFCs describe using MPLS for VPNs as well as other additional tunneling and/or VPN technologies and are each incorporated by reference in their entirety herein: RFC 2547, entitled "BGP/MPLS VPNs", and RFC 2917, entitled "A Core MPLS IP VPN Architecture".

Furthermore, the following RFCs describe L2TP as well as other additional tunneling and/or VPN technologies and are each incorporated by reference in their entirety herein: RFC 2107, entitled "Ascend Tunnel Management Protocol—ATMP"; RFC 2341, entitled "Cisco Layer Two Forwarding (Protocol) 'L2F'"; RFC 2637, entitled "Point-to-Point Tunneling Protocol (PPTP)"; RFC 2661, entitled "Layer Two Tunneling Protocol 'L2TP'"; RFC 3070, entitled "Layer Two Tunneling Protocol (L2TP) over Frame Relay"; RFC 3193, entitled "Securing L2TP using IPsec"; RFC 3301, entitled "Layer Two Tunnelling Protocol (L2TP): ATM access network extensions"; RFC 3308, entitled "Layer Two Tunneling Protocol (L2TP) Differentiated Services Extension"; RFC 3348, entitled "Layer Two Tunneling Protocol (L2TP) Internet Assigned Numbers Authority (LANA) Considerations Update"; and RFC 3437, entitled "Layer-Two Tunneling Protocol Extensions for PPP Link Control Protocol Negotiation". Moreover, the following books describe various tunneling and/or VPN technologies and are each incorporated by reference in their entireties herein: "PPP and L2TP: Remote Access Communications" by Uyless Black with ISBN 0130224626 and a listed publication date in 1999; "IPSec: The New Security Standard for the Internet, Intranets, and Virtual Private Networks, Second Edition" by Naganand Doraswamy and Dan Harkins with ISBN 013046189X and a listed publication date in 2003; "Virtual Private Networks: Technologies and Solutions" by Ruixi Yuan and W. Timothy Strayer with ISBN 0201702096 and a listed publication date in 2001; "Virtual Private Networking: A View From the Trenches" by Bruce Perlmutter with contributions from Jonathan L. Zarkower and with ISBN 0130203351 and a listed publication date in 1999; and "MPLS-Based VPNs Designing Advanced Virtual Networks" by Peter Tomsu and Gerhard Wieser with ISBN 0130282251 and a listed publication date in 2001.

Some of these protocols such as PPTP, L2F, and L2TP were designed to emulate layer two connection-oriented service over a connectionless IP network such as the Internet. In addition, at least PPTP and L2TP are partially based on the Point-to-Point Protocol (PPP) that generally is considered to provide connection-oriented functionality between two devices. The following Internet RFCs describe at least some of the mechanisms of the connection-oriented Point-to-Point Protocol (PPP) and its precursor the Serial Line Internet Protocol (SLIP), with each of the following RFCs incorporated in their entirety by reference herein: RFC 1055, entitled "A Nonstandard for Transmission of IP Datagrams Over Serial Lines: SLIP"; RFC 1134, entitled "The Point-to-Point Protocol: A Proposal for Multi-Protocol Transmission of Datagrams Over Point-to-Point Links"; RFC 1171, entitled "The Point-to-Point Protocol for the Transmission of Multi-Protocol Datagrams Over Point-to-Point Links"; RFC 1172, entitled "The Point-to-Point Protocol (PPP) Initial Configuration Options"; RFC 1331, entitled "The Point-to-Point Protocol (PPP) for the Transmission of Multi-protocol Datagrams over Point-to-Point Links"; RFC 1547, entitled "Requirements for an Internet Standard Point-to-Point Protocol"; RFC 1548, entitled "The Point-to-Point Protocol (PPP)"; RFC 1661, entitled "The Point-to-Point Protocol (PPP)"; RFC 1717, entitled "The PPP Multilink Protocol (MP)"; RFC 1990, entitled "The PPP Multilink Protocol (MP)"; RFC 1333, entitled "PPP Link Quality Monitoring"; and RFC 1989, entitled "PPP Link Quality Monitoring".

Furthermore, the following Internet RFCs describe various framing options for PPP and are each incorporated by reference in their entireties herein: RFC 1549, entitled "PPP in HDLC Framing"; RFC 1662, entitled "PPP in HDLC-like Framing"; RFC 1663, entitled "PPP Reliable Transmission"; and RFC 2516, entitled "A Method for Transmitting PPP Over Ethernet (PPPoE)". PPP may be carried in HDLC-like framing as described in RFCs 1549 and 1662, while RFC 2516 describes how the data link protocol of PPP may be carried in another data link protocol of ethernet or IEEE 802.3. Furthermore, PPP may or may not use the numbered mode of HDLC as opposed to just carrying data in unnumbered information (UI) frames.

In general, PPP includes a Link Control Protocol (LCP) to bring up a point-to-point connection between two PPP end devices. Also, the purpose of PPP is to provide generalized encapsulation that supports multiple protocols unlike the earlier SLIP protocol that generally only supported the encapsulation of IP datagrams over serial lines. Normally, to support multiple possible encapsulated protocol, the two end devices in communication generally may have some a priori agreement or preestablished expectation about the protocol carried in the encapsulation, or the two devices generally may communicate between each other information that specifies the protocol carried in the encapsulation. The multiprotocol nature of PPP includes a Protocol Identifier (ID) to identify the protocol encapsulated in a PPP frame. One of the reasons for selecting PPP as a basis for VPN technologies such as L2TP is due to PPP's flexibility in supporting connection establishment and parameter negotiation for other protocols using various Network Control Protocols (NCPs). NCPs are carried in PPP frames to communicate and negotiate settings for various different types of protocols that are to be communicated in a connection-oriented point-to-point fashion between PPP endpoints.

Although the PPP NCPs are called "Network" Control Protocols, in general the PPP NCPs include mechanisms to negotiate settings and encapsulate other types of protocols beyond just layer three network level protocols. One of the common PPP NCPs is the IP Control Protocol (IPCP), which negotiates various IP network level settings and is associated with a PPP protocol ID for carrying IP datagrams directly encapsulated in PPP frames. The following Internet RFCs describe at least a portion of IPCP and are each incorporated by reference in their entireties herein: RFC 1134, entitled "The Point-to-Point Protocol: A Proposal for Multi-Protocol Transmission of Datagrams Over Point-to-Point Links"; RFC 1171, entitled "The Point-to-Point Protocol for the Transmission of Multi-Protocol Datagrams Over Point-to-Point Links"; RFC 1172, entitled "The Point-to-Point Protocol (PPP) Initial Configuration Options"; RFC 1332, entitled "The PPP Internet Protocol Control Protocol (IPCP) "; RFC 1877, entitled "PPP Internet Protocol Control Protocol Extensions for Name Server Addresses"; RFC 2290, entitled "Mobile-IPv4 Configuration Option for PPP IPCP"; RFC 2023, entitled "IP Version 6 over PPP"; RFC 2472, entitled "IP Version 6 over PPP"; RFC 2507, entitled "IP Header Compression"; and RFC 2509, entitled "IP Header Compression over PPP". Actually the IPCP used for IPv4 over PPP is a different PPP NCP from IPV6CP used for IPv6 over PPP. IPCP is the NCP associated with the PPP protocol ID that encapsulates an IPv4 datagram directly within a PPP frame, whereas IPV6CP is the NCP associated with the PPP protocol ID that encapsulates an IPv6 datagram directly within a PPP frame.

Normally, IPCP (as well as IPV6CP) might be used between dial-in computers and network access servers (NAS) and/or between two IP routers. IP routers generally use the Address Resolution Protocol (ARP) on ethernet networks to supply the destination MAC (Medium Access Control) address, while the source MAC address is a router's own MAC address in an ethernet frame formed to forward an IP datagram over ethernet after the IP datagram is received encapsulated directly within PPP. The PPP protocol ID 0x0021 directly encapsulates IPv4 datagrams and is associated with IPCP, which has a protocol ID of 0x8021. The PPP protocol ID 0x0057 directly encapsulates IPv6 datagrams and is associated with IPV6CP, which has a protocol ID of 0x8057. However, the forwarding construct normally associated with routing does not necessarily have to be used for forwarding IP datagrams associated with IPCP in PPP. Instead, a bridging construct for forwarding the IP datagram within a PPP frame could be used together with an ARP cache associated with the bridge to support forwarding of the IP datagrams.

In addition to IPCP, another PPP Network Control Protocol (NCP) is the Bridging Network Control Protocol (BNCP) also known as the Bridging Control Protocol (BCP), which is described in the following RFCs that are each incorporated by reference in their entireties herein: RFC 1220, entitled "Point-to-Point Protocol Extensions for Bridging"; RFC 1638, entitled "PPP Bridging Control Protocol (BCP)"; RFC 2878, entitled "PPP Bridging Control Protocol (BCP)"; and RFC 3518, entitled "Point-to-Point Protocol (PPP) Bridging Control Protocol (BCP)". Although BCP is called the "Bridging" Control Protocol, the associated PPP protocol ID just encapsulates entire MAC frames such as ethernet frames inside a PPP frame. PPP frames encapsulating MAC frames have a PPP protocol ID of 0x0031 and are associated with the PPP BNCP or PPP BCP, which has a PPP protocol ID of 0x8031.

Of course, MAC frames of ethernet and any other LAN protocols that are encapsulated within PPP frames may further carry IP datagrams, and the PPP encapsulated ethernet frames may be used between other devices such as, but not limited to IP routers, in addition to bridges. Furthermore, one end of a PPP connection carrying IP datagrams may utilize a routing construct for forwarding IP while the other end of a PPP connection utilizes a bridging construct for forwarding IP regardless of whether the PPP protocol uses BCP or IPCP (as well as IPV6CP). An IP datagram within an ethernet frame that is further encapsulated inside a PPP frame generally carries even more information than an IP datagram encapsulated directly within a PPP frame because the ethernet frame still contains the ethernet headers and trailers. Thus, the description of encapsulations as carrying "routed" frames or "bridged" frames is somewhat of a misnomer as the encapsulation does not necessarily fully require a specific routing or bridging forwarding construct for the devices at the ends of a PPP connection (or a connection-oriented virtual circuit). Instead, the "routed" versus "bridged" terminology referring to encapsulation techniques generally is used to indicate whether a layer two MAC header may be encapsulated with the data. A "routed" frame normally does not include the layer two MAC header in the encapsulated data, while a "bridged" frame normally does include the layer two MAC header in the encapsulated data.

Some of the other PPP NCPs are described in the following RFCs, which are each incorporated by reference in their entireties herein: RFC 1841, entitled "PPP Network Control Protocol for LAN Extension"; RFC 1963, entitled "PPP Serial Data Transport Protocol (SDTP)"; RFC 1376, entitled "The PPP DECnet Phase IV Control Protocol (DNCP)"; RFC 1377, entitled "The PPP OSI Network Layer Control Protocol (OSINLCP)"; RFC 1378, entitled "The PPP AppleTalk Control Protocol (ATCP)"; RFC 1552, entitled "The PPP Internetwork Packet Exchange Control Protocol (IPXCP)"; RFC 1762, entitled "The PPP DECnet Phase IV Control Protocol (DNCP)"; RFC 1763, entitled "The PPP Banyan Vines Control Protocol (BVCP)"; RFC 1764, entitled "The PPP XNS IDP Control Protocol (XNSCP)"; RFC 2043, entitled "The PPP SNA Control Protocol (SNACP)"; and RFC 2097, entitled "The PPP NetBIOS Frames Control Protocol (NBFCP)". There are two different SNA NCPs for a first variation of SNA over IEEE 802.2 LLC encapsulated in PPP and for a second variation of SNA directly encapsulated in PPP without an IEEE 802.2 LLC. These different frame types for SNACP indicate that protocols often support variations in the frame format. Also, RFC 1088, entitled "A Standard for the Transmission of IP Datagrams over NetBIOS Networks", specifies a method of tunneling IP within NetBIOS that may be further carried in the PPP frames associated with NBFCP from RFC 2097. Also, many mechanisms were developed for tunneling IP over other network protocols such as, but not limited to, IPX and AppleTalk, which have their own PPP NCPs of IPXCP and ATCP, respectively. Thus, there are many ways of carrying IP datagrams over PPP, and the listed cases are just a few non-limiting examples out of the nearly limitless ways of encapsulating various protocols in other protocols.

Some similar issues exist regarding the direct encapsulation of IP datagrams in "routed" frames as opposed to the indirect encapsulation of IP datagrams within MAC layer frames such as ethernet frames that are further encapsulated in "bridged" frames as described in the Internet RFCs on multiprotocol interconnection and encapsulation over various packet switched WAN technologies such as, but not limited to, X.25, ISDN X.25 packet mode services, frame relay, SMDS, and ATM. The following RFCs describe the multiprotocol encapsulation over various WAN technologies and are each incorporated in their entireties by reference herein: RFC 877, entitled "A Standard for the Transmission of IP Datagrams Over Public Data Networks"; RFC 1356, entitled "Multiprotocol Interconnect on X.25 and ISDN in the Packet Mode"; RFC 1209, entitled "The Transmission of IP Datagrams over the SMDS Service"; RFC 1294, entitled "Multiprotocol Interconnect over Frame Relay"; RFC 1490, entitled "Multiprotocol Interconnect over Frame Relay"; RFC 2427, entitled "Multiprotocol Interconnect over Frame Relay"; RFC 2590, entitled "Transmission of IPv6 Packets over Frame Relay Networks Specification"; RFC 1483, entitled "Multiprotocol Encapsulation over ATM Adaptation Layer 5"; RFC 2684, entitled "Multiprotocol Encapsulation over ATM Adaptation Layer 5"; RFC 1755, entitled "ATM Signaling Support for IP over ATM"; RFC 1932, entitled "IP over ATM: A Framework Document"; RFC 1577, entitled "Classical IP and ARP over ATM"; RFC 2225, entitled "Classical IP and ARP over ATM"; and RFC 2492, entitled "IPv6 over ATM Networks".

Normally, two devices communicating over circuit switched and/or switched virtual circuit (SVC) technologies either have preestablished agreements in each device indicating the type and/or format of data carried on the circuit and/or SVC, or the two devices have some way to communicate and/or negotiate the type and/or format of data carried on the circuit and/or SVC. Many of the connection-oriented WAN technologies that use connection setup messages for establishing circuit-switched and/or switched virtual-circuit connections include mechanisms in the connection setup messages for the connection initiating device to indicate the type of protocol carried on the circuit or virtual circuit that will be established between two end points. However, leased line, nailed-up connections, and/or permanent virtual circuits (PVCs) generally do not need to utilize connection establishment and tear down signaling messages. Although these leased, nailed-up, and PVC technologies might use connection signaling messages, in general the end-to-end connection signaling messages are not needed because the end-to-end connections generally are assumed to always be actively connected even though particular data links may from time to time be active and/or inactive. In general, carriers often charge for additional calls, circuits, and/or virtual circuits. Thus, multiplexing technologies that allow a single call, circuit, and/or virtual circuit to be used for carrying multiple protocols allow customers to save on the costs paid to local exchange carriers (LECs) and/or interexchange carriers (IXCs). Support for the statistical multiplexing of multiple protocols using protocol IDs in PPP as well as Network Layer Protocol Identifiers (NLPIDs) in the multiprotocol encapsulation/interconnection standards for WAN technologies allows customers to save money by utilizing single calls, circuits, and/or virtual circuits to carry multiple protocols.

As described in RFC 1356, the Call User Data (CUD) field is used in the X.25 call/connection setup/request message to indicate the type of protocol carried in the X.25 packet of native X.25, X.25 in LAPB over an ISDN B-channel, and X.25 in LAPD over an ISDN D-channel. The CUD may indicate that a single protocol is encapsulated in the X.25 packets of a virtual circuit as identified at one X.25 endpoint by a logical channel number (LCN). Also, a CUD may indicate that the single protocol is further defined inside the X.25 packet using the IEEE SubNetwork Access Protocol (SNAP). In addition, the 0x00(Null) CUD in an X.25 call setup request may be used to indicate multiprotocol encapsulation over a single X.25 virtual circuit using NLPIDs as identifiers in each X.25 data packet for the statistical multiplexing of multiple protocols. The NLPID of 0x80 identifies the SNAP encapsulation format in the data packets using the Null, 0x00, multiplexed form of multiprotocol multiplexing over an X.25 virtual circuit.

Moreover, RFC 2427 describes the use of a NLPID in Q.922/LAPF frame relay frames for multiprotocol statistical multiplexing over a single frame relay virtual circuit. According to RFCs 1294, 1490, and 2427:

Internet Protocol . . . (IP) datagrams sent [as 'routed' frames] over a Frame Relay network . . . could be encapsulated in two different ways[: 1) with a NLPID value of 0xCC hexadecimal indicating IP and 2) with a NLPID value of 0x80 indicating SNAP followed by an OUI of 0x000000 hexadecimal and an ether type protocol ID of 0x0800 hexadecimal indicating IP . . . . Although both of these encapsulations are supported under the given definitions, it is advantageous to select only one method as the appropriate mechanism for encapsulating IP data. Therefore, IP data shall be encapsulated using the NLPID value of 0xCC indicating IP as shown in option 1 above. This (option 1) is more efficient in transmission (48 fewer bits), and is consistent with the encapsulation of IP in X.25 . . . As with IP encapsulation, [for 'routed' frames of other non-IP protocols] there are alternate ways to transmit various protocols within the scope of this definition. To eliminate the conflicts, the SNAP encapsulation is only used if no NLPID value is defined for the given protocol.

Thus, there are two feasible methods for encapsulating IPv4 datagrams directly in "routed" frame relay frames because IPv4 has an assigned NLPID of 0xCC and an assigned ether type of 0x0800. However, the preferred method for compatibility purposes is to use the 0xCC NLPID instead of SNAP encapsulation with an ether type of 0x0800. Also, according to RFC 2590, IPv6 has an NLPID of 0x8E, while RFCs 1972 and 2464 specify an ether type of 0x86DD for IPv6.

Furthermore, RFC 2427 goes on to clarify an ambiguity from RFCs 1294 and 1490 stating:

> The requirement for stations to accept SNAP encapsulated protocols for which a NLPID was available, was removed. RFC 1490 indicated that, if a protocol, such as IP, had a designated NLPID value, it must be used. Later the document required stations to accept a SNAP encapsulated version of this same protocol. This is clearly inconsistent. A compliant station must send and accept the NLPID encapsulated version of such a protocol. It MAY accept the SNAP encapsulation but should not be required to do so as these frames are noncompliant.

Thus, "routed" frames encapsulating IP datagrams generally are expected to be sent and received using the 0xCC NLPID format to allow greater compatibility and interoperability of "routed" frames between RFC 1294, 1490, and 2427 frame relay devices. However, a frame relay device may accept the SNAP encapsulated format of "routed" frame relay frames directly carrying IP datagrams.

Furthermore, the "bridged" frames in RFCs 1294, 1490, and 2427, which encapsulate entire MAC layer frames that may further carry IP datagrams, utilize the SNAP encapsulation with a NLPID of 0x80 and with the organizationally unique identifier (OUI) code of 0x0080C2 to specify the IEEE 802.1 organization that defines many MAC protocols used on LANs including but not limited to: 802.3, 802.4, 802.5, and 802.6. The MAC frames generally may be carried over frame relay with or without the MAC frame check sequence (FCS). Frame relay already has an FCS on the frame relay frames and a few less octets have to be transmitted when the MAC FCS is omitted at the cost of processing cycles in recomputing the correct FCS for the MAC frame at the destination end of a virtual circuit.

Also, RFCs 1490 and 2427 include a further Q.933 frame relay multiplexing method that is specified by using a NLPID of 0x08 for unnumbered information (UI) identified by a LAPF Q.922 control field of 0x03. Q.933 allows additional protocols to be multiplexed over frame relay with octets for layer two and layer three information known as lower layer compatibility information. Some of the protocols that may be multiplexed over Q.933 include, but are not limited to, ISO 7776 (which is the HDLC LAPB protocol), the Q.922/LAPF protocol, and the IEEE 802.2 LLC protocol. In addition, frame relay may operate in numbered mode with information frames having a three bit (modulo 8) or seven bit (modulo 128) widow and carrying ISO 8208, which is the X.25 layer three packet layer procedures (PLP). RFC further lists the NLPID of 0xCF for carrying PPP over frame relay.

The Q.931 and Q.2931 signaling protocols of ISDN and ATM respectively allow connection establishment messages to carry identifiers in the low layer compatibility information element (IE) fields that allow the device receiving the connection establishment or call setup message to determine the protocol and data format carried in the incoming circuit-switched call or switched virtual circuit (SVC). Furthermore some of the multiprotocol multiplexing techniques use the IEEE 802.2 Logical Link Control (LLC) protocol that includes a Destination Service Access Point (DSAP) field and a Source Service Access Point (SSAP) field in the 802.2 LLC header for multiplexing different protocols including using 0xAA hexadecimal for both the SSAP and DSAP to select the IEEE SubNetwork Access Protocol (SNAP) for further multiprotocol multiplexing.

RFCs 1483 and 2684 describe the frame formats for multiprotocol encapsulation over ATM Adaptation Layer 5 (AAL5). In general, RFCs 1483 and 2684 specify an IEEE 802.2 LLC header inside of AAL5 to identify various Service Access Point (SAP) protocols. In particular, according to RFCs 1483 and 2684, a Destination SAP or DSAP of 0xFE together with a Source SAP or SSAP of 0xFE and an unnumbered information (UI) control field of 0x03 identifies the International Standards Organization (ISO) Connection-Less-mode Network Service (CLNS) of ISO 8473 to handle "routed" frames. CLNS normally is followed by a one-octet Network Layer Protocol ID (NLPID). While IPv4 does have an assigned NLPID of 0xCC, and while IPv6 does have an assigned NLPID of 0x8E, RFCs 1483 and 2684 specify that IP is to be encapsulated in a SNAP frame identified with a DSAP of 0xAA, a SSAP of 0xAA, and an unnumbered information (UI) control field of 0x03 followed by an organizationally unique ID (OUI) that identifies an organization administering the subsequent protocol multiplexing information. The OUI of 0x000000 identifies that the subsequent two octets are an ether type field with 0x0800 being the ether type for IPv4, 0x0806 being the ether type for ARP, 0x8035 being the ether type for RARP, and 0x86DD being the ether type for IPv6 as non-limiting examples. RFCs 1483 and 2684 specifically state that the ISO CLNS SAP of 0xFE with a PID of 0xCC is NOT to be used to carry "routed" IP datagrams within AAL5. Furthermore, RFCs 1483 and 2684 specify the format for carrying "bridged" frames with full MAC frames in AAL5. According to RFCs 1483 and 2684 the "bridged" frames are to be identified using IEEE 802.2 LLC with SNAP that has DSAPs and SSAPs of 0xAA and a UI control field. However, for "bridged" frames, the OUI of 0x0080C2 is used to indicate the IEEE 802.1 committee for the Organizationally Unique ID (OUI). Following the OUI of 0x0080C2, a two octet protocol ID (PID) identifies the type of MAC frame format that is multiplexed into AAL5. Also, RFCs 1483 and 2684 define various ATM-frame relay interworking frame types as well.

Moreover, not only do theses various WAN protocols (such as, but not limited to X.25, frame relay, and ATM) have standards for multiprotocol encapsulation over the WAN protocol, but also the various WAN multiprotocol interconnection/encapsulation standards generally allow the specification of PPP as one of the multiple protocols that may be statistically multiplexed over the WAN technologies. Normally, the NLPID associated with PPP is 0xCF hexadecimal. Using the various multiprotocol interconnection/encapsulation multiplexing technologies for various WAN technologies to further carry PPP, which is itself a multi-protocol multiplexing technology, allows tremendous variation in the types of frames that might be used to carry IPv4 and IPv6 over various WAN technologies. Furthermore, the use of different frame formats for "bridged" frames versus "routed" frames in the WAN multiprotocol/interconnection standards as well as the PPP standards allows even greater variation in the ways in which IPv4 and IPv6 may be carried over WAN technologies.

The following RFCs describe some possible formats for carrying PPP over various WAN technologies and are each incorporated by reference in their entireties herein: RFC 1618, entitled "PPP over ISDN"; RFC 1598, entitled "PPP in X.25"; RFC 1973, entitled "PPP in Frame Relay"; RFC 2363, entitled "PPP Over FUNI"; RFC 2364, entitled "PPP Over AAL5"; RFC 3336, entitled "PPP Over Asynchronous Transfer Mode Adaptation Layer 2 (AAL2)"; RFC 3337, entitled "Class Extensions for PPP over Asynchronous Transfer Mode Adaptation Layer 2 (AAL2)"; RFC 1619, entitled "PPP over SONET/SDH"; RFC 2615, entitled "PPP over SONET/SDH"; and RFC 2823, entitled "PPP over Simple Data Link (SDL) using SONET/SDH with ATM-like framing".

Furthermore, one skilled in the art will be aware that there are at least a few different ways for encapsulating IPv4 datagrams in local area network (LAN) frames. Specifically, the following RFCs describe some of the formats of IP in various IEEE LAN technologies such as but not limited to 802.2 Logical Link Control (LLC), 802.3 Carrier Sense Multiple Access with Collision Detection (CSMA/CD) Medium Access Control (MAC), 802.4 Token Bus, 802.5 Token Ring, and Digital-Intel-Xerox (DIX) 2.0 Ethernet with each of the following RFCs incorporated in its entirety herein: RFC 894, entitled "A Standard for the Transmission of IP Datagrams over Ethernet Networks"; RFC 895, entitled "A Standard for the Transmission of IP Datagrams over Experimental Ethernet Networks"; RFC 948, entitled "Two Methods for the Transmission of IP Datagrams over IEEE 802.3 Networks"; RFC 1042, entitled "A Standard for the Transmission of IP Datagrams over IEEE 802 Networks"; RFC 1009, entitled "Requirements for Internet Gateways"; RFC 1122, entitled "Requirements for Internet Hosts—Communication Layers"; RFC 1972, entitled "A Method for the Transmission of IPv6 Packets over Ethernet Networks"; RFC 2464, entitled "Transmission of IPv6 Packets over Ethernet Networks"; RFC 2470, entitled "Transmission of IPv6 Packets over Token Ring Networks"; RFC 1700, entitled "Assigned Numbers"; RFC 3232, entitled "Assigned Numbers: RFC 1700 is Replaced by an On-line Database"; RFC 2815, entitled "Integrated Service Mappings on IEEE 802 Networks"; and RFC 2816, entitled "A Framework for Integrated Services Over Shared and Switched IEEE 802 LAN Technologies". Also, the following books describe various Local Area Network (LAN) technologies and are each incorporated by reference in their entireties herein: "Handbook of Computer-Communications Standards, Volume 2: Local Area Network Standards, Second Edition" by William Stallings with ISBN 0024155225 and a listed publication date in 1990, and "Local and Metropolitan Area Networks, Sixth Edition" by William Stallings with ISBN 0130129399 and a listed publication date in 2000.

In addition, the following RFCs specify IP over the Fiber Distributed Data Interface (FDDI) LAN technology and are each incorporated by reference in their entireties herein: RFC 1103, entitled "A Proposed Standard for the Transmission of IP Datagrams over FDDI Networks"; RFC 1188, entitled "A Proposed Standard for the Transmission of IP Datagrams over FDDI Networks"; RFC 1329, entitled "Thoughts on Address Resolution for Dual MAC FDDI Networks"; RFC 1390, entitled "Transmission of IP and ARP over FDDI Networks"; RFC 2019, entitled "A Method for the Transmission of IPv6 Packets over FDDI Networks"; and RFC 2467, entitled "Transmission of IPv6 Packets over FDDI Networks". Furthermore, the following RFCs specify IP over ARCNet LAN technology and are each incorporated by reference in their entireties herein: RFC 1051, entitled "A Standard for the Transmission of IP Datagrams and ARP Packets over ARCNET Networks"; RFC 1201, entitled "Transmitting IP Traffic over ARCNET Networks"; and RFC 2497, entitled "Transmission of IPv6 Packets over ARCnet Networks".

In general, the "bridged" frames for multiprotocol interconnection and/or encapsulation over PPP and various WAN technologies generally encapsulate frames from these various LAN technologies of DIX 2.0 ethernet, IEEE 802.3, IEEE 802.4, IEEE 802.5, IEEE 802.6, and/or FDDI. Furthermore, the different methods of carrying IP over these LAN technologies further implies even more variation in the LAN frame types carrying IP datagrams that may be further encapsulated using the various "bridged" frame types of multiprotocol PPP and WAN interconnection and/or encapsulation. One skilled in the art will be aware that Department of Defense (DoD) IPv4 (as originally developed by the Defense Advanced Research Project Agency or DARPA instead of some other protocols that have also used the acronym letters of IP prior to the nearly ubiquitous adoption of DoD IP) normally has an ether type of 0x0800 hexadecimal for ethernet DIX 2.0 (also known as ethernet II) framing. The ARP protocol has an ether type of 0x0806 hexadecimal, while the Reverse ARP (RARP) protocol has an ether type of 0x8035 hexadecimal. Also, the layer three X.25 Packet Layer Procedures (PLP) have an ether type of 0x0805, and thus X.25 PLP could be carried over MAC protocols such as, but not limited to, ethernet DIX 2.0 and/or IEEE 802.3/802.2 LLC with a SNAP header using the Service Access Points of 0xAA.

In addition, one skilled in the art will be aware that the IEEE 802.3 CSMA/CD MAC includes a two-octet length field in place of the two-octet ether type field of the ethernet II frame type. The EEEE defines an 802.2 Logical Link Control (LLC) header for allowing a control field to specify unnumbered connectionless mode or numbered connection-oriented mode at layer two as well as the Destination Service Access Point (DSAP) field and the Source Service Access Point (SSAP) field for multiprotocol multiplexing. A DSAP and SSAP of 0x06 hexadecimal are defined for IPv4. However, there is no Service Access Point (SAP) for ARP and RARP, and the preferred mechanism for carrying IPv4 in a frame with a 802.2 LLC header is to use the SubNetwork Access Protocol (SNAP) with a SAP value of 0xAA for both the DSAP and SSAP. With the SNAP protocol, a SNAP header follows the 802.2 LLC. The SNAP header contains a three-octet field known as an Organizationally Unique Identifier (OUI) that identifies an organization which administers the meaning of the Protocol Identifier (PID) which follows. An OUI of 0x000000 hexadecimal indicates that the following two octets are an ether type PID field with 0x0800 hexadecimal indicating DoD IPv4, with 0x0806 hexadecimal indicating ARP, and with 0x8035 hexadecimal indicating RARP. An OUI of 0x0080C2 hexadecimal indicates that the IEEE 802.1 LAN committee manages the following Protocol ID field.

All these non-limiting possible different LAN, WAN, and PPP frame types that might be carrying IPv4 and/or IPv6 datagrams indicate potential additional testing mechanisms for determining whether communication facilities contain filtering/forwarding entities that affect packets being carried over the communication facilities. Furthermore, various other multiprotocol technologies for label switching and/or tag switching, such as but not limited to MPLS, as well as multiprotocol tunneling and VPN technologies, such as but not limited to L2TP, offer various possible encapsulation and framing configurations for carrying IP datagrams. Generally, various packet-switching technologies.

Furthermore, although TCP generally is carried on top of IP as part of the TCP/IP suite of protocols, TCP provides a connection-oriented service, with a TCP connection defined by source and destination IP addresses together with source and destination port numbers. Thus, an encapsulated IP datagram may be carried inside of a TCP connection that is running on top of another IP layer. One skilled in the art should be aware that multiple levels of encapsulation, tunneling, and/or VPNs also are possible using these and other tunneling and/or VPN technologies.

In addition, the primary early layer four transport protocols used on the Internet generally were the connectionless User Datagram Protocol (UDP) and the connection-oriented Transmission Control Protocol (TCP). More recently other layer four protocols have come into use on top of IP including the connection-oriented protocol known as the Stream Control Transmission Protocol (SCTP). SCTP is described in the following Internet RFCs, which are each incorporated by reference in their entireties herein: RFC 2960, entitled "Stream Control Transmission Protocol"; RFC 3257, entitled "Stream Control Transmission Protocol Applicability Statement"; RFC 3286, entitled "An Introduction to the Stream Control Transmission Protocol (SCTP)"; and RFC 3309, entitled "Stream Control Transmission Protocol (SCTP) Checksum Change". Also, the Stream Control Transmission Protocol is described in the book "Stream Control Transmission Protocol (SCTP): A Reference Guide" by Randall R. Stewart and Qiaobing Xie with a forward by Mark C. Allman and with ISBN 0201721864 and a listed publication date in 2001, which is incorporated by reference in its entirety herein.

Also, Internet RFC 3057, entitled "ISDN Q.921-User Adaptation Layer" is incorporated by reference in its entirety herein and describes running the LAPD Q.921 messages over the layer-four, connection-oriented SCTP protocol, which is at least somewhat similar to the layer-four, connection-oriented TCP protocol. As Q.922 LAPF is relatively similar to Q.921 LAPD, this indicates that IP could be used to carry SCTP, which further carries layer two Q.922 LAPF frames of frame relay. Then these Q.922 LAPF frames could further encapsulate IP datagrams according to the standard IP over frame relay protocols of the following RFCs that are each incorporated by reference in their entireties herein: RFC 1294, entitled "Multiprotocol Interconnect over Frame Relay", RFC 1490, entitled "Multiprotocol Interconnect over Frame Relay", RFC 2427, entitled "Multiprotocol Interconnect over Frame Relay". RFC 2590, entitled "Transmission of IPv6 Packets over Frame Relay Networks Specification", RFC 1293, entitled "Inverse Address Resolution Protocol", and RFC 2390, entitled "Inverse Address Resolution Protocol".

Given all these possibilities for different framing for carrying protocols over various connection-oriented technologies such as, but not limited to, X.25, frame relay, ATM, MPLS, tunneling, and/or VPNs, some possibilities for test packets emerge. In general, service providers deploying routed cores generally would be expected to only support routing for just the IP protocol or possibly just a small number of protocols. Thus, the service provider equipment likely may only be expecting to receive packets with specific protocols. Also, the service provider equipment generally would be expecting only the preferred and/or generally accepted frame formats for carrying the different protocols. In contrast, normally the user data traffic carried on a virtual circuit is not examined by protocols such as, but not limited, to X.25, frame relay, and ATM. While X.25, frame relay, and ATM may look at the higher layer traffic of signaling messages for connection establishment and/or network management (such as, but not limited to the Local Management Interface (LMI) and Consolidated Link Later Management (CLLM) of frame relay), generally packet switches using these technologies do not examine user data beyond the respective X.25, frame relay, and ATM layers. Moreover, LAPF Q.922 is even further broken down into LAPF core and LAPF control with frame relay switches usually only looking at LAPF core. Therefore, a connection-oriented network with virtual-circuit packet switches for protocols such as, but not limited to, X.25, frame relay, and ATM generally would not have to worry about the potential of different frame types or encapsulations to handle multiple protocols.

In contrast, a routed core generally has be able to properly demultiplex and/or decapsulate the frame type information to find the IP datagram on which the routing decisions are made. If a routed core device cannot find the IP addresses in the header of an encapsulated IP datagram, the routed core generally cannot forward the packet. Such a packet might be silently discarded or might generate some detectable error message. Thus, sending and/or responding to packets with protocols or framing that normally would not be passed by a service provider's routed core, but which would be passed by virtual-circuit packet switches that ignore the information as just user data, is one way of testing a network to see if it contains a routed core.

As non-limiting examples, two devices could send and/or respond to frame relay packets that carry IP in a "routed" SNAP format that is not the preferred RFC 1294, 1490, and 2427 format for "routed" IP datagrams over frame relay. Also, the two devices could send and/or respond to frame relay packets that carry IP in "bridged" 802.3/ethernet format frame relay frames that normally would not be the expected frame format for receiving IP datagrams for routing by a service provider's routed core equipment. In addition, the frame relay frames might use Q.933 to carry PPP and/or LAPB data that further encapsulate IP datagrams, with PPP offering more additional multiprotocol framing formats for IP datagrams. The potential to select different protocols and frame types that are not expected to be forwarded by a routed core is nearly unlimited given the nearly limitless ways of encapsulating one protocol within another protocol. As another non-limiting example, the ATM ISO SAP of 0xFE could be used for the DSAP and SSAP with a NLPID of 0xCC to carry IP datagrams, even though RFCs 1483 and 2684 specifically describe not using this framing for IP datagrams. A routed core is likely to silently discard or generate an error message on receiving such a frame. In contrast, a virtual circuit with standard X.25, frame relay, and/or ATM packet switch would normally pass such frames because the frame format information is considered to be user data. In addition, the RFC standards define mechanisms for running PPP over ATM AAL2 and/or AAL5. PPP over ATM could be used to further encapsulate IP datagrams, again using various different possible frame formats within PPP. In any case, a routed core generally cannot be looking for every possible frame type and statistical multiplexing label that might be carrying IP datagrams for routing. Thus, such a routed core generally would either forward the unknown frame types as would normal X.25, frame relay, and/or ATM switches, or the routed core would filter the traffic. Given the network architecture of routed core networks, it is more probable that a routed core would filter such unexpected frame types. However, this difference in filtering/forwarding behavior of routed cores as compared to common virtual-circuit packet switches is one factor that can be used in discovering the network type.

Another issue in the preferred embodiments of the present invention is that third-party customer devices might not be expecting the test packets. Such third-party CPE might either silently discard the test packets or generate an error message. In any case, using the preferred embodiments of the present invention the local end CPE can determine whether the far end CPE of a virtual circuit can receive and/or respond to various network test messages. If the local end cannot get a response from the far end CPE, the local end device may be able to better decide on alternative strategies for providing network management of the customer's network.

Returning to FIG. 5, the tunneling and/or VPN technologies generally provide an ability for a layer three connectionless IP network (generally in conjunction with some other protocols) to be used to provide connection-oriented communication facilities between two remote customer premise networks (or two parts of an IP network) such as IP networks 516 and 526. Thus, these VPN and/or tunneling technologies often provide functionality between devices at the ends of the tunnels that is somewhat similar to FIG. 1. As a result, the preferred embodiments of the present invention also may be used to detect connection-oriented communication facilities 165 that may be based on VPNs and/or tunnels as found in the non-limiting example of FIG. 5 or other tunneling/VPN technologies.

Furthermore, one skilled in the art will be aware that tunneling technologies often may encapsulate other protocols such as, but not limited to, NetBEUI, IPX, and/or AppleTalk in addition to or instead of IP. Also, one skilled in the art will be aware that many other protocols (such as but not limited to IPX) include mechanisms that have been used in tunneling configurations prior to the more or less ubiquitous industry adoption of IP as a network protocol. As a non-limiting example, even before the tremendous growth of the Internet and web browsing when Novell's IPX protocol was the predominant network protocol on many LANs, Novell servers with the necessary software could be configured as end points for generally connection-oriented tunnels between pairs of Novell servers that routed IP traffic, which was encapsulated directly or indirectly within Novell IPX packets. Essentially, such pairs of Novell servers established a point-to-point relationship to create connection-oriented tunnels for carrying IP traffic directly or indirectly within IPX. Thus, using tunnels to create simulated or virtual point-to-point links between two end-points to provide generally connection-oriented service can be accomplished with other protocols instead of or in addition to IP.

Because of the economic success of the Internet and the now widespread deployment of IP networks, tunneling technologies more recently have been focused on carrying traffic over IP networks such as the Internet. However, one skilled in the art will be aware that in addition to the tunneling technologies that have been developed to take advantage of Internet technology, many other tunneling technologies exist that generally provide connection-oriented communication between tunnel end points, which generally have a point-to-point relationship. Thus, while FIG. 5 generally shows the tunneling of information that is directly or indirectly encapsulated within IP, it is to be understood that the preferred embodiments of the present invention also will work in identifying whether the general network services are connection-oriented or connectionless when tunnels using protocols other than IP are used to convey information between two devices and/or processes. Therefore, although FIG. 5 shows tunneling directly or indirectly through IP networks, this is only one of the most common tunneling and/or VPN configurations, and the preferred embodiments of the present invention are not to be limited only to tunneling technologies that directly or indirectly encapsulate information in IP datagrams.

As shown in FIG. 5, tunneling and/or VPN technology often is implemented as additional processes on devices acting as routers. However, other types of network devices also may be used to implement tunnels and/or VPNs. In FIG. 5, IP router 531 has a physical layer 551, datalink layer 552, and network layer 553 connection to IP network 516. In addition, the gateway tunneling and/or virtual private networking process 556 generally operates at layer four and/or higher to encapsulate IP datagrams from IP network 516 inside of IP datagrams forwarded to IP network 535. One skilled in the art should be aware that the IP datagrams from IP network 516 need not be directly encapsulated inside another IP datagram destined for IP network 535, as there may or may not be some other protocol information included with the encapsulated IP datagram. In addition to its interface to IP network 516, IP router 531 also has a physical layer 561, datalink layer 562, and network layer 563 connection to IP network 535. IP router 533 has a physical layer 571, datalink layer 572, and network layer 573 connection to IP network 526. In addition, the gateway tunneling and/or virtual private networking process 578 generally operates at layer four and/or higher to decapsulate IP datagrams from IP network 535 to recover the IP datagram that is sent on to IP network 526. One skilled in the art should be aware that a reverse process occurs for IP datagrams traveling from IP network 526 to IP network 516.

The first IP address realm of IP networks 516 and 526 generally will have different routes than the second IP address realm of IP network 535. Furthermore, the IP addresses of the first IP address realm of IP networks 516 and 526 may not even be valid IP addresses on the second IP address realm of IP network 535. For example, one skilled in the art should be aware that many private IPv4 networks may use all or parts of the 10.0.0.0/255.0.0.0 network, the 172.16.0.0/255.240.0.0 network, and/or the 192.168.0.0/255.255.0.0 network, which are not valid on the Internet. These private IP version 4 (IPv4) addresses are defined and discussed in the following Internet RFCs that are each incorporated by reference in their entireties herein: RFC 1335, entitled "A Two-Tier Address Structure for the Internet: A Solution to the Problem of Address Space Exhaustion"; RFC 1597, entitled "Address Allocation for Private Internets"; RFC 1627, entitled "Network 10 Considered Harmful (Some Practices Shouldn't be Codified)"; RFC 1814, entitled "Unique Addresses are Good"; RFC 1918, entitled "Address Allocation for Private Internets"; RFC 2101, entitled "IPv4 Address Behaviour Today"; and RFC 2775, entitled "Internet Transparency". In addition, the newer version of the IP protocol originally called IP next generation (IPng) and now named IP version 6 (IPv6) also includes a private address space of site local and link local 128-bit IPv6 addresses. Moreover, the 128-bit IPv6 address space allows for the mapping of the 32-bit IPv4 addresses into 128-bit IPv6 addresses. Therefore, the private IPv4 addresses of the 10.0.0.0/255.0.0.0 IPv4 network, the 172.16.0.0/255.240.0.0 IPv4 network, and the 192.168.0.0/255.255.0.0 IPv4 network also exist inside the newer 128-bit IPv6 address space.

The following RFCs describe at least some aspects of the IPv6 addressing architecture as well as other issues and are each incorporated by reference in their entireties herein: RFC 1752, entitled "The Recommendation for the IP Next Generation Protocol"; RFC 1883, entitled "Internet Protocol, Version 6 (IPv6) Specification"; RFC 1884, entitled "IP Version 6 Addressing Architecture"; RFC 1887, entitled "An Architecture for IPv6 Unicast Address Allocation"; RFC 1897, entitled "IPv6 Testing Address Allocation"; RFC 2073, entitled "An IPv6 Provider-Based Unicast Address Format"; RFC 2373, entitled "IP Version 6 Addressing Architecture"; RFC 2374, entitled "An IPv6 Aggregatable Global Unicast Address Format"; RFC 2460, entitled "Internet Protocol, Version 6 (IPv6) Specification"; RFC 2471, entitled "IPv6 Testing Address Allocation"; RFC 2526, entitled "Reserved IPv6 Subnet Anycast Addresses"; RFC 3177, entitled "IAB/IESG Recommendations on IPv6 Address Allocations to Sites"; RFC 3484, entitled "Default Address Selection for Internet Protocol version 6 (IPv6)"; RFC 3513, entitled "Internet Protocol Version 6 (IPv6) Addressing Architecture"; and RFC 3531, entitled "A Flexible Method for Managing the Assignment of Bits of an IPv6 Address Block".

In a common but non-limiting scenario, the first IP address realm of IP networks 516 and 526 may use a private addressing range, while the second IP address realm of IP network 535 may be the Internet and thus be using the Internet-valid IP address ranges. This scenario is only a non-limiting example to illustrate address realms and tunneling. In such a scenario, IP network 535 as the Internet may contain routers or filtering/forwarding entities that generally would filter out traffic with the invalid private IP addresses. However, by encapsulating the private IP addresses inside other IP datagrams with Internet-valid IP addresses, the routers or filtering/forwarding entities in the Internet would not detect the Internet-invalid or private IP addresses contained in the encapsulated datagrams. As a result these encapsulated datagrams with private IP addresses that are not valid on the Internet can be tunneled through the Internet to provide connection-oriented communication facilities between end devices.

By communicating network layer protocol packets in the frame type or format expected by the routed core but with other special characteristics, it is possible to determine whether communication facilities between two devices include filtering/forwarding entities (such as but not limited to IP routers) that filter packets based on the information in the network layer protocol packets having the special characteristics. In the case of tunneling, the communication facilities may contain filtering/forwarding entities (e.g., routers) that normally would operate to filter packets with the special characteristics if the characteristics occur at a certain level of the protocol stack. However, with tunneling these special characteristics may occur at a different level in the protocol stack, such that the filtering/forwarding entity (such as but not limited to a router) actually passes these packets. Thus, IP layer filtering performed by a filtering/forwarding entity (such as but not limited to a router) in IP network 535 may not operate at a peer entity level of the IP layer in IP hosts 515 and 525 connected to IP networks 516 and 526 respectively. Instead data from the peer entity IP layers in IP hosts 515 and 525 may be encapsulated as it crosses through VPN or tunneling IP encapsulation network 545, so that the IP layer of IP hosts 515 and 525 appears at a higher layer than protocol layer(s) generally manipulated by filtering/forwarding entities in IP network 535. These filtering/forwarding entities in IP network 535 likely would operate on the IP layer of IP network 535 as opposed to any encapsulated IP layer. Even in the case of tunneling and/or VPNs, the preferred embodiments of the present invention still work to identify whether the communication facilities between two devices and/or processes provide connection-oriented communication facilities or connection-less communication facilities such as found in routed core networks.

Figure 6:
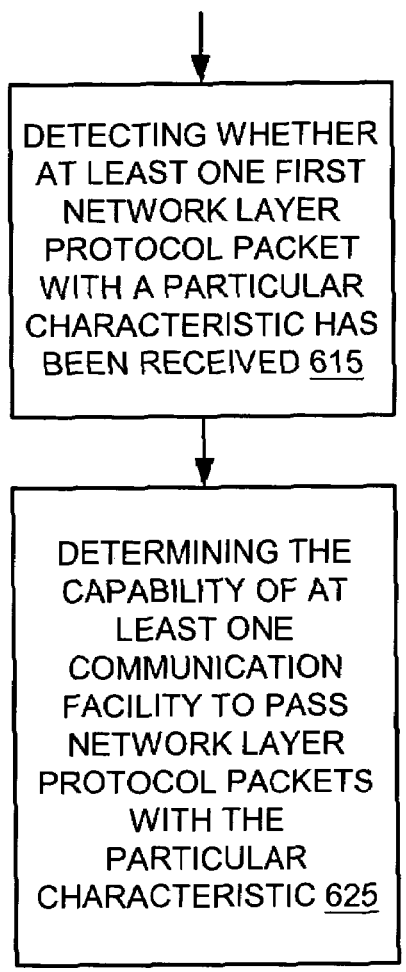
FIG. 6 is a non-limiting example flowchart of the steps performed for an embodiment of a method of detecting a capability of at least one communication facility.

Given this description of some types of network configurations, which would be useful to automatically identify or discover, the preferred embodiments of the present invention can now be described in more detail. FIG. 6 shows a simple flow chart of an embodiment of the present invention. Step 615 involves detecting whether at least one first network layer protocol packet with a particular characteristic has been received. Based on whether the packet is detected, step 625 involves determining the capability of at least one communication facility to pass one or more network layer protocol packets with the particular characteristic.

In a non-limiting case, the special or particular characteristic of the network protocol packets for testing the network can be based at least upon an understanding of the addressing architecture and configuration generally used for providing WAN connectivity for IP networks. Commonly, customers have used connection-oriented technologies (including but not limited to connection-oriented, virtual-circuit packet-switching technologies) of a WAN to connect remote locations as part of a customer network that may be further connected to the Internet at various access points. If such a customer network uses IP as at least one of potentially a plurality of network protocols, then the IP addressing within such a customer network usually may not expect packets with certain destination IP addresses to be forwarded across the service provider WAN links. Although a packet with a specific destination IP may be completely valid on the Internet, a customer network may be connected to the Internet only at various access points and may not expect to forward certain traffic destined for the Internet over some of the WAN links assigned to carry traffic of the customer network. Generally, IP packets, which are destined for the Internet and which are on one side of a WAN link where there already is an operational and suitable Internet access point (meeting any specified quality of service (QoS) requirements for the Internet-destined packets), do not get forwarded across the WAN link. Forwarding IP packets, which are destined for the Internet, across a WAN link is inefficient and wasteful of bandwidth on the WAN link, if a suitable, active Internet access point already exists on the same side of the WAN link as the IP packets. Thus, an Internet-valid IP address may be suitable as a destination address for testing the WAN links assigned to carry traffic of a customer network because the WAN links may not be expected to carry some Internet traffic with certain destination IP addresses. When an Internet router receives such unexpected packets, it may well react in a detectable way that indicates the reception of one or more unexpected packets.

As one skilled in the art will be aware, the routing tables in IP routers generally include various lists of the routes to particular destinations and often include a default route where a router is supposed to forward a packet if the packet does not match any of the other specified routes. Generally, a default route provides a default option for forwarding a packet in the event that a router otherwise does not know where a packet should be forwarded. Sometimes, a router can determine that packets it receives likely followed an inefficient routing path and instead should have been forwarded differently so that the router does not receive those packets in the future. Often such occurrences cause a router to issue various control messages indicating that packets are not being forwarded through the most efficient routing path. These control messages often inform other IP hosts and/or routers to change the way that they are forwarding packets. Furthermore, these control messages can be detected to indicate potential problems in the dynamic or static routing paths of IP hosts and/or routers. As non-limiting examples, the control message(s) may comprise one or more Internet Control Message Protocol (ICMP) messages and/or one or more dynamic IP routing protocol messages of one or more versions of protocols such as, but not limited to, RIP (Routing Information Protocol), OSPF (Open Shortest Path First), EGP (Exterior Gateway Protocol), and/or BGP (Border Gateway Protocol). Thus, IP routers associated with end points of a WAN link that receive IP packets with unexpected destination addresses may react in a way that allows resulting control messages to be detected indicating that some IP packets may have been incorrectly forwarded to the IP routers associated with end points of the WAN link. Thus, generation of such control messages is one way that routers can indicate the reception of packets that the routers were not expecting to forward.

Furthermore, one skilled in the art should be aware that service providers often are adding routed cores or connectionless services to connection-oriented communication facilities that previously have been used primarily for providing customer network WAN connectivity between one or more pairs of customer locations. In the past, service providers (and more specifically common carrier service providers) generally have provided connectivity between two points for carriage of generally any type data that a customer wanted the common carrier service provider to transport. Generally, customers would contract with one or more service providers for connectivity between at least one pair of customer locations using common carriage services. Under the previous regulatory environment, common carriers generally were prevented from manipulating customer data traffic that was carried using regulated basic services. In effect, some of the connection-oriented basic services offered by common carriers generally amounted to providing an actual or virtual pipe between one or more pairs of customer locations. The common carrier services of leased lines and/or circuit-switching connection-oriented networks generally provided permanent and/or temporary actual pipes, while the common carrier services of X.25, frame relay, and/or ATM connection-oriented packet-switching technologies generally provided virtual pipes through virtual circuits. However, until the development of new technology and a relaxation of the regulatory rules, service providers generally did not offer connectionless routing cores in their common carrier, regulated service offerings for providing connection-oriented communication.

In contrast to the common carriage offerings of service providers that were and/or are primarily regulated services, Internet access generally has been an unregulated service with customers just receiving dial-up service or an access line from an Internet service provider generally without specifying a particular destination other than potentially a point of presence (POP) of an Internet Service Provider (ISP). As an unregulated service, Internet access has not had the same limitations (especially with regard to data filtering and/or manipulation) that were placed on regulated common carrier services. Often large telecommunications service provider corporations are holding companies with both regulated and unregulated subsidiaries.

Normally for the connection-oriented common carrier services, the data of one customer is segregated from the data of another customer based on being on separate actual circuits (including but not limited to separate physical lines and/or separate non-statistical multiplexed channels) and/or on separate virtual circuits (i.e., separate statistical multiplexed channels). This data segregation allows the service provider to offer each customer some level of privacy as if the customer had their own private network. For virtual private networking and/or tunneling, the network itself normally may be shared in an integrated fashion such that one customer's traffic mixes with another customer's traffic. However, encryption is often used with VPNs and/or tunneling to enhance the privacy and provide a semblance of the private networking found in other connection-oriented common carrier services. In VPNs and/or tunneling, often one customer's traffic is in effect segregated from another customer's traffic by encryption using different encryption keys to segregate the data instead of segregating the data flows themselves. The data flows of different customers may be segregated by physical circuits using leased lines, circuit-switching and/or non-statistical multiplexing as well as by virtual circuits using the tags and/or labels of statistical multiplexing and/or packet switching.

The routed or connectionless cores of the service provider networks that are being added to service provider's connection-oriented services (such as but not limited to X.25, frame relay, and/or ATM) generally provide enhancements for carrying traffic between remote customer locations as distinguished from general Internet access. As a result the routed cores or connectionless services being added to a service provider's offering(s) of connection-oriented services generally only expect certain ranges of destination IP addresses in IP datagrams carried over service provider network(s) and carried between remotely-located portions of a customer network. In contrast, service provider Internet access lines generally may expect to carry any packet into the Internet that has an Internet-valid destination IP address.

Unlike normal Internet access, which generally does not segregate customer traffic (excluding VPNs and tunneling through the Internet that usually effectively segregates different customers' data using encryption among other things), the routed or connectionless cores of a service provider's connection-oriented services may still operate in a way that maintains a segregation of the data of one customer from the data of another customer using separate actual circuits (including but not limited to separate physical lines and/or separate non-statistically multiplexed channels) and/or separate virtual circuits (i.e., statistically multiplexed channels). The segregation of one customer's traffic from another customer's traffic may result in the service provider using an IP addressing architecture for each customer's segregated portion of a routed or connectionless core that conforms to each customer's IP addressing structure for that customer's segregated traffic.

Correspondingly, unlike the routing and addressing architecture of the Internet, the IP addressing structure, which is used in a routed or connectionless core of a service provider's connection-oriented communication facilities for a particular customer's traffic, generally will not provide a complete routing for all Internet addressable destination IP addresses because each customer's IP addressing structure and data will be maintained in a segregated fashion and each customer's IP addresses generally will be at most just a limited subset of the entire Internet-valid IP address space of the Internet. Furthermore, one skilled in the art should be aware that each customer's IP addressing structure need not even consist of Internet-valid IP address ranges. This segregated IP addressing structure of each customer's network going over a service provider's connection-oriented communication facilities generally means that the routed or connectionless core generally will be set up to provide routing for the segregated IP address space used on each customer's segregated IP networks as opposed to providing the generalized routing normally found in the Internet that generally provides addressability to deliver packets to the entire (or almost the entire) Internet-valid IP address space.

In general, at most the common carrier service provider's routed core of a connection-oriented network may generally have different default routes for each customer's segregated traffic, while the generally unsegregated traffic of normal connectionless Internet service provider routers may allow a default route for all the traffic going through the Internet service provider. As a result, the addition of a connectionless routed core to the previously connected-oriented services used by common carrier service providers generally will not have the same routing table completeness that likely would be found in routers used in connectionless Internet service provider networks that generally need to have a complete set of routing tables to unambiguously forward any packet with an Internet-valid destination IP address.

A default route is one way for Internet routers to maintain a complete set of unambiguous routes to all Internet-valid IP addresses without having to maintain a huge routing table with individual entries for every possible Internet route. On common routers used in Internet access networks, the default route is essentially used to complete a routing table for those routes that do not have an explicit entry in the routing table. However, unlike routers commonly used for Internet access networks, because of the segregation of the traffic of different customers, the routed core added to a common carrier service provider's previously connection-oriented services generally cannot have the same kind of global default route for the traffic of all customers that generally is used for unambiguously resolving the forwarding decisions of many routers used in Internet access, where various customers traffic generally does not remain segregated.

Furthermore, the VPN and/or tunneling technologies provide a mechanism for encapsulating packets with destination IP addresses belonging to a first IP address space within other IP packets that may have destination IP addresses from a second IP address space, where the second IP address space may or may not be consistent with the first IP address space. Often a company will use an IP address space on its own intranet that is different from or inconsistent with the IP address space of the Internet. The private network address ranges of 10.0.0.0/255.0.0.0, 172.16.0.0/255.240.0.0, and 192.168.0.0/255.255.0.0 are some non-limiting examples of addresses that are not part of the IP address space of the Internet as defined in RFCs 1597 and 1918, both entitled "Address Allocation for Private Internets", which are both incorporated by reference in their entireties herein. These private IP address ranges might be used on multiple customers networks with the result that such customers' IP addresses generally would conflict with each other unless the traffic of each customer generally is segregated from the traffic of the other customers (or unless some other mechanism such as but not limited to network address translation (NAT) is used to handle the conflict). In addition, multiple customers' private networks may actually use the same IP address ranges from the range of Internet-valid IP addresses. Such use of addresses from the Internet-valid IP address space by at least one customer network that should not be using the addresses is inconsistent with the Internet's address space. The IP address space used on a customer's segregated IP network may be inconsistent with and cause conflicts with the IP address space used on another customer's segregated IP network. However, both customers' networks generally will operate properly if the segregation of the traffic of the two customers is maintained in the service provider's network.

The addition of routed cores to connection-oriented service provider networks generally relates to a service provider adding IP routing services to common carriage network offerings that normally segregate different customers' traffic. Because the equipment deployed by service providers to provide a routed core generally includes the capability to route only a limited set of routable protocols, service providers usually limit customer data that is allowed in a routed core network to only include packets conforming to the supported set of routable protocols. Commonly, service providers generally support IP as a routable network protocol because of the ubiquitous adoption of IP technology by the industry. However, the embodiments of the present invention are not necessarily limited to just IP. The service provider's configuration of the routed or connectionless core to segregate each customer's traffic and to provide the correct routing (usually just including IP routing) for each customer's traffic generally leads to the routed or connectionless core in a service provider's connection-oriented communication facilities not knowing how to route IP datagrams with certain unexpected destination IP addresses for a particular customer's segregated portion of the network.

The use of different IP addresses on a company's intranet from the IP addresses used on the Internet is sometimes handled using various firewall, proxy, network address translation (NAT), and/or realm specific IP (RSIP) mechanisms that are described in the Internet RFCs. Particularly, the following Internet RFCs describe some of the issues and are all incorporated by reference in their entireties herein: RFC 1631, entitled "The IP Network Address Translator (NAT)"; RFC 2663, entitled "IP Network Address Translator (NAT) Terminology and Considerations"; RFC 2766, entitled "Network Address Translation—Protocol Translation (NAT-PT)"; RFC 2993, entitled "Architectural Implications of NAT"; RFC 3022, entitled "Traditional IP Network Address Translator (Traditional NAT)"; RFC 2979, entitled "Behavior of and Requirements for Internet Firewalls"; RFC 1919, entitled "Classical versus Transparent IP Proxies"; RFC 1928, entitled "SOCKS Protocol Version 5"; RFC 1929, entitled "Username/Password Authentication for SOCKS V5"; RFC 3089, entitled "A SOCKS-based IPv6/IPv4 Gateway Mechanism"; RFC 2765, entitled "Stateless IP/ICMP Translation Algorithm (SIIT)"; RFC 3102, entitled "Realm Specific IP: Framework"; RFC 3103, entitled "Realm Specific IP: Protocol Specification"; RFC 3104, entitled "RSIP Support for End-to-end IPsec"; and RFC 3105, entitled "Finding an RSIP Server with SLP". These mechanisms of address translation also may be used to translate between IPv4 and IPv6 as described in RFC 3142, entitled "An IPv6-to-IPv4 Transport Relay Translator", which is incorporated by reference in its entirety herein. Furthermore, the following RFCs on firewall benchmarking describe general firewall issues and are each incorporated by reference in their entireties herein: RFC 2647, entitled "Benchmarking Terminology for Firewall Performance", and RFC 3511, entitled "Benchmarking Methodology for Firewall Performance". Devices such as, but not limited to, firewalls, proxies, and NATs may be referred to collectively as middleboxes in RFC 3303, entitled "Middlebox communication architecture and framework", and RFC 3304, entitled "Middlebox Communications (midcom) Protocol Requirements", which are both incorporated by reference in their entireties herein.

Middleboxes, such as but not limited to, firewalls, proxies, and NATs, often utilize application layer gateways (ALGs) and other techniques to support various higher level protocols in the TCP/IP protocol suite. The following RFCs describe some of mechanisms used to support TCP/IP suite applications over middleboxes and are each incorporated reference in their entireties herein: RFC 1579, entitled "Firewall-Friendly FTP"; RFC 2356, entitled "Sun's SKIP Firewall Traversal for Mobile IP"; RFC 2391, entitled "Load Sharing using IP Network Address Translation (LSNAT)"; RFC 2428, entitled "FTP Extensions for IPv6 and NATs"; RFC 2685, entitled "Virtual Private Networks Identifier"; RFC 2694, entitled "DNS extensions to Network Address Translators (DNS_ALG)"; RFC 2962, entitled "An SNMP Application Level Gateway for Payload Address Translation"; RFC 3027, entitled "Protocol Complications with the IP Network Address Translator"; RFC 3235, entitled "Network Address Translator (NAT)-Friendly Application Design Guidelines"; RFC 3424, entitled "IAB Considerations for UNilateral Self-Address Fixing (UNSAF) Across Network Address Translation"; RFC 3489, entitled "STUN—Simple Traversal of User Datagram Protocol (UDP) Through Network Address Translators (NATs)"; and RFC 3519, entitled "Mobile IP Traversal of Network Address Translation (NAT) Devices". In addition, the following books describe various middlebox technologies and other issues and are each incorporated by reference in their entireties here: "Building Internet Firewalls, Second Edition" by Elizabeth D. Zwicky, Simon Cooper, and D. Brent Chapman with ISBN B00008CM39 and a listed publication date in 2000, "Web Proxy Servers" by Ari Luotonen with ISBN 0136806120 and a listed publication date in 1997, and "The NAT Handbook: Implementing and Managing Network Address Translation" by Bill Dutcher with ISBN 0471390895 and a listed publication date in 2001.

The addition of a routed core to a service provider's common carriage service offerings is different from the inherently connectionless datagram service within a routed network that is provided through Internet access lines. The virtual private networking (VPN) and tunneling technologies generally use encryption to try to emulate the traffic segregation and privacy functionality found in common carrier connection-oriented services (such as but not limited to leased lines, circuit switching, X.25, frame relay, and/or ATM). Often the traffic segregation methodologies of VPNs and tunnels (primarily based upon encryption) are used over networks such as the Internet, where the traffic of many customers/users is commingled. Furthermore, one skilled in the art should be aware that the Internet access line may or may not use some of the same technologies used in common carrier services including, but not limited to, connection-oriented services.

Given this understanding of the addressing structure commonly found in service providers' connection-oriented networks with routed cores, one non-limiting choice for the particular or special characteristic is a destination IP address that normally would not be expected to be forwarded by a routed core. Because the routed core architectures of service providers' connection-oriented network services generally are not intended to provide complete Internet routing, the choice of an Internet-valid IP address that is not likely to be part of a customer's IP address space is one reasonable non-limiting possibility for the destination IP address in a test packet. In designing networks and the corresponding address configurations, customers generally attempt not to use Internet-valid IP addresses assigned to other customers. In this way, a network can later be connected to the Internet without significant and costly renumbering of IP devices or other expensive options such as network address translation. Thus, a non-limiting choice of a destination IP address that is not likely to be used by other customers may well be an Internet-valid IP address that is assigned to a particular customer, such as but not limited to Paradyne Corporation. As other companies are not likely to use Paradyne Corporation's Internet-valid IP addresses in the other companies' private IP networks, and as the routed core of a service provider's connection oriented services generally does not provide complete routing for the Internet address space, a packet with a destination IP address as one of Paradyne Corporation's Internet-valid IP addresses is likely to be passed by a service provider's connection-oriented facilities (which do not contain a routed core) but is likely to be filtered or blocked by a service provider's connectionless or routed core.

As was shown in step 615 of FIG. 6, just detecting packets with the special characteristic such as but not limited to a special destination IP address provides some information for determining the network capabilities as shown in step 625. However, in general network discovery or testing techniques sometimes involve injecting test packets and/or detecting test packets. A simple, but non-limiting mechanism for performing these functions involves an initiating device together with a target and/or responding device. Generally, receipt of a test packet with the particular characteristic indicates that the communication facilities are capable of passing the test packet in at least one direction. If an incoming test packet is received in response to a previously-sent outgoing test packet, this generally indicates that the communication facilities are capable of passing the test packet in both directions from the source to the destination and back from the destination to the source of the original transmission. FIG. 6 shows the steps that might be performed by an initiating device and/or process, a target/responding device and/or process, as well as a device and/or process that performs both as initiator and target/responder.

Figure 7:
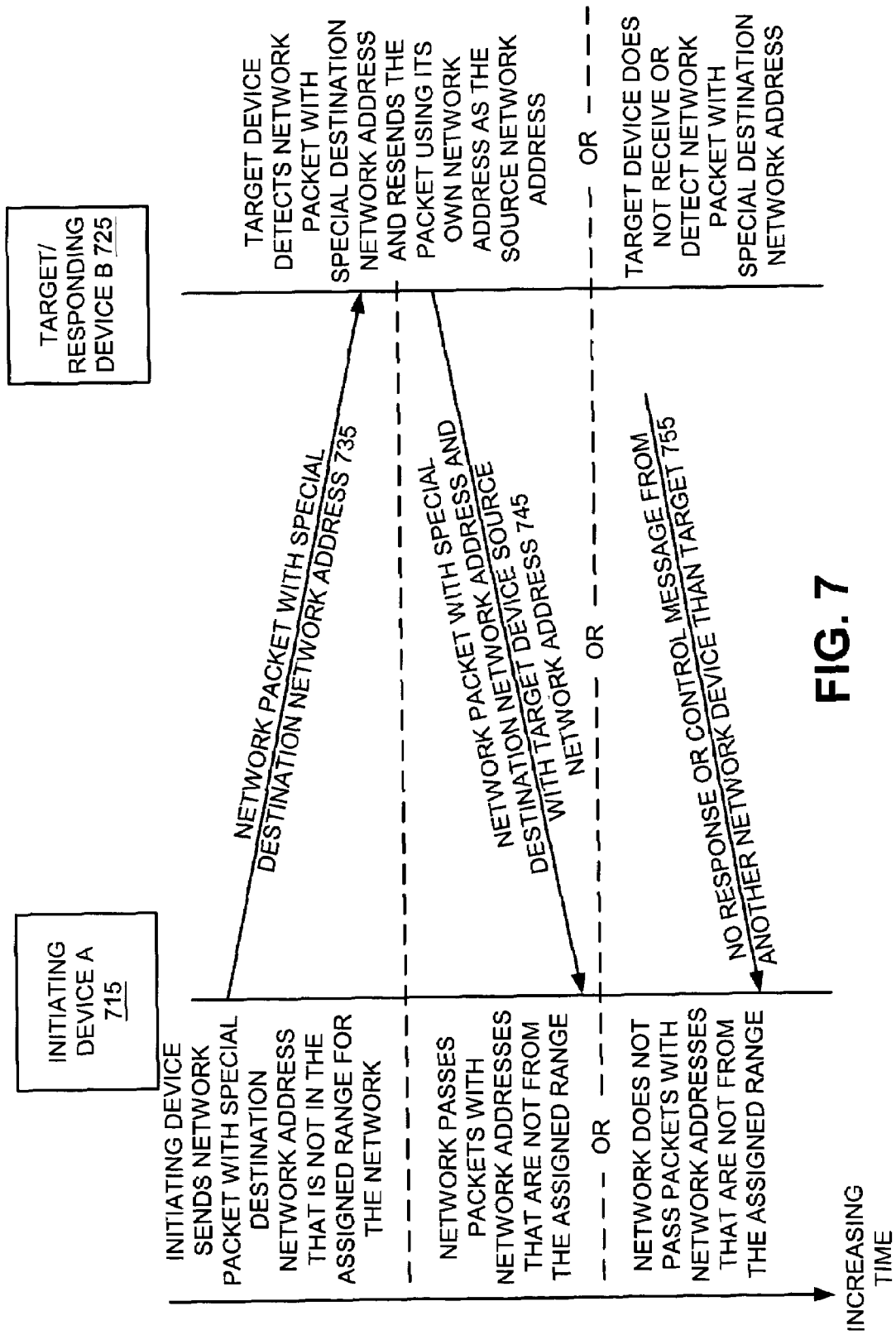
FIG. 7 is a timing and packet diagram for an initiating device and a target device transmitting and/or receiving packets to test the network configuration.

This non-limiting simple initiating and target/responding mechanism is displayed in more detail in FIG. 7, which shows a timing diagram of communication of packets between an initiating device A 715 and a target or responding device B 725. Initially an initiating device sends a network packet with a special destination address 735 that is not in the assigned range for the network. In other words, a non-limiting example of the special characteristic is a selection of a destination network address that is outside of the address realm that normally would be communicated between initiating device A 715 and target/responding device B 725. If the network provides connection-oriented service between initiating device A 715 and target/responding device B 725, then the packet with the special destination address outside of the address realm will be forwarded to the target/responding device B 725. Such connection-oriented services may have been provided by a layer two network, by a circuit-switched connection, or other possible network and facility configurations. On the other hand, if the network provides connectionless datagram service between initiating device A 715 and target/responding device B 725, then the packet with the special destination address outside of the address realm likely will not be forwarded to the target/responding device B 725 because IP forwarding/filtering entities (e.g., routers in a routed core) will have filtered the packet that unexpectedly has a destination IP address that the filtering/forwarding entities did not expect to forward.

Once a packet with the special destination network address 735 outside of the expected range of the address realm for the network is received by the target/responding device B 725, the target/responding device B 725 generally can conclude that the service provider communication facilities will pass the packet with the special characteristic and that the service provider communication facilities provide connection-oriented service as opposed to connectionless service (with for example a routed core). To inform the initiating device A 715 that the network passes the packet with the special destination network address outside of the expected range of the address realm, the target/responding device B 725 responds by sending a network packet with the special destination network address and with the target device's network address as the source address 745. If this response is received by the initiating device A 715, the initiating device A 715 generally can conclude that the service provider communication will pass the packet with the special characteristic and that the service provider communication facilities provide connection-oriented service as opposed to connectionless service (with for example a routed core).

On the other hand, if the service provider communication facilities provide connectionless service (for example with a routed core at the layer where the special destination address is carried) then the filtering/forwarding entities (e.g., routers) in the service provider network likely will filter the network packet with the special destination network address 735 that is outside of the expected range of network addresses for the address realm associated with the level at which the filtering/forwarding entities in the service provider network make filtering and/or forwarding decisions. Furthermore, the TCP/IP (Transmission Control Protocol/Internet Protocol) suite contains an Internet Control Message Protocol (ICMP) that some filtering/forwarding entities (e.g., routers) may use to inform devices about the incorrectly addressed packets.

Several types of ICMP messages might be generated by a router based on receipt of an IP datagram with a destination address outside of the expected address ranges. For instance, a router may send an ICMP source-quench message to inform the device to stop sending the packet with the presumably invalid destination network address. Also, a router may send an ICMP redirect message to inform the sending device that the packet with the special destination network address should be sent to some other router because the router that received the packet does not know how to forward a packet with that address, which is outside of the expected address range of the address realm. Other non-limiting examples of ICMP messages that might be received in response to the incorrect destination IP address for the address realm include: a destination unreachable message, a time exceeded message, and/or a parameter problem message.

The following Internet RFCs at least partially describe the ICMP protocol associated with IPv4 and the ICMPv6 protocol associated with IPv6 with each of the following RFCs incorporated by reference in their entireties herein: RFC 760, entitled "DOD Standard Internet Protocol"; RFC 777, entitled "Internet Control Message Protocol"; RFC 791, entitled "Internet Protocol: DARPA Internet Program Protocol Specification"; RFC 792, entitled "Internet Control Message Protocol: DARPA Internet Program Protocol Specification"; RFC 950, entitled "Internet Standard Subnetting Procedure"; RFC 1256, entitled "ICMP Router Discovery Messages"; RFC 1788, entitled "ICMP Domain Name Messages"; RFC 2521, entitled "ICMP Security Failures Messages"; RFC 1739, entitled "A Primer On Internet and TCP/IP Tools"; RFC 2151, entitled "A Primer On Internet and TCP/IP Tools and Utilities"; RFC 1393, entitled "Traceroute Using an IP Option"; RFC 1885, entitled "Internet Control Message Protocol (ICMPv6) for the Internet Protocol Version 6 (IPv6) Specification"; RFC 2463, entitled "Internet Control Message Protocol (ICMPv6) for the Internet Protocol Version 6 (IPv6) Specification"; RFC 1970, entitled "Neighbor Discovery for IP Version 6 (IPv6)"; RFC 2461, entitled "Neighbor Discovery for IP Version 6 (IPv6)"; and RFC 3122, entitled "Extensions to IPv6 Neighbor Discovery for Inverse Discovery Specification".

Furthermore, the header of IP datagrams has a time-to-live (TTL) field that commonly is used in best-effort delivery of datagrams to avoid endlessly forwarding packets in a routing loop (or a cycle to use a potentially more accurate term from graph theory). The TTL field is an integer value that generally is set when a datagram is created, and the field generally is decremented by one each time a datagram crosses into a router to be forwarded. When the TTL count reaches zero, a router removes the datagram from the network to prevent endless forwarding of datagrams in a routing loop (e.g., when the routes in the routers are such that the datagram would be forwarded among the routers in a potentially endless loop or cycle). Although the TTL field was developed to specify the time-to-live for a packet in seconds, the TTL value of a packet has essentially become a hop count that specifies a number associated with the maximum number of router hops over which a datagram can be forwarded before the datagram should be removed from the network. This TTL field may be set to a low number such as two to detect the configuration of the service provider communication facilities because routers in a layer-three, routed-core network generally decrement the hop count as well as discard the packet and generate an ICMP time exceeded message when the TTL count reaches zero. A network (such as a connection-oriented network), which generally does not contain layer three filtering/forwarding entities that operate on the same level as the IP datagram containing the TTL field with the low initial TTL count number (such as two), generally will forward the IP datagrams without a problem and ignore the TTL field of the IP datagrams. Thus, setting the TTL field to a relatively low number, such as but not limited to two, is useful in detecting the configuration of a network and/or communication facilities.

In FIG. 7 some non-limiting examples of these situations of the packet with the special destination network address not being delivered are shown as arrow 755 potentially indicating no response from the target/responding device 725 or a control message response from a device that considers the packet to be destined for an unexpected IP address. Based on not receiving a response or based on receiving a control message (such as but not limited to an ICMP message), the initiating device A 715 generally can conclude that the service provider communication facilities will not pass the packet with the special characteristic and that the service provider communication facilities provide connectionless service (with for example a routed core) as opposed to connection-oriented service. Thus, by detecting a packet with a special characteristic such as but not limited to a destination address outside of the expected address range for an IP address realm, a device may be able to distinguish whether the service provider communication facilities generally conform to FIG. 1 or generally conform to FIG. 3. Given this information on the configuration of a service provider's communication facilities connecting customer premises equipment, customer premises equipment may react by using various different monitoring and measuring mechanisms to keep track of network health and/or performance.

Figure 8:
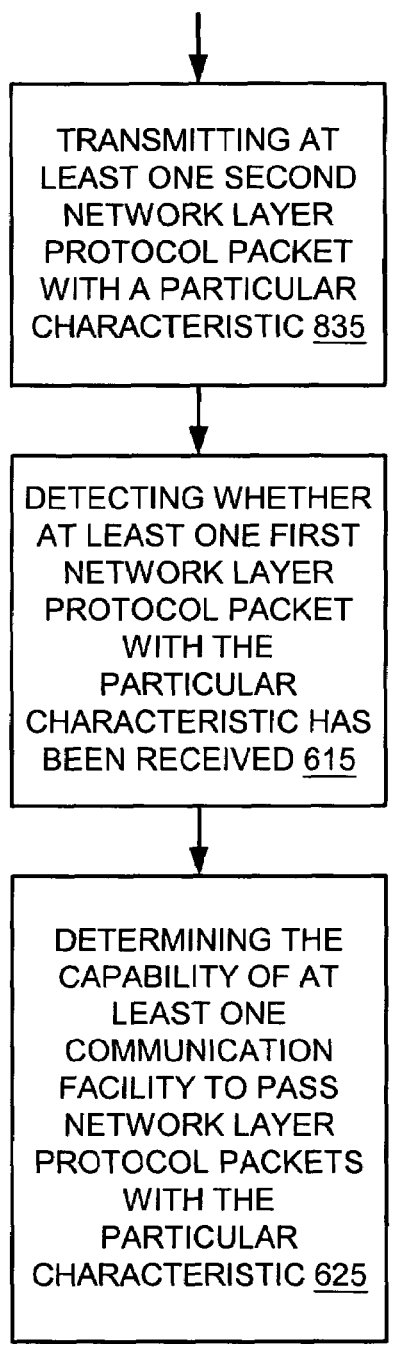
FIG. 8 is a non-limiting example flowchart of the steps performed by an embodiment of an initiating device.
Figure 9:
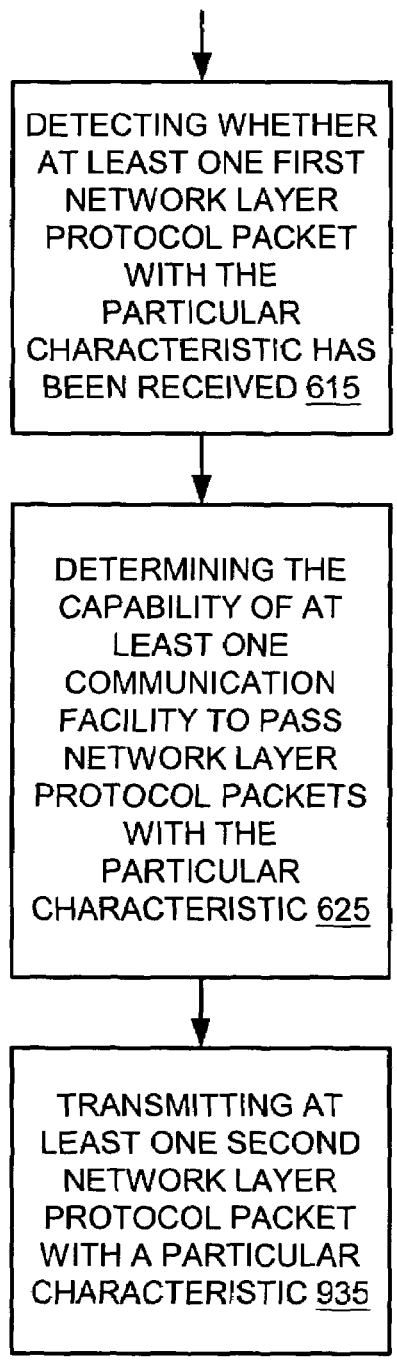
FIG. 9 is a non-limiting example flowchart of the steps performed by an embodiment of a target/responding device.

FIG. 8 shows a simplified flow chart of the behavior of the initiating device A 715 based on FIG. 6. For the initiating device A 715, step 835 of transmitting at least one second network layer protocol packet with a particular characteristic is added before step 615. FIG. 9 shows a simplified flow chart of the behavior of the target/responding device B 725 based on FIG. 6. For the target/responding device B 725, step 935 of transmitting at least one second network layer protocol packet with a particular characteristic is added after step 625. Note that the order of the steps in the flow charts can still be rearranged in some cases. Thus, the order of the flowchart steps in FIGS. 6 and 8-11 is not intended to be solely limited to the embodiments shown in the flowcharts. One skilled in the art should be aware that the order of some steps can be rearranged and that some steps may be performed in parallel.

Figure 10A:
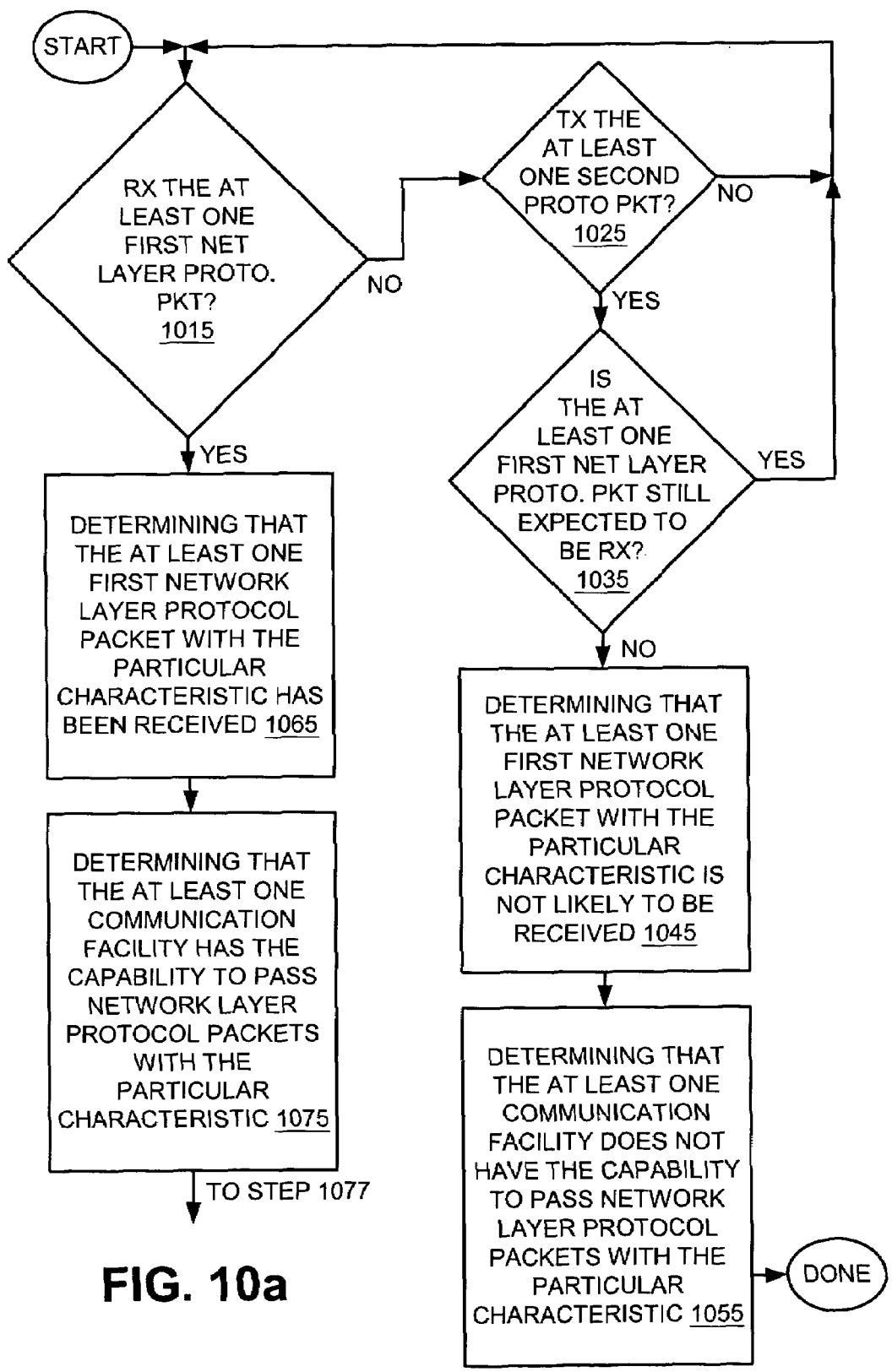
FIGS. 10a and 10b depict a non-limiting example flowchart of the steps performed by a device acting both as an initiating device and a target/responding device.
Figure 10B:
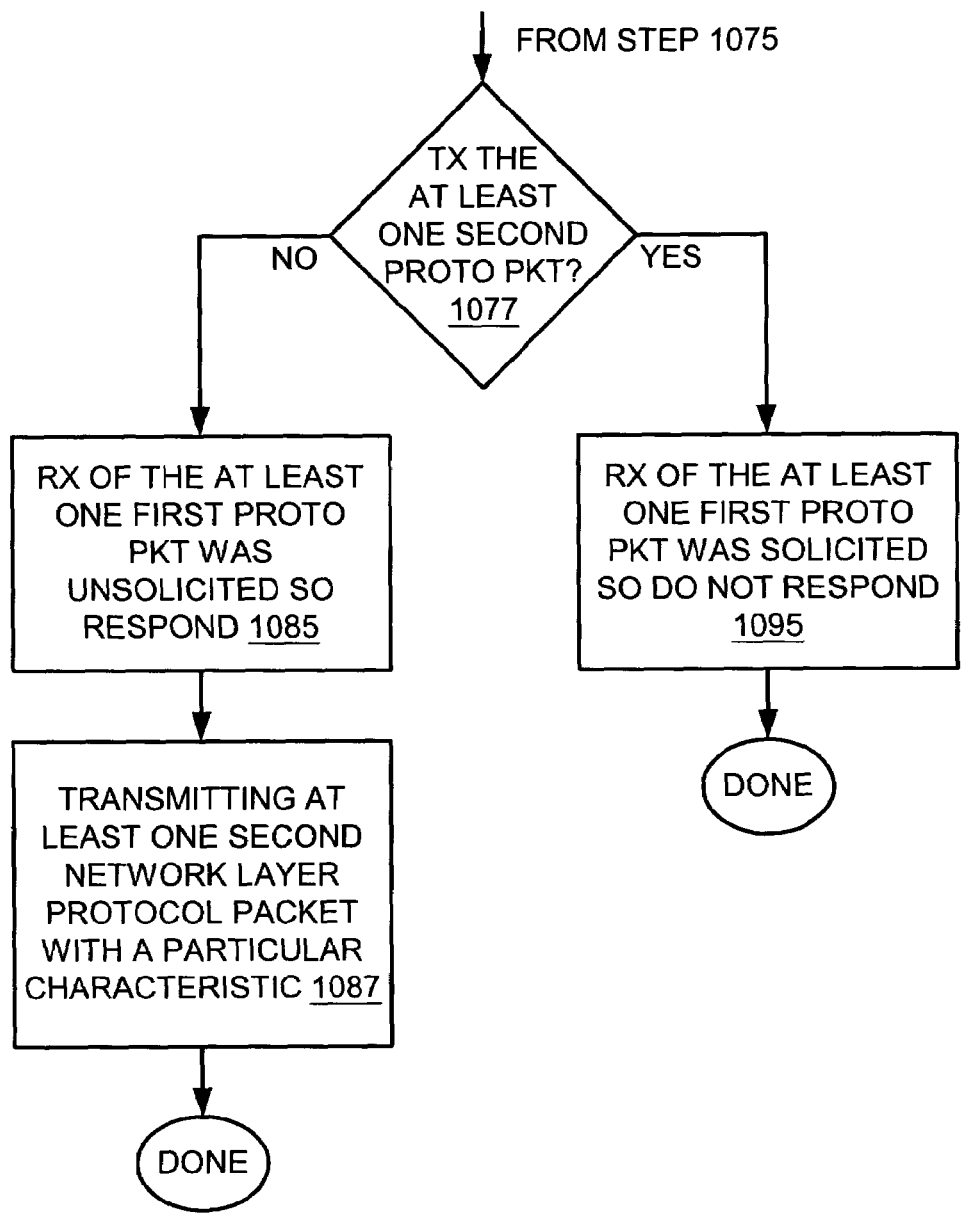

FIGS. 10a and 10b show another simplified flowchart for a device that may include the capability of both initiating and responding to network packets with the special or particular characteristic (such as but not limited to a special destination network address that is outside the range of the address realm for the network). As shown in FIG. 10a, a device or process using the preferred embodiments of the present invention generally is in a loop waiting to receive at least one first network layer protocol packet with the special or particular characteristic at step 1015. One skilled in the art should be aware that waiting for an event to occur can be implemented using various mechanisms including loops and/or interrupt requests. If the reception of the at least one first network layer protocol packet has not been received at step 1015, then step 1025 is performed to determine whether the device is currently acting as a initiating device or a responding device based on whether at least one second network layer protocol packet with the special characteristic was previously transmitted. If the at least one second network layer protocol packet was not previously transmitted, then the operation returns to step 1015. If the at least one second network layer protocol packet was previously transmitted, then the operation moves to step 1035. In step 1035 it is determined whether the at least one first network layer protocol packet is still expected to be received. If the packet is still expected to be received, processing returns to checking for receipt of the packet in step 1015. If the at least one first network layer protocol packet is no longer expected to be received, processing moves to step 1045. Step 1045 involves determining that the at least one first network layer protocol packet with the particular characteristic is not likely to be received, with the conclusion of moving to step 1055. In step 1055, based on the at least one first network layer protocol packet not being likely to be received, the conclusion is made that the at least one communication facility does not have the capability to pass network layer protocol packets with the particular characteristic of a destination address outside of the expected range for the IP address realm. This conclusion implies that the at least one communications facility provides connectionless service with a layer three network having a routed core being a non-limiting example of communication facilities offering connectionless service.

However, if at least one first network layer protocol packet is received with the special characteristic of a destination address outside of the expected range for the IP address realm, then processing moves from step 1015 to step 1065. Step 1065, involves determining that the at least one first network layer protocol packet with the particular characteristic has been received, with the conclusion of moving to step 1075. In step 1075, based on the at least one first network layer protocol packet having been received, the conclusion is made that the at least one communication facility does have the capability to pass network layer protocol packets with the particular characteristic of a destination address outside of the expected range for the IP address realm. This conclusion implies that the at least one communications facility generally may provide connection-oriented service with the layer two networks of frame relay and ATM being non-limiting examples of communication facilities generally offering connection-oriented service without intervening connectionless filtering/forwarding entities as would be found in a routed core.

For the combined initiating and responding process of FIGS. 10a and 10b, a decision still has to be made as to whether to respond to the received packet. Thus, leaving step 1075 and entering step 1077, a decision is made as to whether the device or process previously transmitted at least one second network layer protocol packet with the special characteristic. If the at least one network layer protocol packet with the special characteristic was not previously transmitted, then the received packet was unsolicited, so a response should be generated as shown in step 1085. Going from step 1085 to step 1087, the response is transmitted to allow the initiating device to receive a response packet with the particular characteristic of a destination address outside of the expected range for the IP address realm. If the at least one network layer protocol packet with the special characteristic was previously transmitted, then the received packet was solicited, and the received packet was a response. Therefore, a response should not be generated as shown in step 1095. One skilled in the art will realize that this simplified flowchart just lays out one non-limiting implementation of the preferred embodiments of the present invention, and other implementations are easily developed.

Figure 11:
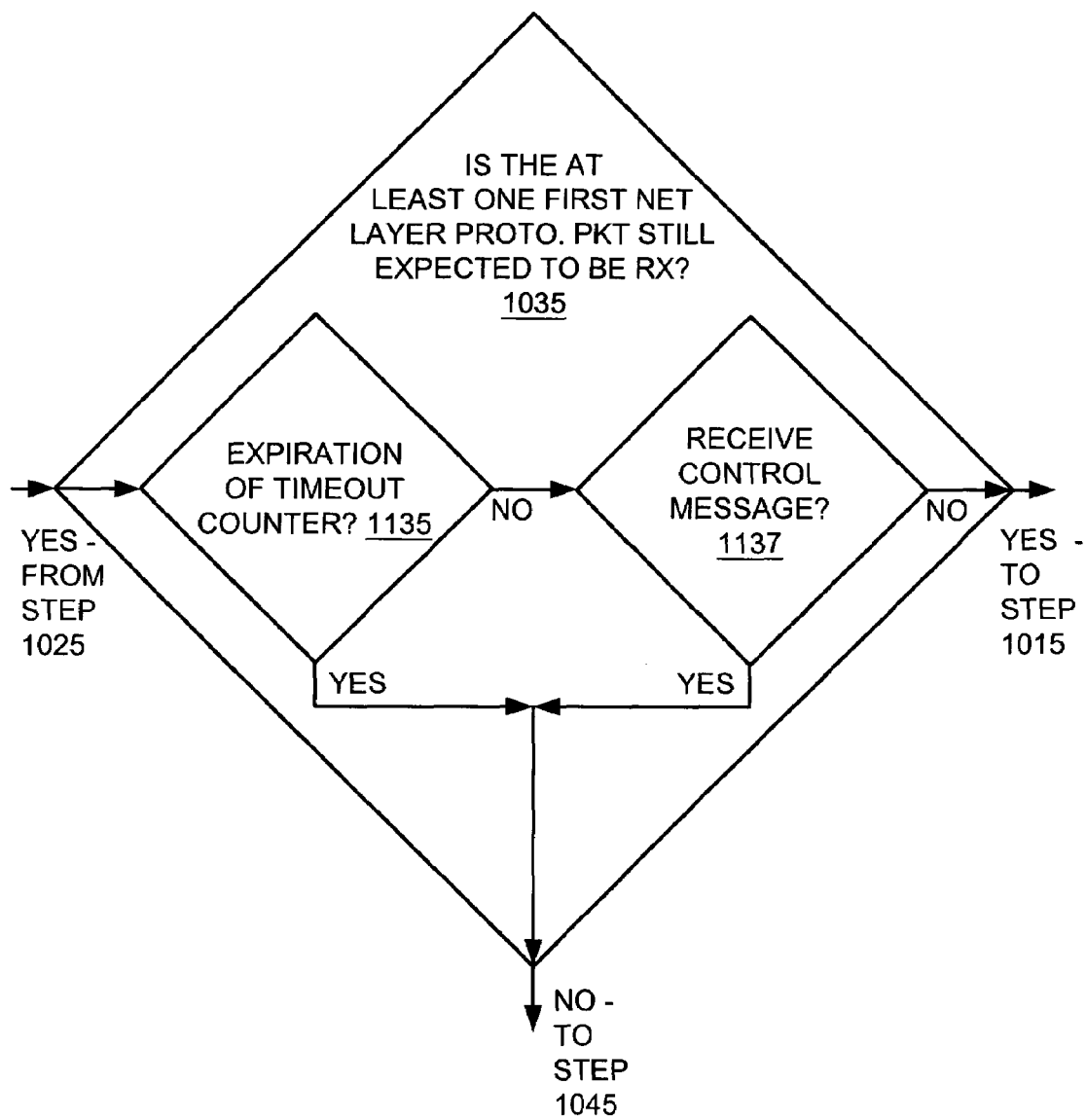
FIG. 11 is a non-limiting example flowchart further expanding a step from FIG. 10a to show at least two conditions when a particular packet is no longer expected to be received.

FIG. 11 shows a flowchart further breaking down step 1035 to determine if the at least one first network layer protocol packet is still expected to be received. There are at least two situations wherein the packet is no longer expected to be received. First, if too much time or a timeout has occurred since the initiating packet was sent, the response generally should no longer be expected as shown in step 1135. Also, if a control message (such as but not limited to an ICMP source-quench message or an ICMP redirect message) regarding the packet is received, then the response should no longer be expected as shown in step 1137.

Given this description, one skilled in the art will be able to develop software and/or hardware to implement the preferred embodiments of the present invention. Also, one skilled in the art will be able to utilize the invention to automatically discover whether communication facilities between two devices provide connection-oriented service or connectionless service. This discovery of the service capabilities between two devices generally relates to determining the core type of a network as being a layer two network or a layer three routed-core network.

It should be emphasized that the above-described embodiments are merely possible examples of implementations, which are set forth for a clear understanding of the principles of the invention. Many variations and modifications may be made to the above-described embodiments. All such modifications and variations are intended to be included herein within the scope of this disclosure.

Therefore, having thus described the invention, at least the following is claimed:

1. A method of determining a capability of at least one communication facility to pass network layer protocol packets with a particular characteristic between a first network layer protocol process and a second network layer protocol process, the method comprising the steps of:

detecting whether at least one first network layer protocol packet has been received, the at least one first network layer protocol packet comprising first information with the particular characteristic, the first information being capable of causing at least one filtering/forwarding entity not to pass the at least one first network layer protocol packet; and determining the capability of the at least one communication facility to pass the network layer protocol packets with the particular characteristic.

2. The method of claim 1, wherein, upon detecting that the at least one first network protocol packet has been received, the at least one communication facility is determined not to comprise the at least one filtering/forwarding entity and is determined to be capable of passing the network layer protocol packets with the particular characteristic.

3. The method of claim 1, wherein, upon detecting that the at least one first network protocol packet is no longer expected to be received, the at least one communication facility is determined to comprise the at least one filtering/forwarding entity and is determined not to be capable of passing the network layer protocol packets with the particular characteristic.

4. The method of claim 1, wherein the particular characteristic comprises a destination network layer address that is outside of a network address realm comprising network layer addresses of network layer protocol packets that would be forwarded by the at least one filtering/forwarding entity.

5. The method of claim 4, wherein the at least one filtering/forwarding entity is at least one network layer router that operates as a peer protocol layer entity to the at least one first network layer protocol process and the at least one second network layer protocol process.

6. The method of claim 1, wherein the step of determining that the at least one first network layer protocol packet has been received further comprises the steps of:

starting a timeout counter associated with transmitting at least one second network layer protocol packet;

detecting expiration of the timeout counter without having received the at least one first network layer protocol packet.

7. The method of claim 1, wherein the step of determining that the at least one first network layer protocol packet has been received further comprises the step of:

receiving a control message indicating that the at least one first network layer protocol packet was not passed through the at least one communication facilities.

8. The method of claim 7, wherein the control message is at least one of: an ICMP destination unreachable message, an ICMP time exceeded message, an ICMP parameter problem message, an ICMP source-quench message, and an ICMP redirect message.

9. The method of claim 1, wherein determining that the at least one communication facility passes network layer protocol packets with the particular characteristic implies that the at least one communication facility does not utilize routing at a peer protocol layer to the first network layer process and the second network layer process.

10. The method of claim 9, wherein the at least one communication facility provides services below the first network protocol layer process and the second protocol layer process that establish a one-to-one association between the first network protocol layer process and the second network protocol layer process.

11. The method of claim 10, wherein the services provided by the network are connection-oriented services that establish the one-to-one association.

12. The method of claim 11, wherein the connection-oriented services are circuit-switching services.

13. The method of claim 11, wherein the connection-oriented services are connection-oriented packet-switching services.

14. The method of claim 13, wherein the connection-oriented packet-switching services are layer two services.

15. The method of claim 10, wherein the one-to-one association is established by a tunneling protocol that encapsulates the network protocol packets.

16. The method of claim 1, wherein determining that the at least one communication facility does not pass network layer protocol packets with the particular characteristic implies that the network utilizes routing at a peer protocol layer to the first network layer process and the second network layer process.

17. The method of claim 16, wherein determining that the network utilizes routing implies that the network has at least a layer three network core.

18. A system to determine a capability of at least one communication facility to pass network layer protocol packets with a particular characteristic between a first network layer protocol process and a second network layer protocol process, the method comprising the steps of:

first logic configured to detect whether at least one first network layer protocol packet has been received, the at least one first network layer protocol packet comprising first information with the particular characteristic, the first information being capable of causing at least one filtering/forwarding entity to not pass the at least one first network layer protocol packet; and second logic configured to determine the capability of the at least one communication facility to pass the network layer protocol packets with the particular characteristic.

19. The system of claim 18, wherein based at least upon the first logic detecting that the at least one first network protocol packet has been received, the at least one communication facility is determined not to comprise the at least one filtering/forwarding entity and is determined to be capable of passing the network layer protocol packets with the particular characteristic.

20. The system of claim 18, wherein based at least upon the first logic detecting that the at least one first network protocol packet is no longer expected to be received, the at least one communication facility is determined to comprise the at least one filtering/forwarding entity and is determined to not be capable of passing the network layer protocol packets with the particular characteristic.

21. The system of claim 18, further comprising the step of:

logic configured to transmit at least one second network layer protocol packet comprising second information with the particular characteristic, the second information being capable of causing at least one filtering/forwarding entity to not pass the at least one second network layer protocol packet.

22. The system of claim 18, wherein the particular characteristic comprises a destination network layer address that is outside of a network address realm comprising network layer addresses of network layer protocol packets that would be forwarded by the at least one filtering/forwarding entity.

23. The system of claim 20, wherein the at least one filtering/forwarding entity is at least one network layer router that operates as a peer protocol layer entity to the at least one first network layer protocol process and the at least one second network layer protocol process.

24. The system of claim 21, wherein the at least one first network layer protocol process is an internet protocol (IP) process, wherein the at least one second network layer protocol process is an internet protocol (IP) process, and the at least one network layer router is at least one internet protocol (IP) router.

25. A method of determining a capability of a communication facility to pass certain network layer packets between a first network layer protocol entity and a second network layer protocol entity, the method comprising the steps of:

detecting reception of a network layer packet having information with a particular characteristic, the information causing a filtering/forwarding entity to block the network layer packet from passage through the entity; and determining that the communication facility has a capability of passing network layer packets with the particular characteristic, upon detecting that the network layer packet having information with the particular characteristic has been received; and determining that the communication facility has no capability of passing the network layer packets with the particular characteristic, upon detecting that the network layer packet having information with the particular characteristic is no longer expected to be received.

26. The method of claim 25, wherein the information comprises a destination network address and the particular characteristic comprises the destination network layer address being outside of a network address realm, the network address realm including network layer addresses of network layer packets that would be forwarded by the filtering/forwarding entity.

27. The method of claim 25, wherein the filtering/forwarding entity is a network layer router operating as a peer protocol layer entity to the first network layer protocol entity and to the network layer protocol entity.

28. The method of claim 25, wherein the method is performed by a test endpoint.

29. The method of claim 25, further comprising:

transmitting a second network layer packet having information with the particular characteristic, the information causing the filtering/forwarding entity to block the second network layer packet from passage through the entity.

30. The method of claim 25, further comprising:

determining that the communication facility does not utilize routing at a peer protocol layer to the first network layer entity and the second network layer entity, in response to determining that the communication facility has a capability of passing network layer packets with the particular characteristic.

31. The method of claim 25, further comprising:

determining that the network utilizes routing at a peer protocol layer to the first network layer entity and the second network layer entity, in response to determining that the communication facility has no capability of passing network layer packets with the particular characteristic.

32. The method of claim 31, further comprising:

determining that the network has at least a layer three network core, in response to determining that the network utilizes routing at a peer protocol layer to the first network layer entity and the second network layer entity.

33. The method of claim 25, wherein detecting that the network layer packet is no longer expected to be received received further comprises the steps of:

starting a timeout counter associated with transmitting a second network layer packet; and detecting expiration of the timeout counter without having received the network layer packet.

34. The method of claim 25, wherein detecting that the network layer packet is no longer expected to be received received further comprises the steps of:

receiving a control message indicating that the network layer packet was not passed through the communication facility.

35. The method of claim 25, wherein detecting that the network layer packet is no longer expected to be received received further comprises the steps of:

receiving an ICMP control message indicating that the network layer packet was not passed through the communication facility.

\* \* \* \* \*

UNITED STATES PATENT AND TRADEMARK OFFICE
CERTIFICATE OF CORRECTION

PATENT NO. : 7,310,356 B2 Page 1 of 1
APPLICATION NO. : 10/603038
DATED : December 18, 2007
INVENTOR(S) : Abdo et al.

It is certified that error appears in the above-identified patent and that said Letters Patent is hereby corrected as shown below:

Column 7, line 35, delete "216, 226, and 227" and replace with --216, 226, and 236--.

Column 7, lines 55-56, delete "Dissassember" add --Disassembler--.

Column 10, line 5, delete "cisco" and replace with --Cisco--.

Column 11, line 49, delete "carry IP" and replace with --carrying IP--.

Column 16, lines 59-60, delete "IP host 516 is connected to IP host 526" and replace with --IP host 515 is connected to IP host 525--.

Column 22, line 42, delete "ways[:" and replace with --ways:--.

Column 26, line 27, delete "EEEE" and replace with --IEEE--.

Column 28, line 9, delete "generally has be" and replace with --generally has to be--.

Column 43, line 47; Claim 7, delete "facilities" and replace with --facility--.

Signed and Sealed this

Thirteenth Day of May, 2008

JON W. DUDAS
*Director of the United States Patent and Trademark Office*